(12) United States Patent
MolavianJazi et al.

(10) Patent No.: US 12,089,262 B2
(45) Date of Patent: Sep. 10, 2024

(54) METHOD AND APPARATUS FOR MULTIPLE CONCURRENT RANDOM ACCESS PROCEDURES

(71) Applicant: Samsung Electronics Co., Ltd., Suwon-si (KR)

(72) Inventors: Ebrahim MolavianJazi, Santa Clara, CA (US); Aristides Papasakellariou, Houston, TX (US); Jeongho Jeon, San Jose, CA (US); Joonyoung Cho, Portland, OR (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 17/644,306

(22) Filed: Dec. 14, 2021

(65) Prior Publication Data
US 2022/0191940 A1     Jun. 16, 2022

Related U.S. Application Data

(60) Provisional application No. 63/126,251, filed on Dec. 16, 2020.

(51) Int. Cl.
*H04W 74/0833* (2024.01)
*H04B 17/318* (2015.01)
*H04W 52/36* (2009.01)

(52) U.S. Cl.
CPC ...... *H04W 74/0833* (2013.01); *H04B 17/318* (2015.01); *H04W 52/36* (2013.01)

(58) Field of Classification Search
CPC ............ H04W 74/0833; H04W 52/36; H04W 52/242; H04W 52/325; H04W 52/362;
(Continued)

(56) References Cited

U.S. PATENT DOCUMENTS

| 2013/0195041 A1* | 8/2013 | Papasakellariou .... H04W 72/23 370/329 |
| 2013/0195048 A1* | 8/2013 | Ekpenyong ......... H04W 52/325 370/329 |

(Continued)

OTHER PUBLICATIONS

"5G; NR; Physical channels and modulation (3GPP TS 38.211 version 16.3.0 Release 16)", ETSI TS 138 211 V16.3.0, Nov. 2020, 136 pages.

(Continued)

*Primary Examiner* — Ivan O Latorre

(57) ABSTRACT

Methods and apparatuses for multiple concurrent random access procedures. A method for operating a user equipment includes receiving first configuration for a random access (RA) procedure, initiating a first RA procedure on a cell based on the first configuration, and initiating a second RA procedure on the cell prior to completion of the first RA procedure. A method for a base station includes transmitting a first random access response (RAR) and a second RAR. The first RAR includes a first temporary cell radio network temporary identifier (TC-RNTI) and a first uplink grant. The second RAR includes a second TC-RNTI and a second uplink grant. The method further includes receiving a first PUSCH scheduled by the first uplink grant and a second PUSCH scheduled by the second uplink grant. The first PUSCH includes the first TC-RNTI. The second PUSCH includes only the first TC-RNTI or both the first and second TC-RNTIs.

20 Claims, 17 Drawing Sheets

(58) Field of Classification Search
CPC ... H04W 52/367; H04W 52/50; H04B 17/318
See application file for complete search history.

(56) References Cited

U.S. PATENT DOCUMENTS

| | | | |
|---|---|---|---|
| 2014/0349712 A1* | 11/2014 | Shukla | H04W 74/0833 |
| | | | 455/571 |
| 2016/0073431 A1* | 3/2016 | Park | H04W 72/0473 |
| | | | 370/329 |
| 2018/0324853 A1* | 11/2018 | Jeon | H04W 74/08 |
| 2018/0324867 A1* | 11/2018 | Basu Mallick | H04W 72/21 |
| 2019/0289641 A1* | 9/2019 | Uchino | H04L 5/001 |
| 2020/0008188 A1* | 1/2020 | Nam | H04W 74/0833 |
| 2020/0008247 A1* | 1/2020 | Kwak | H04B 7/0695 |
| 2020/0107369 A1 | 4/2020 | Jeon et al. | |
| 2020/0120713 A1* | 4/2020 | Yerramalli | H04W 74/0833 |
| 2020/0145089 A1* | 5/2020 | Wei | H04W 76/27 |
| 2020/0146069 A1* | 5/2020 | Chen | H04B 17/327 |
| 2020/0178185 A1 | 6/2020 | Jeons et al. | |
| 2020/0229157 A1 | 7/2020 | Rastegardoost et al. | |
| 2020/0252654 A1* | 8/2020 | Su | H04N 19/176 |
| 2020/0322894 A1* | 10/2020 | Xu | H04L 5/0091 |
| 2020/0351801 A1 | 11/2020 | Jeon et al. | |
| 2020/0351944 A1* | 11/2020 | Wang | H04W 52/36 |
| 2020/0383103 A1 | 12/2020 | Zhou et al. | |
| 2021/0045145 A1* | 2/2021 | Yoshimura | H04W 72/1268 |
| 2021/0120594 A1* | 4/2021 | Lei | H04L 5/0053 |
| 2021/0259006 A1* | 8/2021 | Yoshioka | H04L 1/1861 |
| 2021/0266978 A1* | 8/2021 | Sakhnini | H04L 5/001 |
| 2022/0109521 A1* | 4/2022 | Falahati | H04L 1/1664 |
| 2022/0400511 A1* | 12/2022 | Li | H04W 24/08 |

OTHER PUBLICATIONS

"5G; NR; Multiplexing and channel coding (3GPP TS 38.212 version 16.3.0 Release 16)", ETSI TS 138 212 V16.3.0, Nov. 2020, 155 pages.

"5G; NR; Physical layer procedures for control (3GPP TS 38.213 version 16.3.0 Release 16)", ETSI TS 138 213 V16.3.0, Nov. 2020, 181 pages.

"5G; NR; Physical layer procedures for data (3GPP TS 38.214 version 16.3.0 Release 16)", ETSI TS 138 214 V16.3.0, Nov. 2020, 169 pages.

"5G; NR; Medium Access Control (MAC) protocol specification (3GPP TS 38.321 version 16.2.1 Release 16)", ETSI TS 138 321 V16.2.1, Nov. 2020, 156 pages.

"5G; NR; Radio Resource Control (RRC); Protocol specification (3GPP TS 38.331 version 16.2.0 Release 16)", ETSI TS 138 331 V16.2.0, Nov. 2020, 908 pages.

"5G; NR; NR and NG-RAN Overall description; Stage-2 (3GPP TS 38.300 version 16.3.0 Release 16)", ETSI TS 138 300 V16.3.0, Nov. 2020, 151 pages.

International Search Report dated Mar. 23, 2022 in connection with International Patent Application No. PCT/KR2021/019164, 4 pages.

Written Opinion of the International Searching Authority dated Mar. 23, 2022 in connection with International Patent Application No. PCT/KR2021/019164, 4 pages.

Extended European Search Report issued Dec. 22, 2023 regarding Application No. 21907118.0, 12 pages.

Zte et al., "Remaining issues of 2-step RACH procedures", 3GPP TSG RAN WG1 Meeting #99, R1-1911828, Nov. 2019, 21 pages.

Huawei et al., "Discussion on the potential coverage enhancement solutions for other channels", 3GPP TSG RAN WG1 Meeting #103-e, R1-2007585, Oct. 2020, 4 pages.

* cited by examiner

METHOD AND APPARATUS FOR MULTIPLE CONCURRENT RANDOM ACCESS PROCEDURES

CROSS-REFERENCE TO RELATED APPLICATION AND CLAIM OF PRIORITY

This application claims priority under 35 U.S.C. § 119(e) to U.S. Provisional Patent Application No. 63/126,251 filed on Dec. 16, 2020. The above-identified provisional patent application is hereby incorporated by reference in their entirety.

TECHNICAL FIELD

The present disclosure relates generally to wireless communication systems and, more specifically, the present disclosure relates to multiple concurrent random access procedures.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to multiple concurrent random access procedures.

In one embodiment, a method is provided. The method includes receiving first configuration for a random access (RA) procedure, initiating a first RA procedure on a cell based on the first configuration, and initiating a second RA procedure on the cell prior to completion of the first RA procedure.

In another embodiment, a user equipment (UE) is provided. The UE includes a transceiver configured to receive a first configuration for a RA procedure and a processor operably coupled to the transceiver. The processor is configured to initiate a first RA procedure on a cell based on the first configuration and a second RA procedure on the cell prior to completion of the first RA procedure.

In yet another embodiment, a base station is provided. The base station includes a transceiver configured to receive a first physical random access channel (PRACH) in a first random access occasion (RO) and receive a second PRACH in a second RO. The transceiver is further configured to transmit a first random access response (RAR) corresponding to the first PRACH and transmit a second RAR corresponding to the second PRACH. The first RAR includes a first temporary cell radio network temporary identifier (TC-RNTI) and a first uplink grant. The second RAR includes a second TC-RNTI and a second uplink grant. The transceiver is further configured to receive a first PUSCH scheduled by the first uplink grant and receive a second PUSCH scheduled by the second uplink grant. The first PUSCH includes the first TC-RNTI. The second PUSCH includes only the first TC-RNTI or both the first and the second TC-RNTIs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
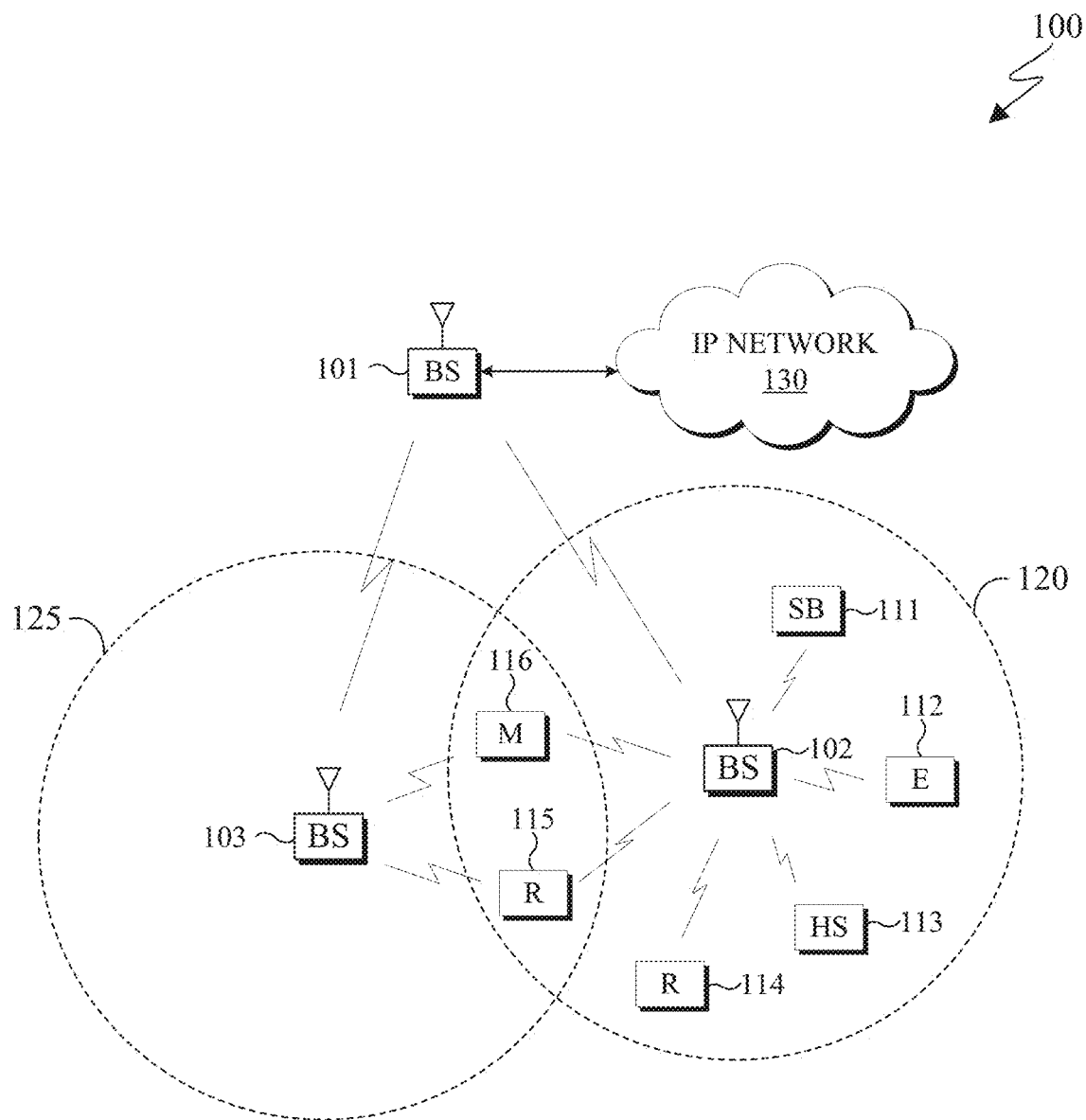
FIG. 1 illustrates an example wireless network according to embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein:

[1] 3GPP TS 38.211 Rel-16 v16.3.0, "NR; Physical channels and modulation," September 2020;

[2] 3GPP TS 38.212 Rel-16 v16.3.0, "NR; Multiplexing and channel coding," September 2020;

[3] 3GPP TS 38.213 Rel-16 v16.3.0, "NR; Physical layer procedures for control," September 2020;

[4] 3GPP TS 38.214 Rel-16 v16.3.0, "NR; Physical layer procedures for data," September 2020;

[5] 3GPP TS 38.321 Rel-16 v16.2.1, "NR; Medium Access Control (MAC) protocol specification," September 2020;

[6] 3GPP TS 38.331 Rel-16 v16.2.0, "NR; Radio Resource Control (RRC) protocol specification," September 2020; and

[7] 3GPP TS 38.300 Rel-16 v16.3.0, "NR; NR and NG-RAN Overall Description; Stage 2," September 2020.

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
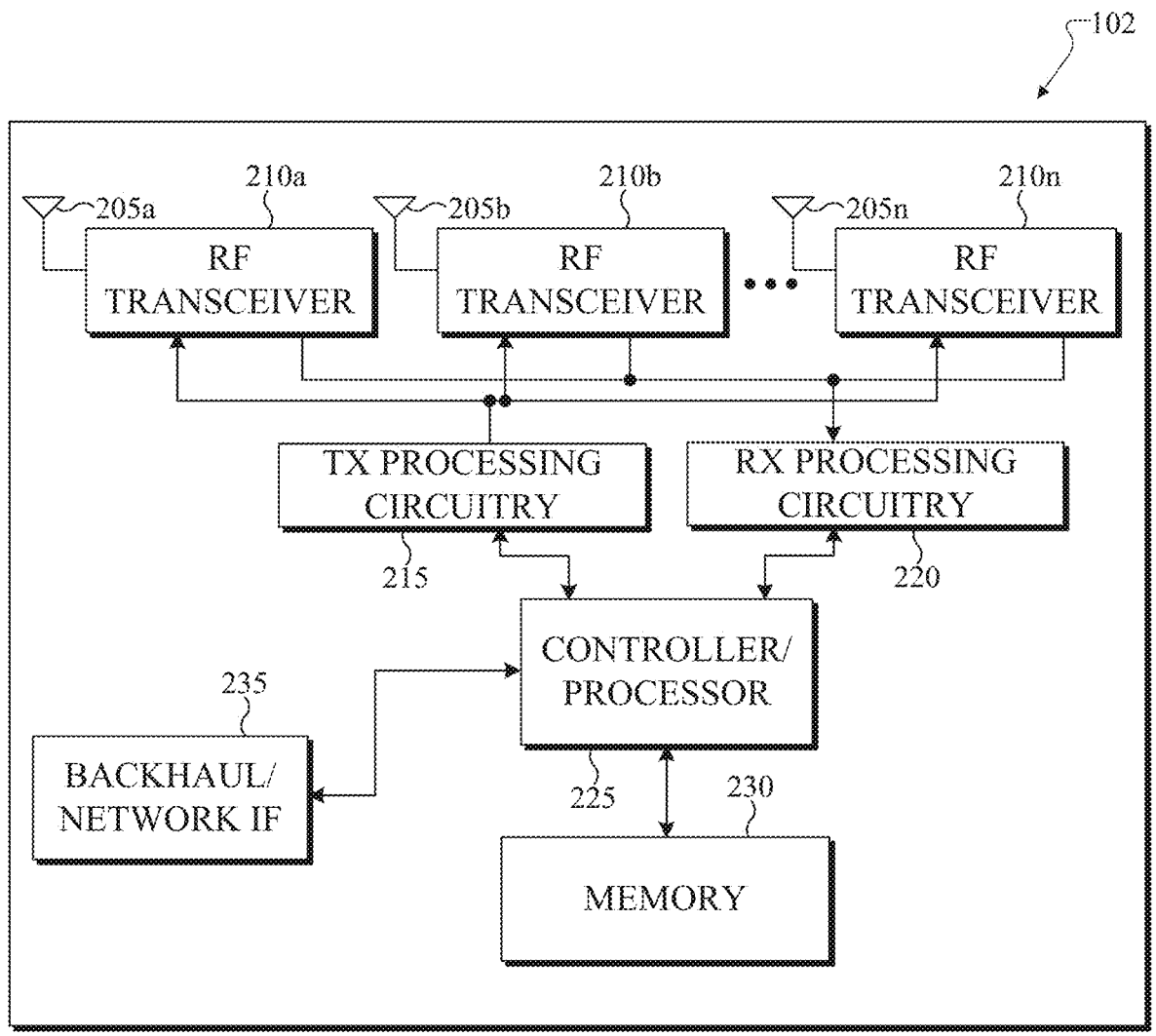
FIG. 2 illustrates an example base station (BS) according to embodiments of the present disclosure.
Figure 3:
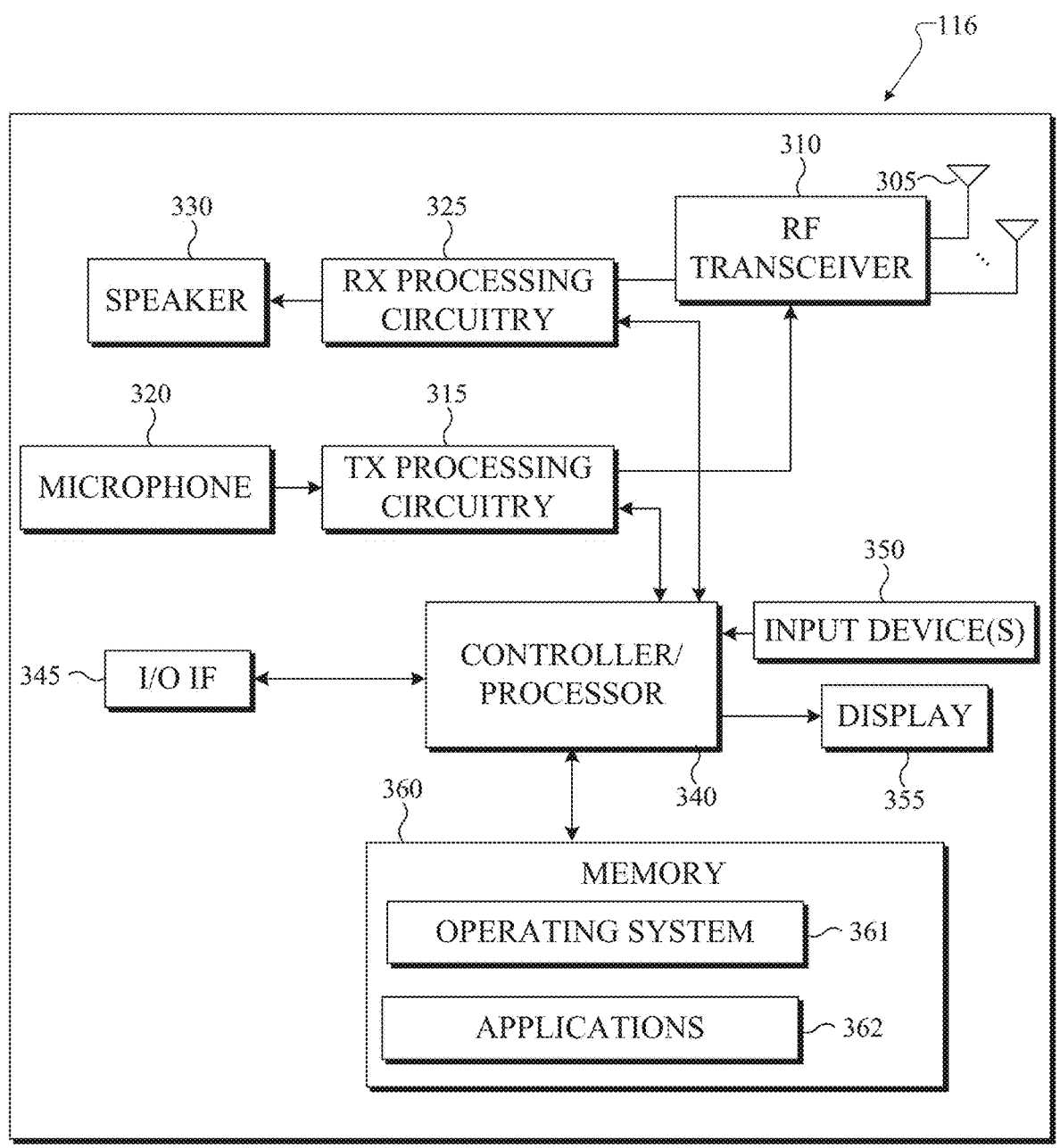
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programming, or a combination thereof for multiple concurrent random access procedures multiple concurrent random access procedures. In certain embodiments, and one or more of the BSs 101-103 includes circuitry, programming, or a combination thereof for multiple concurrent random access procedures.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support multiple concurrent random access procedures. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
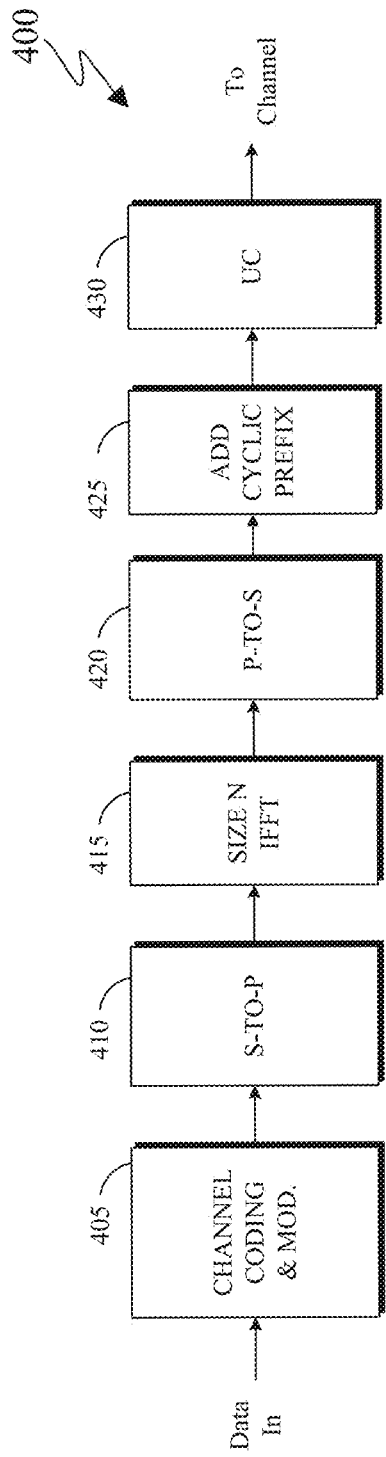
FIGS. 4 and 5 illustrate example wireless transmit and receive paths according to embodiments of present disclosure.
Figure 5:
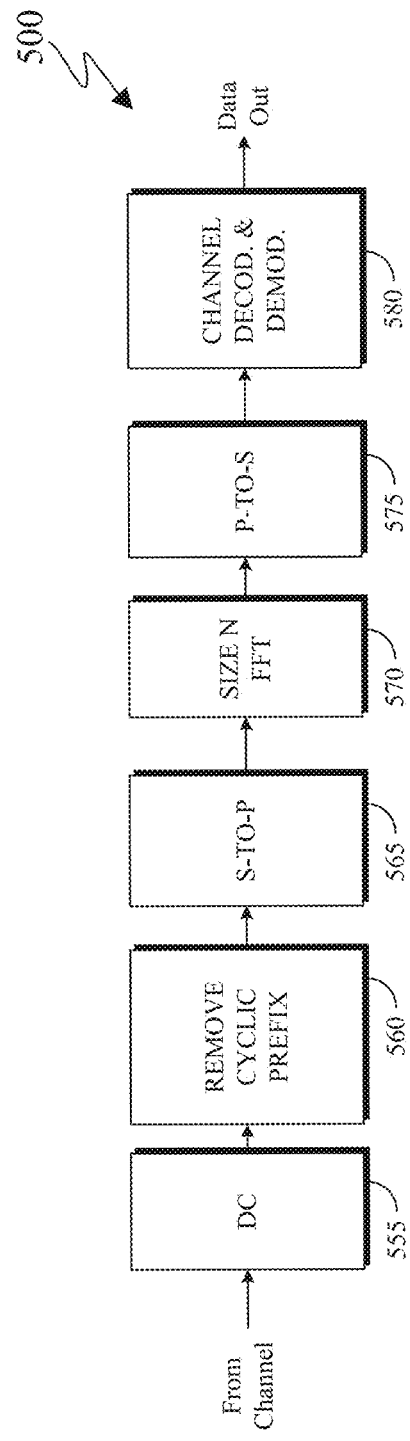

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support multiple concurrent random access procedures as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure describe enhancements for initial and random access (RA) procedures associated with multi-panel UE's.

Embodiments of the present disclosure take into consideration that current a UE (such as the UE 116) is allowed to initiate and perform only one RA procedure at any given point in time. Therefore, even if a (multi-panel) UE can detect more than one synchronized signal (SS) physical broadcast channel (PBCH) (denoted as SS/PBCH block or SSB) or channel state information reference signal (CSI-RS) for physical random access channel (PRACH) transmission, the UE needs to transmit only one PRACH associated with one SSB or CSI-RS, and wait until the end of the random access response (RAR) monitoring window, before the UE is allowed to transmit another PRACH possibly associated with a different SSB or CSI-RS. Such operation increases the latency for random access and also reduces the random access success probability.

In addition, especially in higher frequency bands such as frequency range 2 (FR2), electromagnetic exposure is a critical factor in determination of uplink (UL) transmission control. Therefore, even if a SSB or CSI-RS has a good signal quality such as high reference signal received power (RSRP) for DL reception, the UE may have restrictions in using that SSB or CSI-RS for PRACH transmission, due to maximum permissible exposure (MPE) issues. Based on the current limitation to perform only one PRACH at a time, the UE either transmits a reduced-power PRACH associated with a SSB with high RSRP or transmits a high-power PRACH associated with a SSB with lower RSRP. Such operation reduces the likelihood of random access success, and may degrade the beam management between UE and gNB (such as the BS 102), for example, may lead to low quality beams (or beam pair), which adversely affects future transmission and receptions as well.

Accordingly, embodiments of the present disclosure take into consideration that there is a need to reduce the random access latency and increase the likelihood of successful completion of random access. Embodiments of the present disclosure also take into consideration that there is a need to address the impact of electromagnetic exposure such as MPE issues on PRACH power control. Embodiments of the present disclosure further take into consideration that there is a need to improve the selection of downlink (DL) reference signals (RS), for example, SSB, associated with PRACH, for enhanced PRACH transmission as well as enhanced beam management and robustness for future transmission and receptions after completion of random access.

The present disclosure provides enhancements for initial and random access by supporting two/multiple concurrent RA procedures. The two concurrent RA procedures can correspond to a same PRACH trigger or different PRACH triggers. For example, UEs that can simultaneously transmit from multiple panels can perform multiple concurrent RA procedures. The embodiments can also apply for single-panel UEs with some modifications or restrictions. A network can indicate that concurrent RA procedures are enabled through corresponding information in a system information block (SIB). The concurrent RA procedures are overlapping in time but can be initiated by a UE at a same time or at different times. In addition, the concurrent RA procedures can continue until successful completion of at least one of the RA procedures, or at least until successful reception of one RAR. Configuration of RA procedure parameters including PRACH transmission and RAR monitoring can be UE-panel-specific, including panel-specific power control that considers MPE issues at the UE panels. In addition, multiple concurrent RA procedures enable a UE to acquire panel-specific timing advance (TA) values to use for subsequent UL transmissions. Further, multiple concurrent RA procedures allow a spatial domain diversity for transmission of multiple Msg3/MsgA physical uplink shared channel (PUSCH) transmission and physical downlink control channel (PDCCH) monitoring for scheduling Msg4 physical downlink shared channel (PDSCH) receptions that increases the likelihood of successful contention resolution for the UE. A UE needs to also consider "intra-UE" contention resolution aspects so that the gNB can identify and link the multiple RA procedures to the UE.

One motivation for focusing on these enhanced schemes is enhanced operation of multi-panel UEs, especially in higher frequency bands such as the ones above 6 GHz. In addition, the embodiments can apply to various use cases and settings, such as for single-panel UEs, lower frequency bands, enhanced mobile broadband (eMBB), ultra-reliable low latency communications (URLLC) and industrial internet of things (IIoT) and XR, massive machine-type-communications (mMTC) and internet of things (IoT), sidelink/V2X, operation in unlicensed/shared spectrum (NR-U), non-terrestrial networks (NTN), operation with reduced capability (RedCap) UEs, private or non-public networks (NPN), and the like.

This disclosure addresses the above concepts and provides additional design aspects for supporting multiple concurrent random access procedure as summarized and described below. Throughout the present disclosure, the embodiments are described in terms of two or multiple RA procedures. The embodiments also apply to multiple repetitions of a single RA procedure (or multiple RA procedures), including multiple repetitions of one or more of Msg1/MsgA PRACH, Msg2/B PDCCH/PDSCH, Msg3/A PUSCH, Msg4 PDCCH/PDSCH, wherein the repetitions can be associated with same or different UE-Tx/UE-Rx beam(s) or same or different DL/UL reference signals, such as same/different SSB(s), or CSI-RS(s), or SRS(s).

Embodiments, described in greater detail below, denoted as E-1, describe multiple concurrent RA procedures. That is, a UE can operate with two or multiple concurrent RA procedures. According to this embodiment a UE with higher layers such as L2/L3 or gNB signaling such as PDCCH order can initiate two or multiple concurrent RA procedures. For example, a first RA procedure can be initiated by UE higher layers such as L2/L3 and a second RA procedure can be concurrently initiated by gNB signaling such as PDCCH order. The two or multiple concurrent RA procedures can be associated with a single PRACH trigger or can be associated with different PRACH triggers. The two or multiple concurrent RA procedures can be associated with a same (serving) cell or different (serving) cells. In one realization, there can be two or multiple RA procedures ongoing at any point in time in a medium access control (MAC) entity or a cell group. In another realization, there can be two or multiple RA procedures ongoing at any point in time in a single (serving) cell, such as a single (serving) cell of the MAC entity. For example, the UE can be in RRC_CONNECTED state, while in another example, the two concurrent RA procedures can occur before Radio Resource Control (RRC) connection.

Embodiments, described in greater detail below, denoted as E-1-1, describe multiple concurrent RA procedures from multiple UE panels. For example, a UE with multiple antenna panels can initiate and perform two or more concurrent random access procedures. A first UE panel can perform a first RA procedure and a second UE panel can perform a second RA procedure, wherein the first and second RA procedure can include one or more the following steps: a corresponding set of PRACH transmission attempts with corresponding power ramping, a corresponding RAR/Msg-B monitoring, a corresponding Msg3/MsgA-PUSCH transmission, and a corresponding PDCCH monitoring for scheduling Msg4 PDSCH reception for contention resolution.

Embodiments, described in greater detail below, denoted as E-1-2, describe selection of single or "dual" PRACH operation. For example, a UE can determine whether to perform a single RA procedure at any given point in time or to perform two/multiple concurrent RA procedures based on a condition. Such condition can be one or more of a UE capability, an absolute or a relative RSRP value condition, an absolute or a relative MPE/P-MPR value condition, an absolute or a relative EIRP value condition, and the like.

Embodiments, described in greater detail below, denoted as E-2, describe a timeline for initiating and stopping of multiple concurrent RA procedures (including a "cut-off" upon successful RAR reception). There can be a number of cases with respect to the timeline of two/multiple concurrent RA procedures (e.g., how/when to refer to two RA procedures as concurrent), such as the initiation timing for the concurrent RA procedures, their separation in time, the stopping or completion time, and the like.

Embodiments, described in greater detail below, denoted as E-3, describe individual or common PRACH type selection (i.e., 4-step RACH vs. 2-step RACH) for UE panels. For a UE performing two concurrent RA procedures, the UE can determine a PRACH type for the two RA procedures individually or jointly, wherein a PRACH type refers to a PRACH Type-1 or 4-step RACH, or a PRACH Type-2 or 2-step RACH.

Embodiments, described in greater detail below, denoted as E-4, describe a UE initiating and performing two/multiple concurrent RA procedures using configuration parameters that are partially or fully panel-specific. Here, RA configuration includes configuration parameters for PRACH transmission, RAR/MsgB monitoring, Msg3/MsgA PUSCH configuration, and PDCCH monitoring for scheduling Msg4 PDSCH reception.

Embodiments, described in greater detail below, denoted as E-5, describe PRACH power control when using two UE panels with different MPE and/or EIRP values. For example, when a UE initiates/performs two concurrent RA procedures using two UE panels, the UE can determine different PRACH transmission power levels for the two UE panels, e.g., due to different MPE values experienced by the two UE panels, or due to different EIRP values corresponding to the two UE panels.

Embodiments, described in greater detail below, denoted as E-5-1, describe PRACH power control for overlapping ROs of two concurrent RA procedures when there is a total power limit across UE panels. For example, when a UE initiates and performs multiple concurrent RA procedures, the UE may need to transmit time-overlapping or simultaneous PRACH, in which case the UE can apply various handling mechanisms such as dropping or power scaling for the PRACH transmission(s).

Embodiments, described in greater detail below, denoted as E-6, describe monitoring and reception of two RARs/MsgBs and handling two Msg3s/Msg4s (or MsgA PUSCH(s)) corresponding to two concurrent RA procedures. For a UE performing two or multiple concurrent RA procedures, the UE can monitor two/multiple RARs/MsgBs corresponding to RA procedures, can transmit two or multiple Msg3/MsgA PUSCHs, and can monitor PDCCH for scheduling two or multiple Msg4s for contention resolution. The UE provides information in Msg3/MsgA PUSCHs to enable the network to link the two or multiple concurrent RA procedures and resolve an "intra-UE" contention resolution caused by the UE. This is because there is no a priori knowledge before Msg3/MsgA PUSCH reception at the gNB that the multiple concurrent RA procedures belong to a single same UE instead of multiple different UEs.

Embodiments, described in greater detail below, denoted as E-6-1, describe linkage of multiple RARs/MsgBs with multiple concurrent PRACHs/RA procedures. For a UE with multiple concurrent RA procedures, the UE monitors PDCCH for scheduling of a first random access response (RAR) in a first configured time window after a first PRACH transmission for a first RA procedure, and also monitors PDCCH for scheduling of a second RAR in a second configured time window after a second PRACH transmission for a second RA procedure. There can be a variety of methods for the UE to determine a corresponding RA procedure (first or second) for a received RAR.

Embodiments, described in greater detail below, denoted as E-6-2, describe a determination of multiple panel-specific TA value for a UE with multiple concurrent RA procedures. For a UE with multiple concurrent RA procedures, the UE can determine a first TA value from a first RAR associated with a first RA procedure that the UE can apply to a first UE panel and can determine a second TA value from a second RAR associated with a second RA procedure that the UE can apply to a second UE panel. The UE applies to the corresponding TA values in subsequent PUSCH transmissions, PUCCH, transmissions, or sounding reference signal (SRS) transmissions when using the corresponding panel.

Embodiments, described in greater detail below, denoted as E-6-3, describe a transmission of a single Msg3 after reception of two RARs corresponding to two RA procedures. for a UE performing two RA procedures, the UE can monitor PDCCH for scheduling of two RARs corresponding to two concurrent RA procedures, but the UE can select and transmit only a single Msg3 PUSCH.

Embodiments, described in greater detail below, denoted as E-6-4, describe a transmission of two (modified) Msg3s after reception of two RARs corresponding to two RA procedures and "intra-UE" contention resolution, for a UE before RRC connection. For a UE performing two concurrent RA procedures, the UE can monitor for two RARs corresponding to the two concurrent RA procedures, and then transmit two Msg3 PUSCHs, and monitor PDCCH for scheduling of two Msg4s, each with a corresponding contention resolution time window. The UE can adjust the contents of the two Msg3 PUSCHs, compared to contents of Msg3 PUSCH for a UE with single RA procedure, so that the gNB can identify the two concurrent RA procedures and link them to the same UE. For example, the two RARs can include two transmission configuration radio network temporary identifier (TC-RNTIs) for the same UE and the gNB needs to resolve such "double TC-RNTI" issue for the UE.

Embodiments, described in greater detail below, denoted as E-6-5, describe a transmission of two (modified) Msg3s after reception of two RARs corresponding to two RA procedures, for a UE after RRC connection. For example, when a UE that is already in the RRC_CONNECTED state and configured with cell radio network temporary identifier (C-RNTI) performs two concurrent RA procedures, the UE can monitor PDCCH for scheduling of two RARs corresponding to two concurrent RA procedures, and then transmit two Msg3 PUSCHs, and monitor PDCCH for scheduling of two Msg4s, each with a corresponding contention resolution time window. The two Msg3 PUSCHs can be transmitted independently for the two RA procedures, or the two Msg3 PUSCHs can have a dependency and linkage.

Embodiments, described in greater detail below, denoted as E-6-6, describe a modification of MsgA PUSCH(s) for two concurrent RA procedures with 2-step RACH. For a UE performing two concurrent RA procedures, if one or both RA procedures are a Type-2 RA procedure, i.e., a 2-step RACH procedure, then the UE can modify the contents of the one or two MsgA PUSCH(s) so that the gNB can identify and link the two RA procedures to the UE. The UE can include information about the other concurrent RA procedure that the UE has attempted in the MsgA PUSCH.

Embodiments, described in greater detail below, denoted as E-6-7, describe handling Msg3/A buffer for two concurrent RA procedures. For a UE performing two concurrent RA procedures, the UE can use individual buffers or a common buffer for the two Msg3/MsgA PUSCHs corresponding to the two RA procedures.

Embodiments, described in greater detail below, denoted as E-7, describe a modified back-off indication (BI) for PRACH fairness among legacy UEs and enhanced UEs. UEs that perform two/multiple RA procedures can be expected to interpret a BI provided in a RAR/MsgB message differently from other UEs. For example, such behavior can enable a network to provide similar access opportunities for all UEs, including UEs that cannot perform multiple concurrent RA procedures. The network can use the BI to temporarily suspend multiple RA procedures and mitigate a congestion of PRACH attempts in the cell.

Embodiments, described in greater detail below, denoted as E-8, describe a single-panel UEs with two concurrent PRACHs. a single-panel UE can perform two concurrent RA procedures when the two RA procedures are associated with time multiplexed PRACH transmission, RAR/MsgB monitoring and receptions, Msg3/A PUSCH transmissions, and PDCCH monitoring for scheduling Msg4 PDSCH receptions.

Embodiments, described in greater detail below, denoted as E-9, describe an antenna port for PRACH transmission of two concurrent RA procedures. two or multiple antenna ports (APs) can be used by a UE for PRACH transmission corresponding to two concurrent RA procedures. The UE can transmit two concurrent single-port PRACH transmissions, or two concurrent multi-port PRACH transmissions, wherein each of the two single-port or multi-port PRACH transmissions can be associated with one UE panel.

Throughput the present disclosure, the terms "SSB" and "SS/PBCH block" are used interchangeably. Additionally, the term "configuration" and variations thereof (such as "configured" and so on) refer to one or more of: a system information signaling such as by a master information block (MIB) or a SIB, a common higher layer/RRC signaling, and a dedicated higher layer/RRC signaling. Moreover, the term "higher layer configuration" is used to refer to one or more of system information (such as SIB1), or common/cell-specific RRC configuration, or dedicated/UE-specific RRC configuration. The term signal quality is used to refer to e.g. RSRP, reference signal received power (RSRQ) or received signal strength indicator (RSSI) or signal-to-noise and interference ratio (SINR), with or without filtering such as L1 or L3 filtering, of a channel or a signal such as a reference signal (RS) including SSB, CSI-RS, or SRS.

The terms "(UE) panel(s)" and "(UE) antenna port group(s)" are used interchangeably to refer to one or multiple UE panels. A panel can refer to an antenna panel, an antenna array, or an antenna sub-array and the like. A panel can include of a number of antenna elements. For example, a panel can be a physical or a virtual panel based on a virtualization of a set of physical antenna elements to virtual transmission entities. wherein the virtualization details and schemes can be left to UE implementation and not disclosed to the gNB. In one realization, a UE panel can be a set of antennas that can generate an independent (or partially independent) spatial transmission/reception filter or beam. For example, a panel can be a receiver "Rx" panel or a transmission "Tx" panel. For example, the set of Rx panels and the set of Tx panels can have full or partial overlap or can be mutually exclusive. For example, the set of UE Tx panels can be a (strict) subset of the set of Rx panels. For example, a UE panel can be identified and indicated by the network with an explicit or implicit identifier. A Tx panel can be indicated by an uplink transmission entity (UTE) identifier, or an Rx panel can be indicated by a downlink transmission entity (DTE) identifier. For example, a panel can be associated with a reference signal (RS), or an RS resource, or an RS resource set, or an RS resource group, wherein an RS can be a DL RS such as SSB or CSI-RS or an UL RS such as SRS. For example, at least for a UE in connected mode, a UE panel can be associated with an SRS resource set. For example, a panel can be associated with a set or group of UE antenna ports. Panels can have same or different features, such as same or different number of antenna ports, same or different number of RF chains or PAs or LNAs connected to them, same or different baseband chains connected to them, same or different output power levels such as peak/average/min/max EIRP or TRP, and so on. For example, UE panels can be associated with different capabilities such as different (beam) switching delays or different processing capabilities or timelines, and so on. A UE can have one or multiple Rx panels and one or more Tx panels. The UE can have one or multiple activated Tx panels for transmission (e.g., with an associated PA being already "warmed up") at any point in time. In one realization, the UE can transmit with a single Tx panel at any point in time, wherein the single Tx panel is the only activated Tx panel at that time (referred to as slow panel selection) or is one out of multiple activated Tx panels at that time (referred to as fast panel selection) wherein a panel selection can be based on UE determination or gNB signaling. In another realization, the UE can transmit with two or multiple Tx panels at any point in time (referred to as simultaneous transmission on multiple panels "STxMP" or as simultaneous multi-panel transmission "SMPTx"). In yet another realization, the UE can both transmit and receive with two or multiple Tx/Rx panels at any point in time (referred to as simultaneous transmission and reception on multiple panels "STRxMP" or as simultaneous multi-panel transmission and reception "SMPTRx").

An antenna port is defined such that the channel over which a symbol on the antenna port is conveyed can be inferred from the channel over which another symbol on the same antenna port is conveyed.

For demodulation reference signal (DM-RS) associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same physical resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports can be considered to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

In certain embodiments, a UE (such as the UE 116) assumes that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE assumes PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DMRS ports associated with a PDSCH are quasi co-located (QCL) with QCL Type A, Type D (when applicable) and average gain. The UE may further assume that no DM-RS collides with the SS/PBCH block.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a QCL relationship between one or two downlink reference signals and the DMRS ports of the PDSCH, the DMRS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values: (i) 'QCL-TypeA': {Doppler shift, Doppler spread, average delay, delay spread}; (ii) 'QCL-TypeB': {Doppler shift, Doppler spread}; (iii) 'QCL-TypeC': {Doppler shift, average delay}; and (iv) 'QCL-TypeD': {Spatial Rx parameter}.

In certain embodiments, the UE receives a MAC-CE activation command to map up to [N] (e.g., N=8) TCI states to the codepoints of the DCI field 'Transmission Configuration Indication'. When the hybrid automatic repeat request acknowledgement (HARQ-ACK) corresponding to the PDSCH carrying the activation command is transmitted in slot n, the indicated mapping between TCI states and codepoints of the DCI field 'Transmission Configuration Indication' should be applied after a MAC-CE application time, e.g., starting from the first slot that is after slot e.g. n+$3N_{slot}^{subframe,\mu}$.

The configured UE maximum output power $P_{CMAX,f,c}$ for carrier f of a serving cell c shall be set such that the corresponding measured peak EIRP $P_{UMAX,f,c}$ is within the following bounds, as described in Equation (1).

$$P_{Powerclass} - \text{MAX}(\text{MAX}(MPR_{f,c}, A\text{-}MPR_{f,c}) + \Delta MB_{P,n}, P\text{-}MPR_{f,c}) - \text{MAX}\{T(\text{MAX}(MPR_{f,c}, A\text{-}MPR_{f,c})), T(P\text{-}MPR_{f,c})\} \le P_{UMAX,f,c} \le \text{EIRP}_{max} \quad (1)$$

The corresponding measured total radiated power $P_{TMAX,f,c}$ is within the following bounds, as described in Equation (2).

$$P_{TMAX,f,c} \le \text{TRP}_{max} \quad (2)$$

Within the frequency span of a carrier, multiple SSBs can be transmitted. The PCIs of SSBs transmitted in different frequency locations do not have to be unique, i.e. different SSBs in the frequency domain can have different PCIs. However, when an SSB is associated with an RMSI, the SSB is referred to as a Cell-Defining SSB (CD-SSB). A PCell is always associated to a CD-SSB located on the synchronization raster.

For a UE in RRC_CONNECTED state, the bandwidth part (BWP) configured to the UE by a serving cell may overlap in frequency with BWPs configured to other UEs by other cells within a carrier. Multiple SSBs may also be transmitted within the frequency span of a carrier used by the serving cell. However, from the UE perspective, each serving cell is associated with at most a single SSB.

The expression CORESET #0 can refer to the control resource set for at least SIB1 scheduling and can be configured either via MIB or via dedicated RRC signaling. System Information (SI) includes a MIB and a number of SIBs, which are divided into Minimum SI and Other SI.

Minimum SI comprises basic information required for initial access and information for acquiring any other SI. A minimum SI includes two elements, that of (i) MIB that contains cell barred status information and essential physical layer information of the cell required to receive further system information, (e.g. CORESET #0 configuration). It is noted that MIB is periodically broadcast on BCH. The second element, SIB1, defines the scheduling of other system information blocks and contains information required for initial access. SIB1 is also referred to as Remaining Minimum SI (RMSI) and is periodically broadcast on DL-SCH or sent in a dedicated manner on DL-SCH to UEs in RRC_CONNECTED.

Other SI encompasses all SIBs not broadcast in the Minimum SI. Those SIBs can either be periodically broadcast on DL-SCH, broadcast on-demand on DL-SCH (i.e. upon request from UEs in RRC_IDLE, RRC_INACTIVE, or RRC_CONNECTED), or sent in a dedicated manner on DL-SCH to UEs in RRC_CONNECTED (i.e., upon request, if configured by the network, from UEs in RRC_CONNECTED or when the UE has an active BWP with no common search space configured). Other SI consists of SIB2 through SIB11. It is noted that SIB2 includes cell re-selection information, mainly related to the serving cell. Similarly, SIB3 includes information about the serving frequency and intra-frequency neighboring cells relevant for cell re-selection (including cell re-selection parameters common for a frequency as well as cell specific re-selection parameters). Additionally, SIB4 includes information about other NR frequencies and inter-frequency neighboring cells relevant for cell re-selection (including cell re-selection parameters common for a frequency as well as cell specific re-selection parameters), which can also be used for NR idle/inactive measurements. SIB5 includes information about E-ULTRA frequencies and E-ULTRA neighboring cells relevant for cell re-selection (including cell re-selection parameters common for a frequency as well as cell specific re-selection parameters). SIB6 includes an ETWS primary notification. SIB7 includes an ETWS secondary notification. SIB8 includes a CMAS warning notification. SIB9 includes information related to GPS time and Coordinated Universal Time (UTC). SIB10 includes the Human-Readable Network Names (HRNN) of the NPNs listed in SIB1. SIB11 includes information related to idle/inactive measurements. It is noted that SIBpos includes positioning assistance data as defined in TS 37.355 [43] and TS 38.331 [12].

For a cell/frequency that is considered camping by the UE, the UE is not required to acquire the contents of the minimum SI of that cell/frequency from another cell/frequency layer. This does not preclude the case that the UE applies stored SI from previously visited cell(s).

If the UE cannot determine the full contents of the minimum SI of a cell by receiving from that cell, the UE shall consider that cell as barred.

In case of bandwidth adaptation and BWP operation, a UE acquires SI on the active BWP.

A MAC entity is defined per cell group, one for the master cell group (MCG) and one for the secondary cell group (SCG). Two MAC entities can be considered for a UE when the UE is configured with dual active protocol stack (DAPS) handover: one for the source cell (source MAC entity) and one for the target cell (target MAC entity).

Embodiments of the present disclosure take into consideration that in certain instances there is only one RA procedure ongoing at any point in time in a MAC entity. In other words, a UE has at most one ongoing RA procedure at a given time in a MAC entity. It is up to UE implementation whether to continue with an ongoing procedure or start a new procedure (e.g., for SI request). PRACH initiation on a PCell can be by RRC (e.g., for SI request), MAC entity, or PDCCH order. PRACH initiation on a SCell can by a PDCCH order.

A random access procedure (for PCell) can be triggered by a number of events such as: (i) Initial access to establish RRC connection (from RRC_IDLE to RRC_CONNECTED)→contention based random access (CBRA); (ii) RRC Connection Re-establishment procedure (after radio link failure (RLF))→CBRA; (iii) Transition from RRC_INACTIVE to RRC_CONNECTED→CBRA; (iv) Request by RRC upon synchronous reconfiguration (e.g. handover) →CBRA or contention free random access (CFRA); (v) Request for on-demand system information (OSI)→CBRA or CFRA; (vi) DL data arrival during RRC_CONNECTED when UL synchronization status is "non-synchronized" i.e., Out-of-Sync→CBRA or CFRA; (vii) UL data arrival during RRC_CONNECTED when UL synchronization status is "non-synchronized" i.e., Out-of-Sync→CBRA; (viii) To establish time alignment for a secondary TAG→CBRA or CFRA; (ix) Scheduling request "SR" issues (no PUCCH for SR, or failure of PUCCH-based SR)→CBRA; (x) Link recovery procedure (LRR)—also known as beam failure recovery (BFR)→CBRA or CFRA; and (xi) Consistent UL listen-before-talk (LBT) failure on SpCell.

It is noted that for PRACH on a SCell, some of the above triggers may not apply. For example, a PRACH trigger for SCell can include Out-of-sync and BFR.

In certain embodiments, the MIB is mapped on the BCCH and carried on BCH while all other SI messages are mapped on the BCCH, where they are dynamically carried on DL-SCH. The scheduling of SI messages part of Other SI is indicated by SIB1.

For UEs in RRC_IDLE and RRC_INACTIVE, a request for Other SI triggers a random access procedure where MSG3 includes the SI request message unless the requested SI is associated to a subset of the PRACH resources, in which case MSG1 is used for indication of the requested Other SI. When MSG1 is used, the minimum granularity of the request is one SI message (i.e. a set of SIBs), one RACH preamble and/or PRACH resource can be used to request multiple SI messages and the gNB acknowledges the request in MSG2. When MSG3 is used, the gNB acknowledges the request in MSG4.

For UEs in RRC_CONNECTED, a request for Other SI may be sent to the network, if configured by the network, in a dedicated manner (i.e., via UL-DCCH) and the granularity of the request is one SIB. The gNB may respond with an RRCReconfiguration including the requested SIB(s). It is a network choice to decide which requested SIBs are delivered in a dedicated or broadcasted manner.

The Other SI may be broadcast at a configurable periodicity and for a certain duration. The Other SI may also be broadcast when it is requested by UE in RRC_IDLE or RRC_INACTIVE or RRC_CONNECTED.

In certain embodiments, for a UE to be allowed to camp on a cell it must have acquired the contents of the Minimum SI from that cell. There may be cells in the system that do not broadcast the Minimum SI, and as such, the UE cannot camp.

In certain embodiments, there are a number of cases for selection of PRACH type, i.e., 4-step RACH or 2-step RACH. A 2-step RACH can be selected when only 2-step RACH resource provided (such as when (i) no 4-step RACH provided, (ii) both 2-step RACH and 4-step RACH resources are provided and RSRP for PRACH pathloss exceeds a threshold, or (iii) PRACH is triggered by reconfiguration with sync (e.g., handover) and CFRA resources for 2-step RACH provided. A 4-step RACH can be selected otherwise. For example, 4-step RACH is selected when PRACH is triggered by (i) PDCCH order, (ii) RRC for SI request with explicit RACH resources, (iii) BFR with explicit CFRA resources for 4-step RACH, or (iv) reconfiguration with sync (e.g., handover) with explicit CFRA resources for 4-step RACH.

For example, when CFRA resources are not configured, an RSRP threshold is used by the UE to select between 2-step RA type and 4-step RA type. For another example, when CFRA resources for 4-step RA type are configured, the UE performs random access with 4-step RA type. For another example, when CFRA resources for 2-step RA type are configured, the UE performs random access with 2-step RA type. For yet another example, CFRA with 2-step RA type is only supported for handover. For instance, the network does not configure CFRA resources for 4-step and 2-step RA types at the same time for a BWP.

It is noted that Msg1 refers to preamble transmission of the random access procedure for 4-step random access (RA) type. MsgA refers to preamble and payload transmissions of the random access procedure for 2-step RA type. Msg3 refers to first scheduled transmission of the random access procedure. MsgB refers to response to MSGA in the 2-step random access procedure. Additionally, MSGB may consist of response(s) for contention resolution, fallback indication(s), and backoff indication.

The MSG1 of the 4-step RA type includes a preamble on PRACH. After MSG1 transmission, the UE monitors for a response from the network within a configured window. For CFRA, dedicated preamble for MSG1 transmission is assigned by the network and upon receiving random access response from the network, the UE ends the random access procedure. For CBRA, upon reception of the random access response, the UE sends MSG3 using the UL grant scheduled in the response and monitors contention resolution. If contention resolution is not successful after MSG3 (re)transmission(s), the UE goes back to MSG1 transmission.

The MSGA of the 2-step RA type includes a preamble on PRACH and a payload on PUSCH. After MSGA transmission, the UE monitors for a response from the network within a configured window. For CFRA, dedicated preamble and PUSCH resource are configured for MSGA transmission and upon receiving the network response, the UE ends the random access procedure. For CBRA, if contention resolution is successful upon receiving the network response, the UE ends the random access procedure; while if fallback indication is received in MSGB, the UE performs MSG3 transmission using the UL grant scheduled in the fallback indication and monitors contention resolution. If contention resolution is not successful after MSG3 (re)transmission(s), the UE goes back to MSGA transmission.

In certain embodiments, if the random access procedure with 2-step RA type is not completed after a number of MSGA transmissions, then the UE (such as the UE 116) is configured to switch to CBRA with 4-step RA type.

For random access in a cell configured with a supplementary uplink (SUL), the network can explicitly signal which carrier to use (UL or SUL). Otherwise, the UE (such as the UE 116) selects the SUL carrier if and only if the measured quality of the DL is lower than a broadcast threshold. UE performs carrier selection before selecting between 2-step and 4-step RA type. The RSRP threshold for selecting between 2-step and 4-step RA type can be configured separately for UL and SUL. Once started, all uplink transmissions of the random access procedure remain on the selected carrier.

When carrier aggregation (CA) is configured, random access procedure with 2-step RA type is only performed on PCell while contention resolution can be cross-scheduled by the PCell.

Additionally, when CA is configured, for random access procedure with 4-step RA type, the first three steps of CBRA always occur on the PCell while contention resolution (step 4) can be cross-scheduled by the PCell. The three steps of a CFRA started on the PCell remain on the PCell. CFRA on SCell can only be initiated by the gNB to establish timing advance for a secondary TAG: the procedure is initiated by the gNB with a PDCCH order (step 0) that is sent on a scheduling cell of an activated SCell of the secondary TAG, preamble transmission (step 1) takes place on the indicated SCell, and Random Access Response (step 2) takes place on PCell.

In certain embodiments, random access preamble sequences, of four different lengths are supported. Sequence length 839 is applied with subcarrier spacings of 1.25 and 5 kHz, sequence length 139 is applied with subcarrier spacings of 15, 30, 60 and 120 kHz, and sequence lengths of 571 and 1151 are applied with subcarrier spacings of 30 kHz and 15 kHz respectively. Sequence length 839 supports unrestricted sets and restricted sets of Type A and Type B, while sequence lengths 139, 571, and 1151 support unrestricted sets only. Sequence length 839 is only used for operation with licensed channel access while sequence length 139 can be used for operation with either licensed or shared spectrum channel access. Sequence lengths of 571 and 1151 can be used only for operation with shared spectrum channel access.

Multiple PRACH preamble formats are defined with one or more PRACH OFDM symbols, and different cyclic prefix and guard time. The PRACH preamble configuration to use is provided to the UE in the system information. For example, a UE (such as the UE 116) calculates the PRACH transmit power for the retransmission of the preamble based on the most recent estimate pathloss and power ramping counter. The system information provides information for the UE to determine the association between the SSB and the RACH resources. The RSRP threshold for SSB selection for RACH resource association is configurable by network.

During the random access procedure, the following identities can also be used. A first identity, denoted as RA-RNTI, indicates that identification of the Random Access Response in the downlink. A second identity, denoted as Temporary C-RNTI, indicates that UE identification is temporarily used for scheduling during the random access procedure. A third identity, denoted as random value for contention resolution, indicates that UE identification is temporarily used for contention resolution purposes during the random access procedure.

There can a number of cases for a RAR/MsgB reception after a PRACH transmission. For example, when PRACH is based on CFRA for BFR and the UE (such as the UE 116) receives a PDCCH for RAR in the "recovery search space" with C-RNTI during time window, then the RA procedure is successfully completed. In another example, for other RA cases (i.e., expect for CFRA for BFR) and when the UE receives PDCCH for RAR with RA-RNTI and the UE (such as the UE 116) successfully decodes the RAR PDSCH in certain instances. For example, the UE successfully decodes the RAR PDSCH in a first instance, if the RAR PDSCH includes a back-off indicator (BI), the cell is overloaded, and the UE needs to back off from PRACH transmission for an indicated time duration. For another example, the UE successfully decodes the RAR PDSCH in a second instance, if the RAR PDSCH includes only the transmitted RA preamble ID (RAPID), the RA procedures is successfully completed. This applies e.g., to SI request, when the gNB is confirming a UE request for SI. For yet example, the UE successfully decodes the RAR PDSCH in a third instance, if the RAR PDSCH includes RAPID and a TA value and a RAR UL grant and a TC-RNTI, and if RA preamble was for CBRA, the UE applies the TA to the PCell/SCell that transmitted the PRACH and prepares the Msg3 PUSCH (including C-RNTI MAC-CE or BFR MAC-CE).

In case that a RAR monitoring time window expires and the UE does not receive a RAR, if the max configured number of PRACH transmissions has not been reached, the UE backs-off for a time duration, if applicable, then performs a new PRACH resource selection (including beam, RO, preamble, and power ramping if same beam), and transmits another PRACH. For example, HARQ operation is not supported for RAR reception. However, if a UE reaches a maximum number of configured PRACH transmissions for a RA procedure, then the RA procedure is unsuccessfully completed.

A UE (such as the UE 116) transmits Msg3 on uplink shared channel (UL-SCH) containing a C-RNTI, MAC coverage enhancement (CE), or common control channel (CCCH) service data unit (SDU), submitted from upper layer and associated with the UE Contention Resolution Identity, as part of a RA procedure. For example, CCCH SDU captures the UE contention resolution ID, for example by 6 octets/bytes.

In certain embodiments, there are a number of cases for Msg4 monitoring/reception after Msg3 transmission, or any possible number of HARQ retransmissions of Msg3, wherein the UE monitors PDCCH during the Contention Resolution time window. For example, if the UE (such as the UE 116) has a C-RNTI and receives a Msg4 PDSCH during a time window addressed to C-RNTI, then contention resolution is successfully completed. This can apply to a RA procedure triggered by, e.g., SpCell BFR, or PDCCH order, or MAC, or RRC. For another example, if the UE does not have a C-RNTI, for example the UE only has a TC-RNTI received in RAR, and the UE transmitted a Msg3 with a Contention Resolution ID and receives a Msg4 PDSCH addressed to TC-RNTI that includes a matching contention resolution ID, then contention resolution is successfully completed. Otherwise, the UE discards the TC-RNTI received in the RAR, and contention resolution is unsuccessful. For instance, if there is no match and the contention resolution timer expires, and the configured maximum number of PRACH transmissions is not reached, the UE transmits a new PRACH based on a new PRACH resource selection (for preamble, RO, SSB). If the configured maximum number of PRACH transmissions is reached, the UE can stop the procedure and indicate that a random access failure to higher layers in case of a 4-step RACH procedure while, for 2-step RACH, the UE falls back to 4-step RACH. A PDSCH scheduled after Msg3 transmission is referred to for brevity as Msg4, but it is understood that contention resolution can be provided by any PDSCH that the UE receives after transmission of a Msg3 PUSCH and not necessarily by the first such PDSCH.

The following embodiments of the present disclosure, denoted as E-1, describe multiple concurrent RA procedures. The following examples and embodiments, such as those of FIG. 6 describe multiple concurrent RA procedures.

Figure 6:
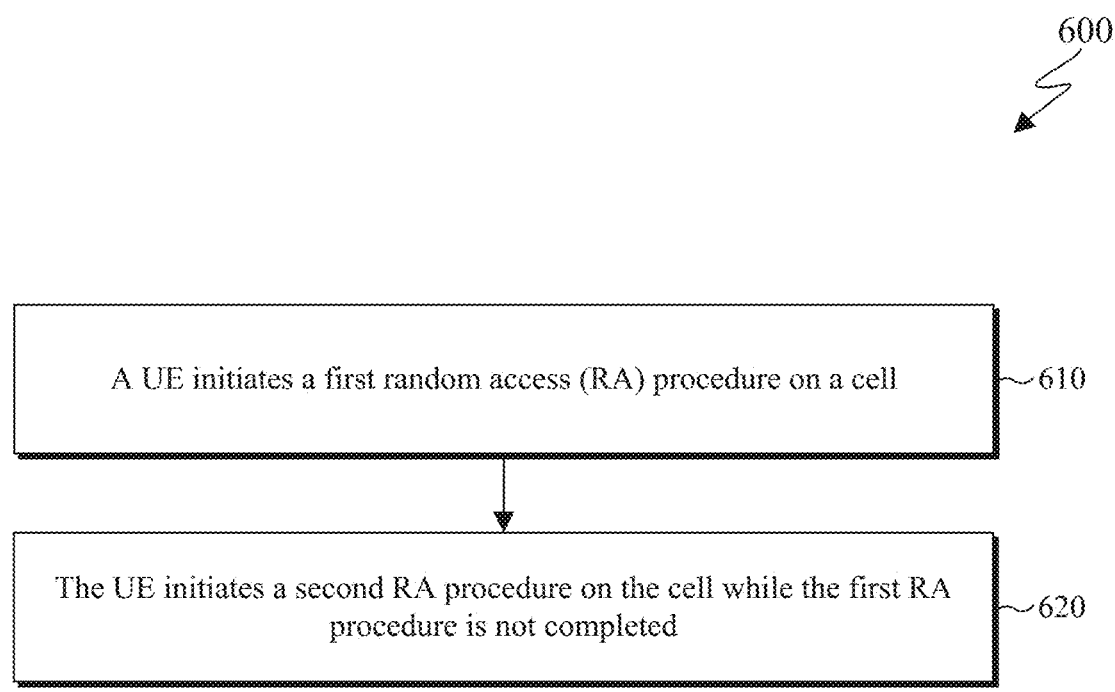
FIG. 6 illustrates an example method for two concurrent RA procedures according to embodiments of present disclosure.

FIG. 6 illustrates an example method for two concurrent RA procedures according to embodiments of present disclosure. The steps of the method 600 can be performed by any of the UEs 111-116 of FIG. 1, such as the UE 116 of FIG. 3. The method 600 is for illustration only and other embodiments can be used without departing from the scope of the present disclosure.

In certain embodiments, a UE (such as the UE 116) operates with two or multiple concurrent random access (RA) procedures. According to this embodiment, UE higher layers such as L2/L3, or gNB signaling such as PDCCH order, can initiate two or multiple concurrent RA procedures. For example, a first RA procedure can be initiated by UE higher layer such as L2/L3 and a second RA procedure can be concurrently initiated by gNB signaling such as a PDCCH order. The two or multiple concurrent RA procedures can be associated with a single PRACH trigger or can be associated with different PRACH triggers. The two or multiple concurrent RA procedures can be associated with a same (serving) cell or different (serving) cells. In one realization, there can/may be two or multiple RA procedures ongoing at any point in time in a MAC entity or a cell group. In another realization, there can/may be two or multiple RA procedures ongoing at any point in time in a single (serving) cell, such as a single (serving) cell of the MAC entity. For example, the UE can be in the RRC_CONNECTED state, while in another example, the UE can have two concurrent RA procedures that occur before RRC connection.

A first RA procedure and a second RA procedure are concurrent when the second RA procedure can start before the first RA procedure is completed. In one approach, if a new RA procedure is triggered while another RA procedure is ongoing in the MAC entity, the UE can continue with the ongoing procedure and also start the new RA procedure. In addition, a single random access trigger can initiate two or multiple concurrent RA procedures. In one example, if a third RA procedure is triggered while two concurrent RA procedures are ongoing in the MAC entity, it is up to UE implementation whether to continue with the two ongoing procedures or to stop one of the two ongoing procedures and start with the third procedure (e.g. for SI request).

There are various motivations supporting two or multiple concurrent RA procedures, such as increasing a connection probability, reducing an initial access time, and enhancing a PRACH reliability or coverage for the UE. Another motivation can be to receive UE-panel-specific or TRP-specific information, such as TA, system information, or higher layer configuration, such as RRC configuration. The operation of two concurrent RA procedures can apply in all frequency bands, and in particular for higher frequency bands where coverage or beam/link failure is more likely.

In one realization, a UE can alternate between two sets of PRACH transmission attempts, along with corresponding power ramp-up. The PRACH transmissions corresponding to the two sets/two RA procedures can be separate time/frequency resources, for example, time-multiplexed and/or frequency-multiplexed, such as in different RACH occasions (ROs) or in different slots or in different RBs/BWPs, or some or all of the PRACH transmissions can be overlapping in time or frequency or simultaneous, such as in same ROs.

As shown in the method 600 of FIG. 6, a UE (such as the UE 116) initiates a first random access (RA) procedure on a cell (step 610). In step 620, the UE initiates a second RA procedure on the cell while the first RA procedure is not completed.

In one example, the first RA procedure or the second RA procedure are initiated by a MAC entity in the UE or by RRC. In another example, the first or the second RA procedure can be initiated by a single or two PDCCH order(s). In one example, the UE initiates a first RA procedure in a MAC entity, and the UE initiates a second RA procedure in the MAC entity before the first RA procedure is completed. In one example, the cell can be a/the serving cell, e.g., when the UE is in RRC_CONNECTED state. Conversely, conventional operation supports only one ongoing RA process at any point in time in a MAC entity (e.g., associated with a cell group such as MCG or SCG).

In one example, the two or multiple RA procedures can be associated with a single trigger, at least when RA procedures are initiated for the CCCH logical channel such as when the trigger is for initial access to establish RRC connection or for connection resume by transitioning from RRC_INACTIVE state to RRC_CONNECTED state, or for connection re-establishment upon RLF, or possibly for reconfiguration with synch such as handover. In another example, the two or multiple concurrent RA procedures can be associated with two different triggers (in a same cell or in two different cells), at least for a UE in the RRC_CONNECTED state, such as when PRACH triggers are for uplink timing synchronization, on-demand system information (SI) request, scheduling request (SR) issue or failure, BFR, or LBT failure. For example, two or multiple concurrent RA procedures can provide the UE with two or multiple panel-specific or TRP-specific TA values.

In one example, the number of supported concurrent RA procedures is limited to two concurrent RA procedures. In another example, network signaling such as higher layer configuration can indicate a maximum number N>2 of supported concurrent RA procedures from a UE.

Support for two (or multiple) concurrent RA procedure can be defined as mandatory (with capability signaling) or optional (with capability signaling) for a UE in a certain release, such as NR Rel-18 or beyond. In one example, such support can be limited to UEs possessing or reporting a capability for such operation, wherein determination of the capability can be left to the UE without detailed requirements or conditions in the specifications. In another example, such support can be limited to UEs with certain UE capability, requirements or conditions, e.g. based on number of UE RF chain or number of uplink antenna panels, antenna arrays, or antenna sub-arrays, or number of PAs, or baseband processing capabilities or timelines, and so on. In one example, such support can be limited to UEs with two or multiple uplink/Tx panels. In another example, such support can also apply to single-Tx-panel UEs. In the specification text proposals provided throughout the present disclosure, the term "a UE with capability [2-PRACHs]" is used as an example terminology to refer to UEs that support multiple concurrent RA procedures—this term is merely used for fast reference purposes and any other term that implies the same intention may be used instead. In one example, a UE can report such capability to the network, or it may be transparent to the network. In one example, if a UE reports such capability to the network, the network can transmit corresponding configurations to the UE or set of UEs with such capabilities and the specification can refer to such UE(s) as one(s) that have received the corresponding configuration.

According to this embodiment, the two concurrent RA procedures for a UE can be on two different cells. The two concurrent RA procedures can occur when a UE is in RRC_CONNECTED state or before RRC connection. In one example, two or multiple concurrent RA procedures can be associated with a single cell. For example, the RA procedures are initiated for the common control channel (CCCH) logical channel such as when the trigger is for initial access to establish RRC connection or for connection resume by transitioning from RRC_INACTIVE state to RRC_CONNECTED state, or for connection re-establishment upon RLF, or possibly for reconfiguration with synch such as handover. In another example, two or multiple concurrent RA procedures can be associated with two different cells in a cell group (e.g., MCG or SCG). For example, for a UE in RRC_CONNECTED state, the RA procedures can be for UL timing synchronization, SI request, SR, BFR. For example, a UE can use two or multiple concurrent RA procedures to obtain corresponding two or multiple TA values for two or multiple cells or TRPs. In another realization, the UE may attempt two concurrent initial access procedures to establish RRC connection to two different cells.

In certain embodiments, RA procedures can be initiated by a PDCCH order, by the MAC entity itself, or by RRC for the events in accordance with TS 38.300 [2]. There can be one RA procedure ongoing at any point in time in a MAC entity for a UE without capability [2-PRACHs]. For a UE with a capability [2-panels/2-PRACHs], there can/may be up to two Random Access procedures ongoing at any point in time in a MAC entity, wherein the two procedures are associated with a same (serving) cell of the MAC entity. The Random Access procedure on an SCell shall only be initiated by a PDCCH order with ra-PreambleIndex different from 0b000000. If a new Random Access procedure is triggered while another is already ongoing in the MAC entity, for a UE without a capability [2-PRACHs], it is up to UE implementation whether to continue with the ongoing procedure or start with the new procedure (e.g. for SI request). For a UE with a capability [2-PRACHs], the UE continues with the ongoing procedure and also starts with the new procedure. For a UE with a capability [2-PRACHs], a single random access trigger can initiate two concurrent random access procedures. For a UE with a capability [2-PRACHs], if a third Random Access procedure is triggered while two concurrent procedures are already ongoing in the MAC entity, it is up to UE implementation whether to continue with the two ongoing procedures or to stop one of the two ongoing procedures and start with the third procedure (e.g. for SI request). The following UE variables can be used for the RA procedure: (i) PREAMBLE_INDEX; (ii) PREAMBLE_TRANSMISSION_COUNTER; (iii) PREAMBLE_POWER_RAMPING_COUNTER; (iv) PREAMBLE_POWER_RAMPING_STEP; (v) PREAMBLE_RECEIVED_TARGET_POWER; (vi) PREAMBLE_BACKOFF; (vii) PCMAX; (viii) SCALING_FACTOR_BI; (ix) TEMPORARY_C-RNTI; (x) RA_TYPE; (xi) POWER_OFFSET_2STEP_RA; and (xii) MSGA_PREAMBLE_POWER_RAMPING_STEP.

For a UE with a capability [2-PRACHs], the following UE variables can be used for a second concurrent Random Access procedure, if initiated. Unless otherwise noted, the second concurrent Random Access procedure is same as and separate from the first concurrent Random Access procedure using the corresponding UE variables from the following.

(i) PREAMBLE_INDEX_2; (ii) PREAMBLE_TRANSMISSION_COUNTER_2;
(iii) PREAMBLE_POWER_RAMPING_COUNTER_2;
(iv) PREAMBLE_POWER_RAMPING_STEP_2;
(v) PREAMBLE_RECEIVED_TARGET_POWER_2;
(vi) PREAMBLE_BACKOFF_2;
(vii) PCMAX_2; (viii) SCALING_FACTOR_BI_2; (ix) TEMPORARY_C-RNTI_2;
(x) RA_TYPE_2; (xi) POWER_OFFSET_2STEP_RA_2; and
(xii) MSGA_PREAMBLE_POWER_RAMPING_STEP_2.

Prior to initiation of a RA procedure in the physical-layer, that is, before the first PRACH transmission attempt, a UE measures and reports to higher layers (or possibly to the gNB) a signal quality such as a RSRP that corresponds to reference signals associated with PRACH transmission, such as a SSB or CSI-RS, or possibly UL RS such as an SRS. In one example, a UE with multiple transmitter panels measures and reports two or multiple sets of RSRP values corresponding to RSs associated with PRACH, such as for two or multiple sets of SSB RSRP reports, with each set of SSB RSRP values corresponding to each UE panel. In one example, the two sets of RSRP reports correspond to a same set of RSs, such as a same set of SSB indices. In another example, the two set of RSRP reports correspond to different sets of RSs, such as different sets of SSB indices, wherein an indication of SSB indices can be additionally provided in each report.

It is noted that there can be a number of cases regarding reference signals associated with two or multiple concurrent RA procedures. In one realization, two concurrent RA procedures are associated with different DL RSs, such as two different SSBs or two different CSI-RSs. In one example, a first RA procedure is associated with an SSB, while a second RA procedure is associated with a CSI-RS, wherein the CSI-RS is not QCL (Type-D) with the SSB. In another example, the CSI-RS associated with the second RA procedure can be QCL with the SSB associated with the first RA procedure. In another example, the two different DL RSs can correspond to a same TRP or two different TRPs, or a same cell or two different cells. In another example, the UE can receive the two different DL RSs using two different panels, or using a single panel but in different time/frequency resources. In another realization, two concurrent RA procedures can be associated with a same DL RS, such as a same SSB or a same CSI-RS, at least for the case that the two RA procedures correspond to two different UE panels, that may have same or different RSRP for the DL RS, and possibly use different spatial filters for DL RS reception and PRACH transmission.

In certain embodiments, prior to initiation of the physical random access procedure, Layer 1 receives from higher layers a set of SS/PBCH block indexes and provides to higher layers a corresponding set of RSRP measurements. For a UE with a capability [2-PRACHs], Layer 1 provides to higher layers two/multiple corresponding sets of RSRP measurements, each corresponding to one of UE's two/multiple antenna port groups.

In certain embodiments, prior to initiation of the physical random access procedure or until successful reception of a random access response (RAR)/until higher layers consider the Random Access procedure [successfully] completed as described in [11, TS 38.321], Layer 1 may receive from higher layers an indication to initiate/perform a second physical random access procedure as described in [11, TS 38.321]. For a UE with a capability [2-PRACHs] and performing two overlapping physical random access procedures, unless otherwise noted, the second physical random access procedure is same as and separate from the first physical random access procedure, would the second procedure have a same PRACH type as the first procedure.

For a UE with a capability [2-PRACHs] and performing two overlapping physical random access procedures, Layer 1 determines a first antenna port from a first antenna port group to transmit a first PRACH corresponding to the first physical random access procedure, and a second antenna port from a second antenna port group to transmit a second PRACH corresponding to the second physical random access procedure.

For a UE with a capability [2-PRACHs] and performing two overlapping physical random access procedures, the UE/Layer 1 does not expect to be provided by higher layers a same SS/PBCH block index for both random access procedures.

For a PRACH transmission triggered upon request by higher layers, a value of ra-OccasionList [12, TS 38.331], if csirs-ResourceList is provided, indicates a list of PRACH occasions for the PRACH transmission where the PRACH occasions are associated with the selected CSI-RS index indicated by csi-RS. The indexing of the PRACH occasions indicated by ra-OccasionList is reset per association pattern period.

For a UE with a capability [2-PRACHs] performing two concurrent physical random access procedures, if ssb-ResourceList is provided, the UE/Layer 1 does not expect that a same SS/PBCH block index is selected for both random access procedures.

For a PRACH transmission triggered upon request by higher layers of a UE with a capability [2-PRACHs] performing two concurrent physical random access procedures, if csirs-ResourceList is provided, the UE does not expect that a same CSI-RS index indicated by csi-RS is selected for both random access procedures.

For a UE with a capability [2-PRACHs] performing two concurrent physical random access procedures, if both ssb-ResourceList and csirs-ResourceList are provided, and if a SS/PBCH block index is selected for a first procedure, the UE does not expect that a CSI-RS index indicated by csi-RS is selected for a second procedure if the indicated CSI-RS is quasi-co-located Type-D with the SS/PBCH block.

In certain embodiments, each of the multiple RA procedures can be configured or indicated to operate with repetitions, such as PRACH repetitions, or RAR/MsgB reception with repetitions, Msg3/MsgA PUSCH repetitions, or Msg4 repetitions. The repetitions can be with or without UE-Tx beam cycling per number of repetitions such as half the total number of repetitions, or DL RS cycling or precoder cycling, and so on. For example, a SIB can indicate a number of repetitions, for one or more of the above channels, and corresponding RSRP ranges, and the UE can determine the associated number of repetitions based on a RSRP range that a RSRP that the UE measures belongs. Such cycling among multiple beams or RSs or precoders can be in an alternative manner or sequential/consecutive manner. For example, the UE performs one transmission or repetition associated with a first beam/RS/precoder, then one transmission or repetition associated with a second beam/RS/precoder, then another transmission or repetition associated with the first beam/RS/precoder, and then another transmission or repetition associated with the second beam/RS/precoder, and so on. In another example, the UE can perform all of a first number of transmissions or repetitions for a first beam/RS/precoder before performing all of a second number of transmissions or repetitions for a first beam/RS/precoder. In one example, there can be a beam/RS switching delay time when a UE needs to transmit a second/subsequent transmission or repetition with a beam/RS that is different from that used for a first/previous transmission or repetition.

In one example, for repetition of PRACH transmissions, the UE can be provided with an RO bundle by higher layers such as by system information or by dedicated configuration, wherein an RO bundle refers to a set/collection of multiple ROs that are jointly used for a PRACH transmission. For example, the UE transmits a same PRACH preamble format with multiple repetitions (using same or different UE-Tx beam(s)) in the set/collection of multiple ROs that belong to an RO bundle. The RO bundle can include multiple consecutive or non-consecutive valid ROs, wherein the UE determines a valid RO based on higher layer configuration, such as TDD DL/UL configuration, or SSB/CSI-RS configuration, and so on. The RO bundle can be associated with one or multiple DL/UL reference signals, such as one or multiple SSB(s), CSI-RS(s), or SRS(s), wherein the association can be based on a predetermined or higher layer configured mapping, based on a cycle or sequence/ordering of DL/UL reference signals.

In certain embodiments, a UE (such as the UE 116) with a single-panel or a multi-panel, can perform two or multiple sequential RA procedures, wherein the two RA procedures can have no overlap in time, but the procedures can be related such that one RA procedure provides information or assistance to the other RA procedure. For example, such two/multiple sequential RA procedures can be beneficial for establishing and maintaining multiple links. This feature can be based on a UE capability. In one variation, a first RA procedure can contain information for a second RA procedure (e.g. using a CFRA preamble). In a second variant, a first RA procedure is in licensed spectrum, a second RA procedure is in unlicensed/shared spectrum, wherein the first RA procedure provides information (e.g., LBT) for a second RA procedure.

Although FIG. 6 illustrates the method 600 various changes may be made to FIG. 6. For example, while the method 600 of FIG. 6 and is shown as a series of steps, various steps could overlap, occur in parallel, occur in a different order, or occur multiple times. In another example, steps may be omitted or replaced by other steps. For example, steps of the method 600 can be executed in a different order.

The following embodiments of the present disclosure, denoted as E-1-1, describe multiple concurrent RA procedures from multiple UE panels. The following examples and embodiments, such as those of FIGS. 7-9 describe multiple concurrent RA procedures.

Figure 7:
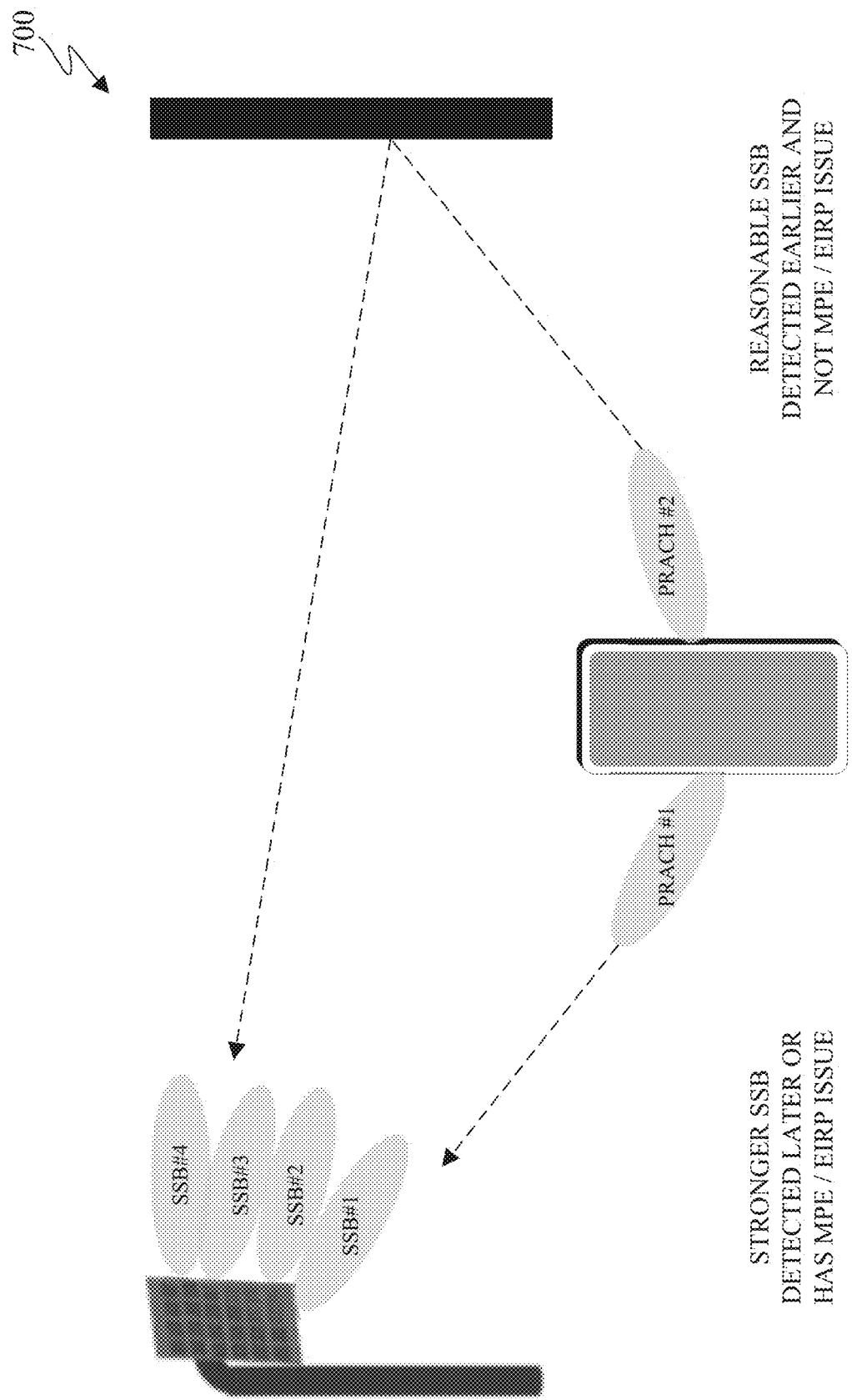
FIG. 7 illustrates a diagram of scenarios of two concurrent RA procedures using two antenna panels according to embodiments of present disclosure.
Figure 8:
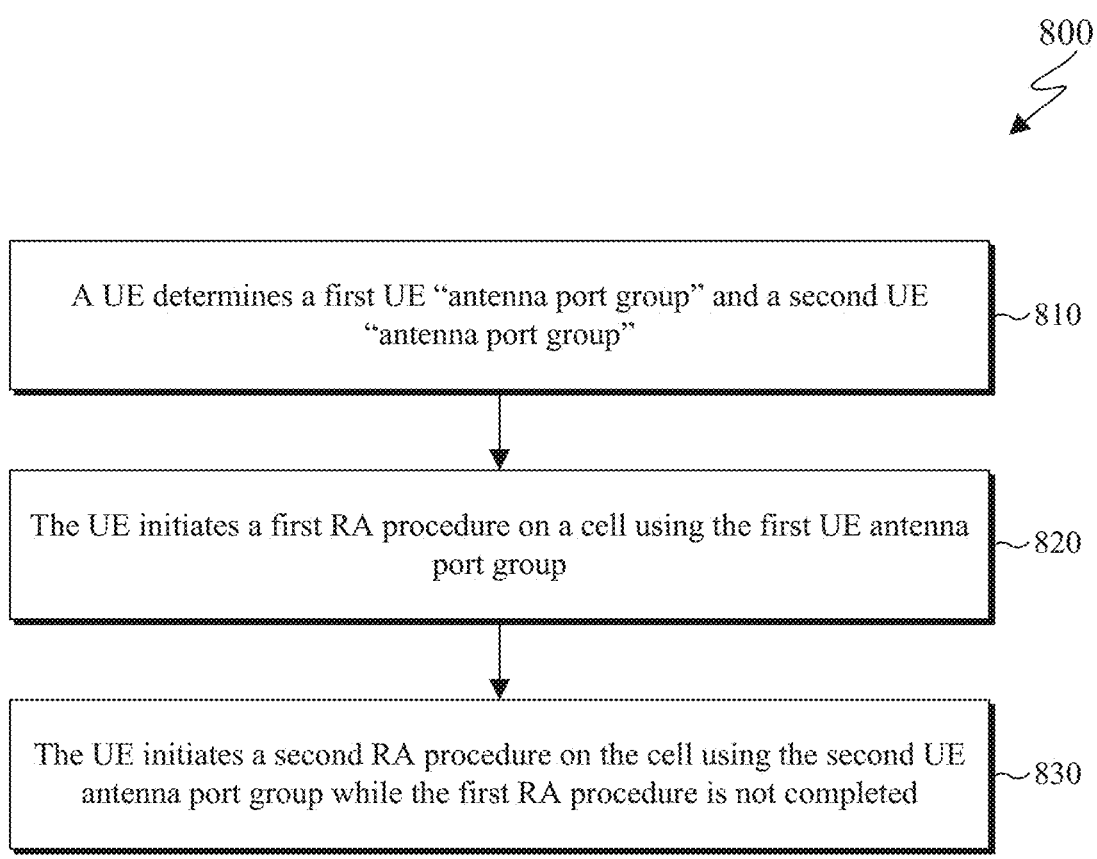
FIGS. 8 and 9 illustrate example method for multiple concurrent RA procedures for a multi-panel UE according to embodiments of present disclosure.
Figure 9:
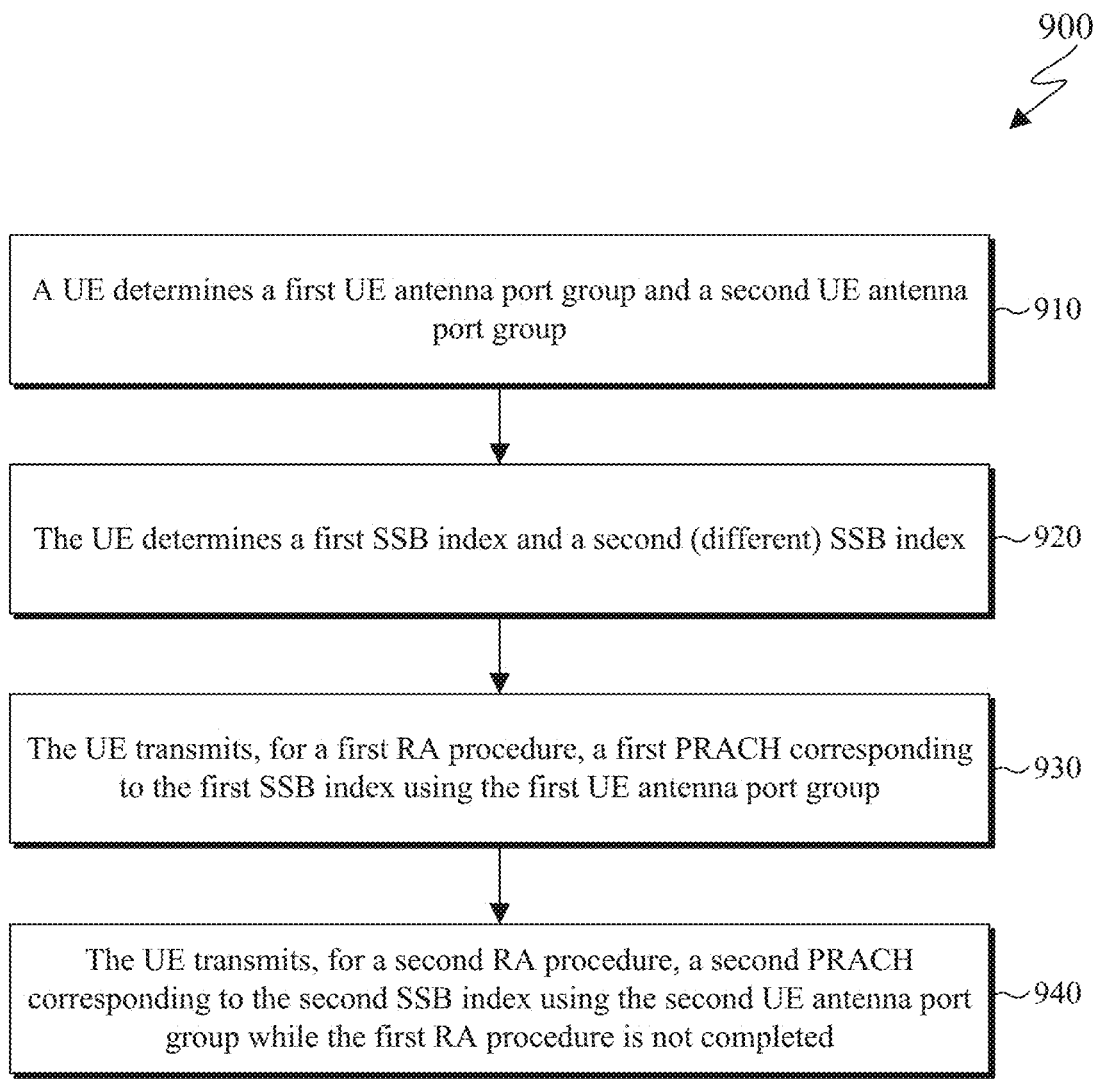

FIG. 7 illustrates a diagram 700 of scenarios of two concurrent RA procedures using two antenna panels according to embodiments of present disclosure. FIGS. 8 and 9 illustrate example method 800 and 900, respectively, for multiple concurrent RA procedures for a multi-panel UE according to embodiments of present disclosure. The steps of the methods 800 and 900 can be performed by any of the UEs 111-116 of FIG. 1, such as the UE 116 of FIG. 3. The methods 800 and 900 are for illustration only and other embodiments can be used without departing from the scope of the present disclosure.

In certain embodiments, a UE (such as the UE 116) with multiple antenna panels can perform two or more concurrent random access procedures. For example, a first UE panel can perform a first RA procedure and a second UE panel can perform a second RA procedure. The first and second RA procedures can include one or more the following steps: a corresponding set of PRACH transmission attempts with corresponding power ramping, a corresponding RAR/Msg-B monitoring, a corresponding Msg3/MsgA-PUSCH transmission, and a corresponding Msg4 monitoring for contention resolution.

The UE can perform the two or more RA procedures concurrently on the two or more UE panels. For example, the UE can monitor for a RAR/MsgB corresponding to a first RA procedure on a first panel, while the UE transmits PRACH corresponding to a second RA procedure on a second panel. For another example, the UE can monitor PDCCH for scheduling a first RAR/MsgB reception corresponding to a first RA procedure on a first panel while also monitoring PDCCH for scheduling a second RAR/MsgB reception corresponding to a second RA procedure on a second panel.

The UE can perform the two or more concurrent RA procedures on the two or more UE panels based on a same RS or based on different RSs. It is noted that an RS associated with the RA procedure or PRACH can be a DL RS such as a SSB or a CSI-RS, or possibly an UL RS such as an SRS. For example, a first UE panel can transmit a first PRACH of a first RA procedure associated with a first SSB. Here, the first SSB is detected/determined by the first UE panel, while a second UE panel can transmit a second PRACH of a second RA procedure associated with a second SSB, wherein the second SSB is detected/determined by the second UE panel, wherein the first SSB is different from the second SSB.

A usage of multiple UE panels for multiple concurrent RA procedures can be beneficial in various scenarios. For example, due to (i) MPE issues (ii) different link/SSB quality for two panels.

The diagram 700 of FIG. 7, FIG. 5 shows example scenarios when two concurrent RA procedures using two UE antenna panels can be beneficial. For example, a first UE-panel detects a first SSB or a first (periodic or semi-persistent) CSI-RS with sufficient quality, such as with a corresponding RSRP above a first threshold and transmits a first PRACH associated with the first SSB or CSI-RS. A second UE-panel detects a second SSB or a second (P/SP) CSI-RS with sufficient quality, such as a corresponding RSRP above the first threshold or above a second threshold that can be, for example, larger than the first threshold by a signaled value, and transmits a second PRACH associated with the second SSB or CSI-RS. The two SSBs or CSI-RSs may be detected concurrently or in different times. In one realization, both UE panels can detect a same SSB or a same CSI-RS, for example using two different reception paths for the SSB or CSI-RS to the two panels, and therefore measure different RSRP values for a same RS.

For another example, a first UE panel detects a first SSB or a first (periodic or semi-persistent) CSI-RS with sufficient quality, such as with a corresponding RSRP value above a first threshold or above a second threshold, wherein the second threshold is larger than the first threshold and transmits a first PRACH associated with the first SSB or CSI-RS. However, the UE cannot transmit the first PRACH with large power because the first panel needs to set a smaller value of panel-specific output power, such as a reduced $P_{CMAX,g,f,c}(i)$ with g=0, for example due to MPE or lower EIRP for the first panel. Conversely, a second UE panel detects a second SSB or a second (P/SP) CSI-RS with sufficient quality, such as with a corresponding RSRP value above the first threshold and transmits a second PRACH associated with the second SSB or CSI-RS. In this case, the first panel can transmit PRACH with large power since the second panel can set a larger value of panel-specific output power, such as a higher $P_{CMAX,g,f,c}(i)$ for a second panel with g=1, for example due to having no MPE or having higher EIRP for the second panel. According to this example, $P_{CMAX,g,f,c}(i)$ can be the UE configured maximum output power for carrier f of serving cell c within transmission occasion i when using one or more antenna ports from a panel or antenna port group g. According to this example, EIRP can refer to a peak/average/maximum/minimum EIRP for the UE or UE panel in a certain angle or direction such as the angle/direction towards which the UE transmits. In one example, the UE can have a heterogeneous antenna structure that leads to different RSRPs for DL RS reception or different UL transmit power for uplink transmissions, such as for PRACH transmissions, from different UE panels.

In this example and throughout the present disclosure, when referring to "MPE", the intention is incidents or events when an uplink transmission from a UE or a UE panel with a target power level would violate regulatory requirements related to radiation absorption or exposure such as SAR or MPE, and the UE or UE panel therefore needs to back-off from the target power level, for example by setting a non-zero or large value for P-MPR or other related back-off terms in the power control formula, and use a smaller output power such as a smaller $P_{CMAX,f,c}(i)$ or smaller $P_{CMAX,g,f,c}(i)$ or a smaller uplink transmit power for each panel/antenna port group g, for g=0, 1, 2, . . . , N−1, where N is the number of UE transmitter panels. In one example, an MPE event refers to a case wherein a computed transmission power, such as for PRACH, would exceed $P_{CMAX,f,c}(i)$ or $P_{CMAX,g,f,c}(i)$, where applicable, so that the actual/allowed transmission power is limited by $P_{CMAX,f,c}(i)$ or $P_{CMAX,g,f,c}(i)$, and in turn, by power back-off terms such as P-MPR or by antenna array gain such as a corresponding EIRP.

In one realization, a linkage between the multiple UE panels with the multiple concurrent RA procedures is maintained throughout the random access procedure. For example, a same panel that is used for PRACH transmission of a first RA procedure is also used for the corresponding next steps such as for a corresponding RAR/MsgB reception, or for a Msg3/MsgA-PUSCH transmission, or for a Msg4 reception for the first RA procedure.

In another realization, a linkage among multiple UE panels and multiple concurrent RA procedures can change during a random access procedure. For example, a first panel can be used for PRACH transmission for a first RA procedure and a second panel can be used for one or more of the next steps, such as Msg2 reception, Msg3 transmission, or Msg4 reception. In one example, the second panel can be the same panel that was used for PRACH transmission of the second RA procedure.

For example, a same or similar Tx panel can be used for transmission steps of a RA procedure, such as for PRACH transmission and Msg3 PUSCH/MsgA PUSCH transmission, while a same Rx panel can be used for reception steps of the same RA procedure, such as for RAR/MsgB or Msg4 reception, wherein the Tx panel can be different from the Rx panel.

The method 800 of FIG. 8 describes flowchart for multiple concurrent RA procedures for a multi-panel UE. In step 810 a UE (such as the UE 116) determines a first UE "antenna port group" and a second UE "antenna port group." The term "antenna port group" refers to a UE panel, as introduced and explained earlier in the disclosure. Other terms can be used to refer to a UE panel such as an uplink transmission entity (UTE) and the like, or an association can be used among different UE panels with different groups/sets of DL/UL RSs. In step 820, the UE initiates a first RA procedure on a cell using the first UE antenna port group, 620. In step 830, the UE initiates a second RA procedure on the cell using the second UE antenna port group while the first RA procedure is not completed. It is noted that in the method 800, the term "using a first/second antenna port group" is used to capture one or more of the steps in a RA procedure such as PRACH transmission or Msg3/MsgA PUSCH transmission using the panel, or Msg2/MsgB/Msg4 reception.

For example, the UE can determine and use a fixed antenna port from a UE panel/antenna port group for a RA procedure such as for all PRACH transmission attempts, or the UE can determine and use different antenna ports from a UE panel/antenna port group for the RA procedure such as for different PRACH transmission attempts.

For another example, a PRACH transmission can use a single antenna port or two/multiple antenna ports (referred to as, a multi-port PRACH transmission). The set of two or more antenna ports determined and used for a multi-port PRACH transmission can be fixed for all PRACH transmission attempts of a RA procedure or can be different for different PRACH transmission attempts of the RA procedure. When a UE performs a multi-port RPACH transmission, the UE can additionally perform PRACH transmission with or without repetitions and with or without analog Tx beam/spatial filter cycling, digital precoder cycling, or DL RS cycling, and the like.

In certain embodiments, the method 800 can be extended to cover the case that the two RA procedures originated by two UE panels correspond to two different cells (within a MAC entity, or cell group, MCG or SCG, or in different cell groups).

In one realization, a UE (such as the UE 116) determines a first UE antenna port group and a second UE antenna port group. Accordingly, the UE initiates a first RA procedure and a second RA procedure on a cell using the first UE antenna port group and the second UE antenna port group.

In one realization, an association of PRACHs with reference signals such as DL RS (SSB or CSI-RS), or UL RS (SRS) can be considered. In one example, the multiple concurrent RA procedures originated by multiple UE panels can correspond to same or different RSs, such as same or different SSB indices. The two RSs, such as the two SSBs, can correspond to a same cell or to different cells.

The method 900 of FIG. 9 describes flowchart for multiple concurrent RA procedures for a multi-panel UE, where association of RA procedures with DL RS such as SSBs is considered. In step 910 a UE (such as the UE 116) determines a first UE antenna port group and a second UE antenna port group.

In step 920, the UE determines a first SSB index and a second (different) SSB index. In certain embodiments, a UE determination of the first and second SSB indices can be based on UE detection of the corresponding SSBs, such as with SSB RSRP above a threshold, or can be based on gNB indication to the UE about the corresponding SSBs, such as using a PDCCH order. The SSBs can be determined at a same time or at different times. For example, the first SSB is determined by the first panel/antenna port group, and the second SSB is determined by the second panel/antenna port group. For another example, the first SSB or the second SSB can be determined at both panels, and the UE determines a panel for first or second PRACH transmission based on a predefined rule. For instance, a PRACH associated with a lower index SSB can be transmitted on a lower index panel and a PRACH associated with a higher index SSB can be transmitted on a higher index panel. It is also possible that a UE determines the panel based on an indication by the gNB, for example by higher layer signaling or by PDCCH order or based on UE implementation.

In step 930, the UE transmits, for a first RA procedure, a first PRACH corresponding to the first SSB index using the first UE antenna port group. In step 940, the UE transmits, for a second RA procedure, a second PRACH corresponding to the second SSB index using the second UE antenna port group while the first RA procedure is not completed.

For example, when a first PRACH transmission for a first RA procedure is associated with a first CSI-RS and a second PRACH transmission for a second concurrent RA procedure is associated with a second CSI-RS, such as for contention-free RA (CFRA) or for link failure recovery (also known as beam failure recovery procedure "BFR"), then in one option, the first CSI-RS and the second CSI-RS can be QCL (Type-D) with a first SSB and a second SSB, wherein the first and second SSBs are different, while in another option, the first CSI-RS and the second CSI-RS can be QCL (Type-D) with a same SSB.

Syntax (1) below describes an example that when the selected RA_TYPE is set to 4-stepRA, the MAC entity shall perform the following process.

Syntax (1)

1> if the Random Access procedure was initiated for SpCell beam failure recovery (as specified in clause 5.17); and
1> if the beamFailureRecoveryTimer (in clause 5.17) is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidate-BeamRSList or the CSI-RSs with CSI-RSRP above rsrp-ThresholdCSI-RS amongst the CSI-RSs in candidateBeamRSList is available:
  2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
  2> if CSI-RS is selected, and there is no ra-PreambleIndex associated with the selected CSI-RS:
    3> set the PREAMBLE_INDEX to a ra-PreambleIndex corresponding to the SSB in candidateBeamRSList which is quasi-co-located with the selected CSI-RS as specified in TS 38.214 [7].
  2> else:
    3> set the PREAMBLE_INDEX to a ra-PreambleIndex corresponding to the selected SSB or CSI-RS from the set of Random Access Preambles for beam failure recovery request.
  2> if the UE has a capability [2-PRACHs] and is performing a second concurrent RA procedure, and if at least one of the SSBs, different from the [first] selected SSB, with SS-RSRP above rsrp-ThresholdSSB amongst the SSBs in candidateBeamRSList or the CSI-RSs, different from the [first] selected CSI-RS, with CSI-RSRP above rsrp-ThresholdCSI-RS amongst the CSI-RSs in candidateBeamRSList is available
    3> select a second SSB, different from the [first] selected SSB, with SS-RSRP above rsrp-ThresholdSSB amongst the SSBs in candidateBeamRSList or a second CSI-RS, different from the [first] selected CSI-RS, with CSI-RSRP above rsrp-ThresholdCSI-RS amongst the CSI-RSs in candidateBeamRSList;
    3> if a second CSI-RS is selected, and there is no ra-PreambleIndex associated with the second selected CSI-RS:

4> set the PREAMBLE_INDEX_2 to a ra-PreambleIndex corresponding to the SSB in candidateBeamRSList which is quasi-colocated with the second selected CSI-RS as specified in TS 38.214 [7].
   3> else:
    4> set the PREAMBLE_INDEX_2 to a ra-PreambleIndex corresponding to the second selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
   2> set the PREAMBLE_INDEX to the signaled ra-PreambleIndex;
   2> select the SSB signaled by PDCCH;
   2> select the antenna port group signaled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
   2> select an SSB with SS-RSRP above rsrp-ThresholdSSB amongst the associated SSBs;
   2> set the PREAMBLE_INDEX to a ra-PreambleIndex corresponding to the selected SSB.
   2> if the UE has a capability [2-PRACHs] and is performing a second concurrent RA procedure, and if at least one SSB, different from the [first] selected SSB, with SS-RSRP above rsrp-ThresholdSSB amongst the associated SSBs is available:
    3> select a second SSB, different from the [first] selected SSB, with SS-RSRP above rsrp-ThresholdSSB amongst the associated SSBs;
    3> set the PREAMBLE_INDEX_2 to a ra-PreambleIndex corresponding to the second selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
   2> select a CSI-RS with CSI-RSRP above rsrp-ThresholdCSI-RS amongst the associated CSI-RSs;
   2> set the PREAMBLE_INDEX to a ra-PreambleIndex corresponding to the selected CSI-RS.
   2> if the UE has a capability [2-PRACHs] and is performing a second concurrent RA procedure, and if at least one CSI-RS, different from the [first] selected CSI-RS, with CSI-RSRP above rsrp-ThresholdCSI-RS amongst the associated CSI-RSs is available:
    3> select a second CSI-RS, different from the [first] selected CSI-RS, with CSI-RSRP above rsrp-ThresholdCSI-RS amongst the associated CSI-RSs;
    3> set the PREAMBLE_INDEX_2 to a ra-PreambleIndex corresponding to the second selected CSI-RS.
1> else if the Random Access procedure was initiated for SI request (as specified in TS 38.331 [5]); and
1> if the Random Access Resources for SI request have been explicitly provided by RRC:
   2> if at least one of the SSBs with SS-RSRP above rsrp-ThresholdSSB is available:
    3> select an SSB with SS-RSRP above rsrp-ThresholdSSB.
   2> else:
    3> select any SSB.
   2> select a Random Access Preamble corresponding to the selected SSB, from the Random Access Preamble(s) determined according to ra-PreambleStartIndex as specified in TS 38.331 [5];
   2> set the PREAMBLE_INDEX to selected Random Access Preamble.
   2> if the UE has a capability [2-PRACHs] and is performing a second concurrent RA procedure, and
    3> if at least one of the SSBs, different from the [first] selected SSB, with SS-RSRP above rsrp-ThresholdSSB is available:
     4> select a second SSB, different from the [first] selected SSB, with SS-RSRP above rsrp-ThresholdSSB.
    3> else:
     4> select any [second] SSB, different from the [first] selected SSB.
    3> select a Random Access Preamble corresponding to the second selected SSB, from the Random Access Preamble(s) determined according to ra-PreambleStartIndex as specified in TS 38.331 [5];
    3> set the PREAMBLE_INDEX_2 to selected Random Access Preamble.
1> else (i.e. for the contention-based Random Access preamble selection):
   2> if at least one of the SSBs with SS-RSRP above rsrp-ThresholdSSB is available:
    3> select an SSB with SS-RSRP above rsrp-ThresholdSSB.
   2> else:
    3> select any SSB.
   2> if the UE has a capability [2-PRACHs] and is performing a second concurrent RA procedure, and
    3> if at least one of the SSBs, different from the [first] selected SSB, with SS-RSRP above rsrp-ThresholdSSB is available:
     4> select a second SSB, different from the [first] selected SSB, with SS-RSRP above rsrp-ThresholdSSB.
    3> else:
     4> select any [second] SSB, different from the [first] selected SSB.

Syntax (2) below describes an example that when the selected RA_TYPE is set to 2-stepRA, the MAC entity shall perform the following process.

Syntax (2)
1> if the contention-free 2-step RA type Resources associated with SSBs have been explicitly provided in rach-ConfigDedicated and at least one SSB with SS-RSRP above msgA-RSRP-ThresholdSSB amongst the associated SSBs is available:
   2> select an SSB with SS-RSRP above msgA-RSRP-ThresholdSSB amongst the associated SSBs;
   2> set the PREAMBLE_INDEX to a ra-PreambleIndex corresponding to the selected SSB.
   2> if the UE has a capability [2-PRACHs] and is performing a second concurrent RA procedure, and if at least one SSB, different from the [first] selected SSB, with SS-RSRP above msgA-rsrp-ThresholdSSB amongst the associated SSBs is available:
    3> select a second SSB, different from the [first] selected SSB, with SS-RSRP above msgA-rsrp-ThresholdSSB amongst the associated SSBs;
    3> set the PREAMBLE_INDEX_2 to a ra-PreambleIndex corresponding to the second selected SSB.

1> else (i.e. for the contention-based Random Access Preamble selection):
  2> if at least one of the SSBs with SS-RSRP above msgA-RSRP-ThresholdSSB is available:
    3> select an SSB with SS-RSRP above msgA-RSRP-ThresholdSSB.
  2> else:
    3> select any SSB.
  2> if the UE has a capability [2-PRACHs] and is performing a second concurrent RA procedure, and
    3> if at least one of the SSBs, different from the [first] selected SSB, with SS-RSRP above msgA-rsrp-ThresholdSSB is available:
      4> select a second SSB, different from the [first] selected SSB, with SS-RSRP above msgA-rsrp-ThresholdSSB.
    3> else:
      4> select any [second] SSB, different from the [first] selected SSB.

Although FIG. 8 illustrates the method 800 and the FIG. 9 illustrates the method 900 various changes may be made to FIGS. 8 and 9. For example, while the method 800 and the method 900 are shown as a series of steps, various steps could overlap, occur in parallel, occur in a different order, or occur multiple times. In another example, steps may be omitted or replaced by other steps. For example, steps of the method 800 and the method 900 can be executed in a different order.

The following embodiments of the present disclosure, denoted as E-1-2, describe selecting a single or dual PRACH operation.

In the above examples, the UE can determine one or two SSB(s)/CSI-RS(s) as the first and second DL RS for the two concurrent PRACH procedures based on RSRP measurements performed in two different UE panels. For example, the UE can use each UE panel's RSRP measurements for determination of a corresponding DL RS. In one example, when a UE measures a first RSRP for an SSB/CSI-RS on a first UE panel and a second RSRP for the same SSB/CSI-RS on a second panel, the UE can use the corresponding RSRP measurement for determination of a DL RS associated with the RA procedure. In one example, the UE can use a same RSRP threshold for both UE panel or both DL RSs or both concurrent RA procedures. In another example, the UE can use different RSRP thresholds for the two panels or the two RA procedures. For example, the UE can be provided a second threshold or a residual threshold for determination of a DL RS for the second panel or the second concurrent RA procedure, which can be greater than the first RSRP threshold. In one example, the UE does not initiate the second RA procedure if there is no DL RS available with an RSRP above the (first or second) threshold. In another example, when there is no DL RS available with an RSRP above the (first or second) threshold, the UE can initiate the second concurrent RA procedure and, in one option, the UE selects a same DL RS that the UE used for the first RA procedure, or in a second option, the UE can select any DL RS for the second RA procedure.

In certain embodiments, a UE (such as the UE 116) can determine whether to perform a single RA procedure at any given time or perform two/multiple concurrent RA procedures based on a condition. Such condition can be one or more of a UE capability, an absolute or a relative RSRP condition, an absolute or a relative MPE/P-MPR condition, an absolute or a relative EIRP condition, and the like.

In one example, selection of two/multiple concurrent RA procedures may need a UE capability, so that only UEs reporting such capability can select to perform two concurrent RA procedures. A UE without such capability performs a single RA procedure at any in time. For example, the corresponding UE capability can be related to having two or more (non-collocated) antenna panels (with sufficient spatial separation) or can be related to a (maximum) number of supported antenna ports or antenna port groups or MIMO layers or SRS resource sets, and so on. In one example, such as before RRC configuration or establishing dedicated signaling, there is no need for reporting the corresponding UE capability, and a UE that possesses such capability (such as per certification testing) can select to perform two concurrent RA procedures.

For another example, a UE (such as the UE 116) can determine to perform two concurrent RA procedures based on an absolute RSRP (or pathloss) threshold. For instance, the UE can perform two concurrent RA procedures if two DL RSs associated with the two RA procedures, such as two SSBs or two CSI-RSs, both have an RSRP above/below a threshold, wherein a threshold value is provided by higher layer signaling. According to this example, when one of the two SSBs or CSI-RSs has a measured RSRP that is larger/smaller than the configured absolute RSRP threshold, the UE determines to perform a single RA procedure that is associated with the one SSB. Instead of using an RSRP, similar methods can apply by using one or more of: an absolute MPE value corresponding to each UE panel, or an absolute P-MPR assigned to/determined for each UE panel, or absolute EIRP or TRP value configured/determined for each UE panel.

In one example, the UE can select to perform a second concurrent RA procedure when the UE determines that a first RSRP for a first DL RS associated with the first RA procedure is below a RSRP threshold, and when the UE determines a second (or the first) DL RS that has a second RSRP greater than the RSRP threshold. Similarly, the UE can select to perform a second concurrent RA procedure when the UE determines that a first MPE corresponding to the first RA procedure (such as a first MPE level for a corresponding PRCAH transmission) is above a MPE threshold, and when the UE determines a second (or the first) DL RS that has a second MPE level (for example, for the corresponding PRACH transmission) less than the MPE threshold. In one example, the UE can select to perform a second concurrent RA procedure when the UE determines that a first target/determined PRCAH transmission power is above a corresponding $P_{CMAX,f,c}(i)$ or $P_{CMAX,g,f,c}(i)$, whichever applicable, and when the UE determines a second target/determined PRCAH transmission power is below a corresponding $P_{CMAX,f,c}(i)$ or $P_{CMAX,g,f,c}(i)$. In another example, the UE can select to perform a second concurrent RA procedure when the UE determines that a 'PRACH power headroom (PH)' for a first RA procedure is smaller than a greater PRACH PH for a second RA procedure. Herein, PRACH PH refers to a difference of a computed PRACH power and a configured maximum output power corresponding $P_{CMAX,f,c}(i)$ or $P_{CMAX,g,f,c}(i)$, whichever applicable. Therefore, the PRACH PH can be described as $P_{CMAX,f,c}(i)-\{P_{PRACH,target,f,c}+PL_{b,f,c}\}$ or as $P_{CMAX,g,f,c}(i)-\{P_{PRACH,target,f,c}+PL_{g,b,f,c}\}$, which can be positive, zero, or negative. Herein, a computed PRACH power is based on target received power for PRACH preamble, PRACH power ramping, and pathloss measurement corresponding to DL RS associated with PRACH transmission. Herein, $P_{CMAX,f,c}(i)$ or $P_{CMAX,g,f,c}(i)$ take into account antenna array gain such as EIRP, as well as power back-off terms such as P-MPR due to MPE issues, that can be different for the two RA procedures or corresponding UE panels. In one example, the UE can use different thresholds for the two RA procedures, such as first and second RSRP thresholds, or first and second MPE (or P-MPR) thresholds. In one example, the UE can select to perform a second concurrent RA procedure when the UE determines that a first pathloss measurement for a first DL RS associated with a first RA procedure is smaller than a second pathloss measurement for a second DL RS associated with a second RA procedure. In one example, the UE can select to perform a second concurrent RA procedure when the UE determines that a first configured maximum output power $P_{CMAX,g,f,c}(i)$ for g=0 associated with a first RA procedure is smaller than a second configured maximum output power $P_{CMAX,g,f,c}(i)$ for g=1 associated with a second RA procedure. In one example, the UE can select to perform a second concurrent RA procedure when the UE determines that a first transmit power for a first PRACH transmission corresponding to a first RA procedure is smaller than a second transmit power for a second PRACH transmission power corresponding to a second RA procedure. The first/second transmit power can include or exlude a corresponding power ramping. In one example, the UE can select to perform a second concurrent RA procedure based on a combination of some of aforementiomed conditions.

For another example, a UE (such as the UE 116) can determine to perform two concurrent RA procedures based on a relative RSRP (or pathloss) threshold. For instance, the UE can perform two concurrent RA procedures if two DL RSs associated with the two RA procedures, such as two SSBs or two CSI-RSs, have a RSRP difference that is above (or below) a threshold value, wherein the threshold value is provided by higher layer signaling; otherwise, the UE determines to perform a single RA procedure. Instead of using the RSRP, similar methods can apply by using one or more of: a relative or difference MPE value corresponding to pair of UE panels, or a relative or difference P-MPR assigned to/determined for a pair of UE panels, or a relative or difference EIRP or TRP value configured/determined for a pair of UE panels.

In one example, the UE can be provided separate thresholds, such as a first RSRP/MPE threshold and a second RSRP/MPE threshold, for the two concurrent RA procedures.

For another example, the methods described above apply when the two concurrent RA procedures correspond to a single PRACH trigger and performing a second concurrent RA procedure is always allowed when a UE receives or determines a different/new PRACH trigger.

For another example, the methods described above also apply when the two concurrent RA procedures correspond to different PRACH triggers and initiation of two concurrent RA procedure is only allowed if some of conditions described earlier are met. In one example, determination of single or two concurrent RA procedure(s) can be up to UE implementation, in general, or when some of the conditions described earlier are not met.

For yet another example, a UE (such as the UE 116) can perform one or two RA procedures based on higher layer configuration e.g., SIB or dedicated RRC configuration. In another example, the UE can perform one or two RA procedures based on UE power consumption, e.g., if UE wishes to conserve power (such as operating in a low power mode) it can use a single RA procedure. In one example, the UE performs one or two RA procedures based on indication via PDCCH order.

For example, the UE can be restricted from performing two concurrent RA procedures when the UE's RA performance is not materially impacted by performing only a single PRACH procedure. For example, a capable UE should not consume the system's RA resources when the UE has no RSRP or MPE or EIRP issues and so on. For example, if the UE determines a first DL RS with very high RSRP, such as above a third threshold (that can be greater than the first/second RSRP threshold), the UE is not allowed to perform a second RA procedure. For example, if the UE determines a first DL RS with very high RSRP, such as above a third threshold (that is greater than the first/second RSRP threshold), and the UE has no MPE issues for the first RA procedure (such as when MPE for corresponding PRACH transmission is below a threshold), the UE is not allowed to perform a second RA procedure.

In one example, for a UE capable of two concurrent RA procedures, when some of the conditions described above are not met, such as when there are no two different DL RS s available with RSRP above threshold, the UE can select to perform two concurrent RA procedures and associated with a same DL RS.

The following embodiments of the present disclosure, denoted as E-2, describe a timeline for initiation and stopping multiple concurrent RA procedures. This can include a cut-off upon a successful RAR reception. The following examples and embodiments, such as those of FIG. 10 describe multiple concurrent RA procedures with a cut-off time.

Figure 10:
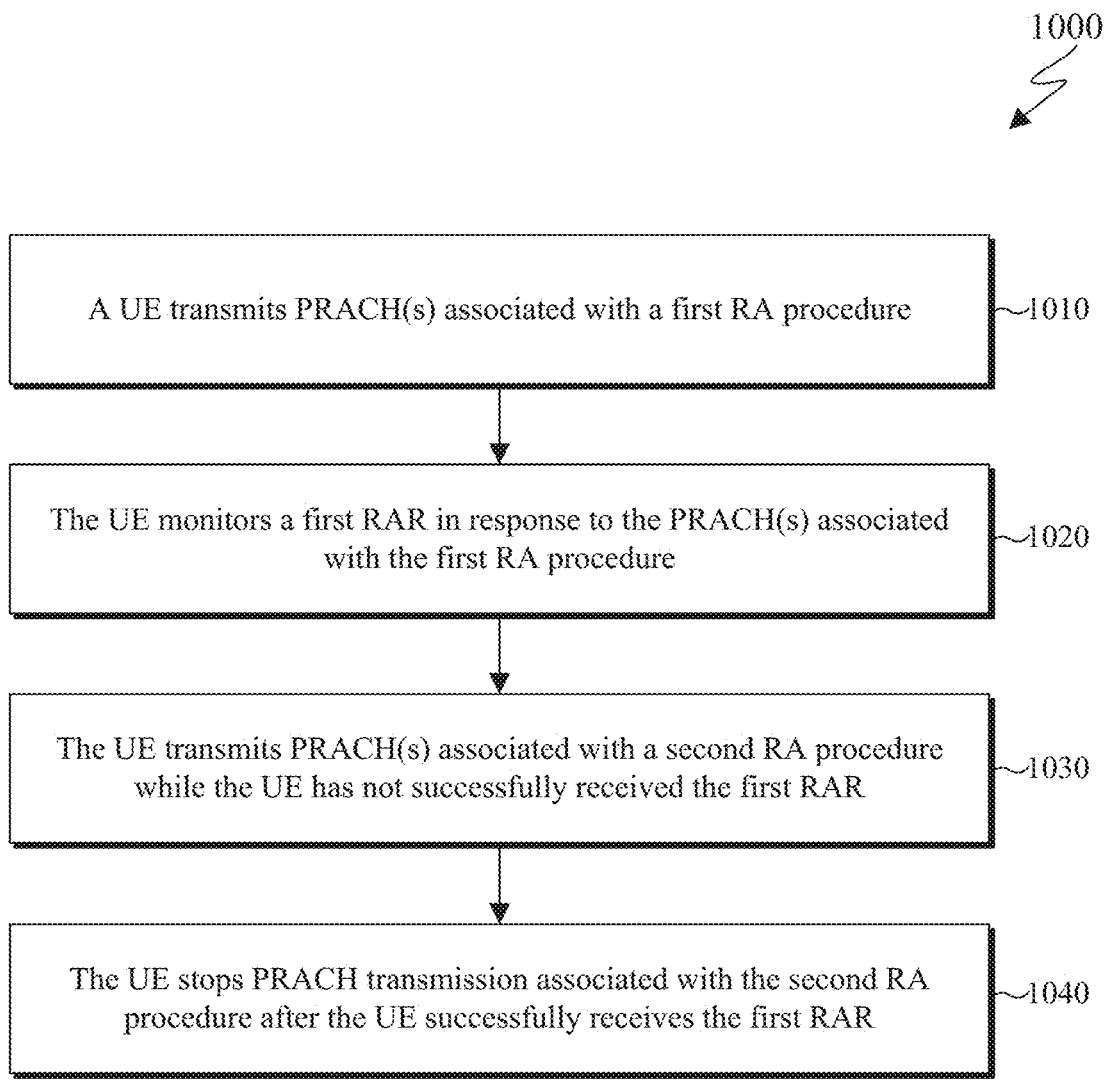
FIG. 10 illustrates an example method for multiple concurrent RA procedures with a cut-off time for random access response (RAR) reception according to embodiments of present disclosure.

FIG. 10 illustrates an example method 1000 for multiple concurrent RA procedures with a cut-off time for RAR reception according to embodiments of present disclosure. The steps of the method 1000 can be performed by any of the UEs 111-116 of FIG. 1, such as the UE 116 of FIG. 3. The method 1000 is for illustration only and other embodiments can be used without departing from the scope of the present disclosure.

There can be a number of conditions with respect to the timeline of two/multiple concurrent RA procedures, such as the initiation timing for the concurrent RA procedures, their separation in time, the stopping or completion time, and the like. Those conditions can also determine when the RA procedures are concurrent.

In one realization, two concurrent RA procedures can be initiated at a same time or at different times, regardless of whether or not they correspond to same/different cell(s) or same/different trigger(s). In another realization, two concurrent RA procedures can be in different stages where, for example, a first RA procedure is in the stage of Msg3 transmission or Msg4 reception, while a second RA procedure is in the stage of PRACH transmission or RAR reception. In yet another realization, specification can introduce restrictions on an absolute time or on a RA procedure stage that the two concurrent RA procedures can differ. For example, a UE may not start a second RA procedure X (e.g., X=100) milliseconds after a first RA procedure.

In certain embodiments, a UE starts a second concurrent RA procedure at any time until the UE successfully receives RAR for a first RA procedure. For example, if the UE has already received a RAR for a first RA procedure, the UE cannot initiate a second concurrent RA procedure, and needs to wait until the first RA procedure is completed. The benefit of such restrictions for "cut-off time of concurrency" is to avoid any extra handling of contention resolution in Msg3 or Msg4 when operating with two concurrent RA procedures, such as those discussed in Embodiments E-6, E-6-3, E-6-4, E-6-5, and E-6-6, below.

Herein, a successful reception of RAR includes, for example, reception of a RAR PDCCH that contains a (valid) downlink assignment, such as a DCI format 1_0, that schedules a PDSCH, and successful reception of a transport block (TB) in the PDSCH, wherein the TB contains the RA preamble identity (RAPID) of the transmitted PRACH(s) and, when applicable, a RAR UL grant that schedules a Msg3 PUSCH transmission.

For example, the UE can continue two concurrent RA procedures until the UE successfully receives a RAR associated with one of the two RA procedures and then the UE can stop the other RA procedure.

For another example, even after successfully receiving a first RAR for an RA procedure, a UE can continue to receive a second RAR for another RA procedure, for example in order for the UE to acquire different TA values or different spatial transmission filters/beams corresponding to the two RA procedures or two UE panels. The UE can discard any remaining steps of RA procedure, such as Msg3 transmission or Msg4 reception, so that the UE only transmits one Msg3 and monitors/receives one Msg4 among the two concurrent RA procedures. In another example, the UE can continue with both RA procedures, transmit two Msg3 PUSCHs and monitor PDCCH for scheduling two corresponding Msg4 PUSCHs for the two respective RA procedures.

The method 1000 of FIG. 10 describes flowchart for multiple concurrent RA procedures with a "cut-off" time at the RAR reception, so that the UE stops a RA procedure after the UE successfully receives a RAR for the other RA procedure.

In step 1010, a UE (such as the UE 116) transmits one or multiple first PRACH(s) associated with a first RA procedure. In step 1020, the UE monitors a first RAR in response to the transmission of the first PRACH(s) associated with the first RA procedure. For example, the first PRACH(s) correspond to a first SSB (or CSI-RS) and are transmitted by a first UE panel. In another example, the first PRACH(s) correspond to different SSBs (or CSI-RSs) and are transmitted by different UE panels.

In step 1030, the UE initiates a second RA procedure and transmits one or multiple second PRACH(s) associated with a second RA procedure while the UE has not successfully received a RAR for the first RA procedure For example, the second PRACH(s) correspond to a second SSB (or CSI-RS) and are transmitted by a second UE panel. For another example, the second PRACH(s) correspond to different SSBs (or CSI-RSs) and are transmitted by different UE panels. For yet another example, the first PRACH(s) and the second PRACH(s) include one or multiple PRACH transmission (re-)attempts, with potential power ramping.

In step 1040, the UE stops PRACH transmission associated with the second RA procedure after the UE successfully receives a RAR associated with the first RA procedure. For example, the UE may continue to transmit second PRACH(s) or monitor PDCCH for scheduling of a RAR corresponding to the second RA procedure after the UE successfully receives a RAR for the first RA procedure, for example to determine a second TA value corresponding to the second UE panel, or to determine a second spatial transmission filter/uplink beam corresponding to the second UE panel. In one example, the second TA value can be different from the first TA value. In one example, the second spatial transmission filter/uplink beam can be different from the first spatial transmission filter/uplink beam.

In this flowchart of FIG. 10, the first/second PRACH(s) for the first/second RA procedures correspond to initial transmissions and retransmissions (when a RAR is not received) of PRACHs with corresponding power ramping for the corresponding RA procedure. A RAR monitoring window with a configured or predetermined length exists between two consecutive PRACH transmissions of a RA procedure. A PRACH transmission can be with or without repetitions.

In one realization, a UE (such as the UE 116) determines a first UE antenna port group/panel and a second UE antenna port group/panel. The UE determines a first SSB index and a second SSB index. For example, the UE can detect the first SSB using the first panel (or another Rx panel possibly associated with the first panel) and detect the second SSB using the second panel (or another Rx panel possibly associated with the second panel). The UE transmits, for a first RA procedure, a first PRACH corresponding to the first SSB index using the first UE antenna port group, and then monitors PDCCH for scheduling reception of a first RAR PDSCH (within a first time window) in response to the first PRACH. For example, the UE monitors PDCCH and receives the first RAR on the first panel (or on another Rx panel associated with the first panel). The UE transmits, for a second RA procedure concurrent with the first RA procedure, a second PRACH corresponding to the second SSB index using the second UE antenna port group while the UE has not successfully received the first RAR. In one example, the order can change between the two RA procedures (regardless of which one of the two RA procedures was initiated first), and the UE can transmit a PRACH for the first RA procedure while the UE has not successfully received a RAR for the second RA procedure (within a second time window). In one example, a length of a monitoring window for the first RAR reception can be same or different from a length of a monitoring window for the second RAR reception.

It is noted that there can be different cases for the timeline of PRACH transmissions for two concurrent RA procedures.

In one realization, there can be no interaction and inter-dependency for a PRACH transmission timeline between two concurrent RA procedures. A UE transmits a PRACH for a first RA procedure in any valid RO associated with a first SSB or CSI-RS, regardless of the status and timeline of PRACH transmission or RAR reception for a second RA procedure. For example, the UE can transmit a PRACH for the first RA procedure even if the UE is still monitoring PDCCH, but has not yet successfully received, for a RAR reception for the second RA procedure. For example, the UE may need a capability for full duplex or simultaneous multi-panel operation (possibly with spatial division multi-plexing—SDM, or with self-interference cancellation) to support this realization.

In another realization, there can be an interaction and inter-dependency or PRACH transmission timeline between the two concurrent RA procedures. For example, a UE can transmit a PRACH for a RA procedure only after a latest RAR window for the other RA procedure expires without successful RAR reception. This can provide panel diversity while requiring a same number of resources as for a conventional RA procedure. For example, the UE may not transmit a PRACH for a first RA procedure while the UE is monitoring PDCCH for scheduling a RAR reception for a second RA procedure, and the UE may skip one or more RO(s) corresponding to (the SSB or CSI-RS associated with) the first RA procedure during the RAR window of the second RA procedure. In another example, the UE can transmit PRACH for the first RA procedure in RO(s) that overlap with RAR monitoring window for a second concurrent RA procedure. For example, the UE does not monitor RAR PDDCH during the overlapped RO(s). In another example, the UE is allowed to extend the RAR PDCCH monitoring window for the second RA procedure to compensate for duration of overlapping RO(s) and any necessary switching/guard period(s) such as RS/beam switching.

For example, any or all of the UE determinations/decisions described above (such as stopping PRACH transmission, stopping PDCCH monitoring for scheduling a RAR reception, dropping an RA procedure, and so on, after another RA procedure make progress to a next/certain step or a "cut-off" time) can correspond only to the case that the two RA procedures correspond to a same RA trigger.

For another example, any or all of the UE determinations/decisions described above can also correspond to the case that the two RA procedures correspond to two different RA triggers. Similar considerations can also apply for the case that the two concurrent RA procedures correspond to a same cell or two different cells.

In one example, any or all of the UE determinations/decisions described above can apply to any repetition(s) or retransmission(s) of Msg1/A PRACH or RAR/Msg2/B RAR PDCCH/PDSCH. In another example, any or all of the UE determinations/decisions described above can apply to transmission/repetition(s)/retransmission(s) for Msg3/A PUSCH and Msg4 PDCCH/PDSCH.

In certain embodiments, the MAC entity may stop ra-Response Window (and hence monitoring for Random Access Response(s)) after successful reception of a Random Access Response containing Random Access Preamble identifiers that matches the transmitted PREAMBLE_INDEX for a UE without capability [2-panels/2-PRACHs]. If the UE has a capability [2-panels/2-PRACHs] and is performing a second concurrent RA procedure, the MAC entity may stop ra-Response Window (and hence monitoring for Random Access Response(s)) corresponding to the first RA procedure after successful reception of a Random Access Response containing Random Access Preamble identifier that matches the transmitted PREAMBLE_INDEX. The MAC entity may stop ra-ResponseWindow (and hence monitoring for Random Access Response(s)) corresponding to the second RA procedure after successful reception of a Random Access Response containing Random Access Preamble identifier that matches the transmitted PREAMBLE_INDEX_2. It is noted that the HARQ operation may not be applicable to the Random Access Response reception.

There can be a number of cases regarding whether to stop or continue a second RA procedure when a first RA procedures is completed.

In one realization, among two or multiple concurrent RA procedures, a UE can continue with a second RA procedure when a first RA procedure is completed unsuccessfully. In another realization, a UE shall stop a second RA procedure when a first RA procedure is completed successfully.

For example, a UE (such as the UE 116) can stop a second RA procedure after the UE successfully completes a first RA procedure that is associated with a same trigger or a same cell as the second RA procedure.

In another realization, the UE can continue with a second RA procedure, regardless of successful or unsuccessful completion of a first RA procedure, when the first RA procedure is associated with a different trigger or a different cell than the second RA procedure.

In yet another realization, a UE can continue with a second RA procedure, even after a successful completion of a first RA procedure, and even for the case that the first and second RA procedures correspond to a same cell or a same trigger. For example, the realization can be beneficial when the UE needs to acquire different TA values or different spatial transmission filters for the two RA procedures, such as when associated SSBs correspond to the two UE panels or two TRPs. According to this example, the UE can continue the second RA procedure until the UE successfully receives a RAR for the second RA procedure and the UE may discard further steps, such as contention resolution via Msg3 PUSCH and Msg4 PDSCH in a 4-step RA procedure. In another example, the UE may complete the second RA procedure, including contention resolution via Msg3 and Msg4 in a 4-step RACH procedure.

Although FIG. 10 illustrates the method 1000 various changes may be made to FIG. 10. For example, while the method 1000 of FIG. 10 and is shown as a series of steps, various steps could overlap, occur in parallel, occur in a different order, or occur multiple times. In another example, steps may be omitted or replaced by other steps. For example, steps of the method 1000 can be executed in a different order.

The following embodiments of the present disclosure, denoted as E-3, describe individual or common PRACH type selections (such as a 4-step RACH or a 2 step RACH) for UE panels.

For a UE (such as the UE 116) performing two concurrent RA procedures, the UE can determine a PRACH type for the two RA procedures individually or jointly. Here, a PRACH type refers to a PRACH Type-1 or 4-step RACH, or a PRACH Type-2 or 2-step RACH.

In one realization, the UE can individually determine the RA type for each of the two/multiple concurrent RA procedures. In one example, a RA type can be associated with each UE panel and the corresponding PRACH transmission/RA procedure. In one example, the UE determines a type for each RA procedure based on the PRACH trigger and the SSB RSRP or CSI-RS RSRP associated with the PRACH for that RA procedure or the UE panel. According to this example, the UE can determine a 2-step RA procedure for a first RA procedure (on a first panel) and determine a 4-step RA procedure for a second concurrent RA procedure (on a second panel).

In another realization, the UE can determine a common type for both/all concurrent RA procedures. Such common RA Type can be based, for example, on a type determined for a RA procedure that is initiated earlier, or a type determined for a RA procedure associated with a smallest/largest SSB RSRP or CSI-RS RSRP. According to this example, if the UE determines a 4-step RA for a first RA procedure (on a first UE panel), the UE determines a type for the second RA procedure (on a second UE panel) to also be a 4-step RA procedure.

The following embodiments of the present disclosure, denoted as E-4, describe panel specific configurations for RA procedure parameters. The following examples and embodiments, such as those of FIG. 11A describe panel specific RA configuration for a UE with two concurrent RA procedures.

Figure 11A:
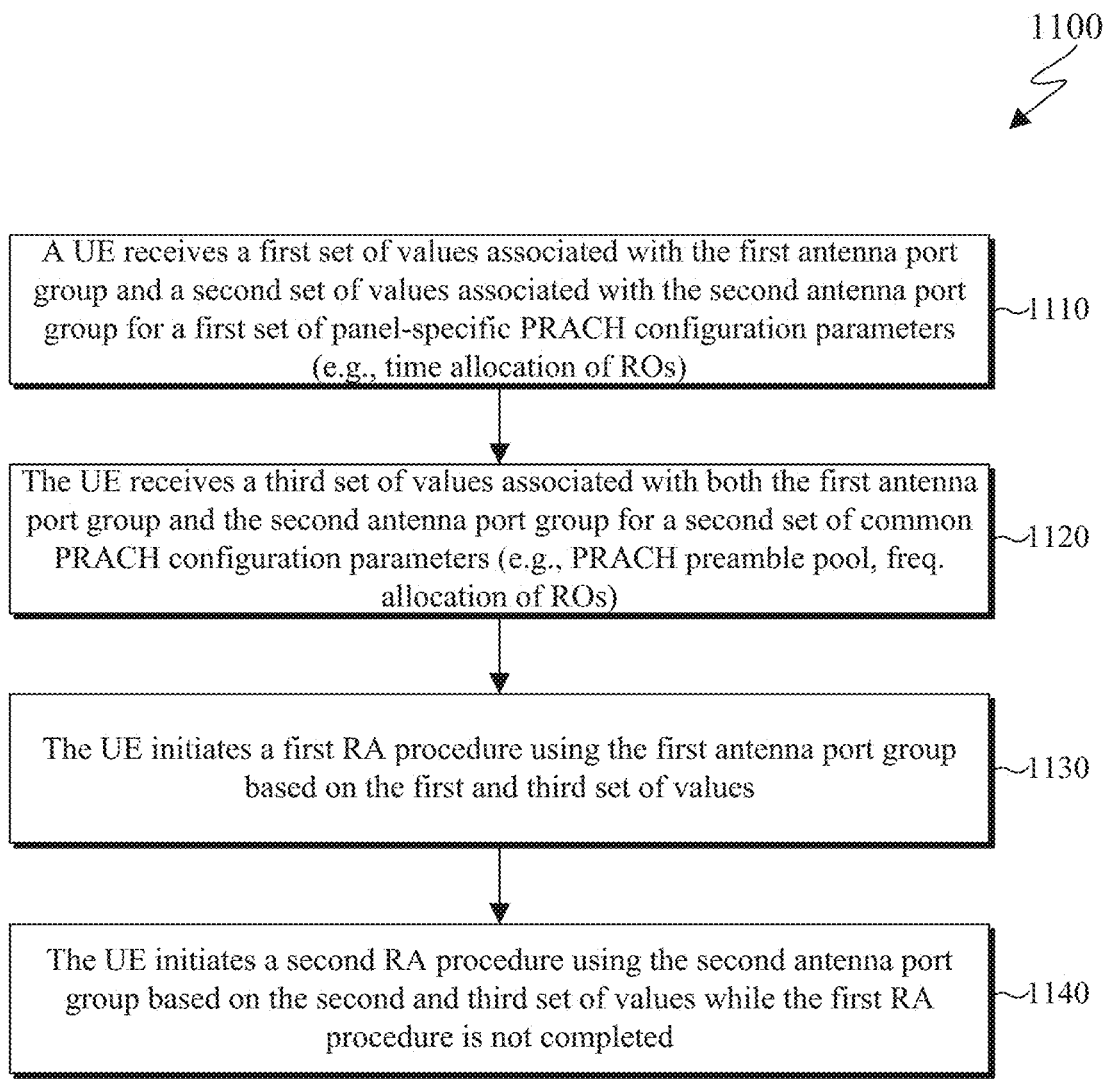
FIG. 11A illustrates an example method for a panel-specific RA configuration for a UE with two concurrent RA procedures according to embodiments of present disclosure.

FIG. 11A illustrates an example method 1100 for a panel-specific RA configuration for a UE with two concurrent RA procedures according to embodiments of present disclosure. The steps of the method 1100 can be performed by any of the UEs 111-116 of FIG. 1, such as the UE 116 of FIG. 3. The method 1100 is for illustration only and other embodiments can be used without departing from the scope of the present disclosure.

In certain embodiments, a UE (such as the UE 116) can initiate and perform two/multiple concurrent RA procedures using configuration parameters that are partially or fully panel-specific. Here, RA configuration includes configuration parameters for PRACH transmission, and PDCCH monitoring for RAR/MsgB reception, Msg3/MsgA PUSCH transmission, and Msg4 reception as is subsequently described.

In one realization, the UE can be separately configured with two RA configurations. Here, a first RA configuration is used for a first RA procedure on a first panel, and a second RA configuration is used for a second RA procedure on a second panel.

In another realization, in order to reduce a signaling overhead associated with fully separate configurations, the UE can be configured with a first set of panel-common RA parameters that are used for both RA procedures on both UE panels and can be separately configured with a second set of panel-specific RA parameters that are individually used for each UE panel. For example, a single value is provided for each RA parameter in the set of panel-common RA parameters, while separate values can be provided for each parameter in the set of panel-specific RA parameters. In one example, the set of panel-common and panel-specific parameters can be predetermined in the system specifications.

Panel-specific RA parameters can include, for example, RO configurations, PRACH preambles, cyclic shift for PRACH sequence, monitoring window for RAR/MsgB/Msg4, and so on. In one example, for a UE in RRC_CONNECTED state, panel-specific RA parameters can also include, a DL RS associated with a PRACH (for example, for CFRA or for BFR, for SI request, and so on), the PRACH mask information, the power ramping parameter, and so on. For example, a first UE panel can transmit PRACH based on a first RO configuration while a second UE panel can transmit PRACH based on a second RO configuration. For example, one panel uses SSB, and another panel uses CSI-RS. Such operation can apply, for example, when the two panels have different number of physical antennas or antenna ports in order to generate different beam widths. For another example, a PRACH format and a numerology/subcarrier spacing can be panel-specific.

A first RA configuration can be provided by a cell-specific configuration provided by higher layers such as SIB or a common RRC configuration, while a second RA configuration can be provided by a SIB1 extension (such as a non-essential SIB1 extension) or by another broadcast SIB>1, or by extension of common RRC configuration, or by dedicated RRC configuration for a connected mode UE. This approach ensures that legacy UEs are able to receive the SIB or RRC common configuration without any backward compatibility issues, while UEs capable of concurrent RA procedures can receive and use both configurations. In one example, panel-common parameters are based on values provided by the cell-specific RA configuration while panel-specific parameters are provided with two different values for the two panels in a SIB extension or in an extension of RRC configuration. In one example, UEs capable of two concurrent RA procedures only use the second RA configuration, that is not used by legacy UEs, for both RA procedures. In another example, UEs capable of two concurrent RA procedures use a same RA configuration as that used by legacy UEs.

In one example, when higher layer configuration provides two RA configurations, legacy UEs use the first RA configuration, such as the cell-specific RA configuration provided by SIB or RRC common configuration, while UEs with two concurrent RA procedures use the second RA configuration provided by SIB extension or extension of RRC configuration for both of their panels. Such operation provides a means for the network to identify and distinguish UEs that can support concurrent RA procedures from legacy UEs. In one example, UEs with concurrent RA procedures follow some predetermined set of parameters (per system specifications), such as ROs or PRACH preambles, commonly for both panels, for identification at the network side, while for other RA parameters follow the two RA configurations for the two panels, respectively.

In one realization, a linkage between the two RA configurations and the two UE panels can be based on an ordering of the UE panels. In one example, an ordering of UE panels may be known to the network, for example, for a connected mode UE that reported some UE panel information to the gNB. In another example, the ordering of UE panels may not be known to the network, and it is up to UE implementation how to link the two configurations to the two panels.

In one example, there is no (explicit) linkage or association among the RA configurations with the UE panels. For example, the UE uses a first RA configuration for a first RA procedure, and a second RA configuration for a second RA procedure, without any linkage or association to a first or second UE panel. For example, instead of panel-specific or panel-common RA parameters, higher layers can provide some RA parameters that the UE applies commonly to both RA procedures, and other RA parameters that the UE applies separately to each RA procedure (i.e., a separate value configured for each RA procedure).

In one example, usage of two different RA configurations can be allowed only when certain conditions are met, such as a frequent overlap of ROs for the two concurrent PRACHs, and then a UE can use the second RA configuration or both RA configurations. For example, if the two SSBs that a UE detects and are associated with the two concurrent RA procedures map to same ROs or FDMed ROs frequently, for example for a percentage of mapped ROs larger than a threshold, for the RO configuration in the first RA configuration, the UE can use the second RO configuration for a RA procedure for the second panel, or possibly to use the second RO configuration for PRACH transmission for both panels.

The method 1100 of FIG. 11A describes a flowchart for panel-specific RA configuration of a UE with two concurrent RA procedures.

In step 1110, a UE (such as the UE 116) receives a first set of values associated with a first antenna port group and a second set of values associated with a second antenna port group for a first set of panel-specific PRACH configuration parameters, such as a time allocation of ROs. In step 1120, the UE receives a third set of values associated with both the first antenna port group and the second antenna port group for a second set of panel-common PRACH configuration parameters, such as PRACH preamble pool or frequency allocation of ROs. In step 1130, the UE initiates a first RA procedure using the first antenna port group based on the first and third sets of values. In step 1140, the UE initiates a second RA procedure using the second antenna port group based on the second and third sets of values while the first RA procedure is not completed.

Figure 11B:
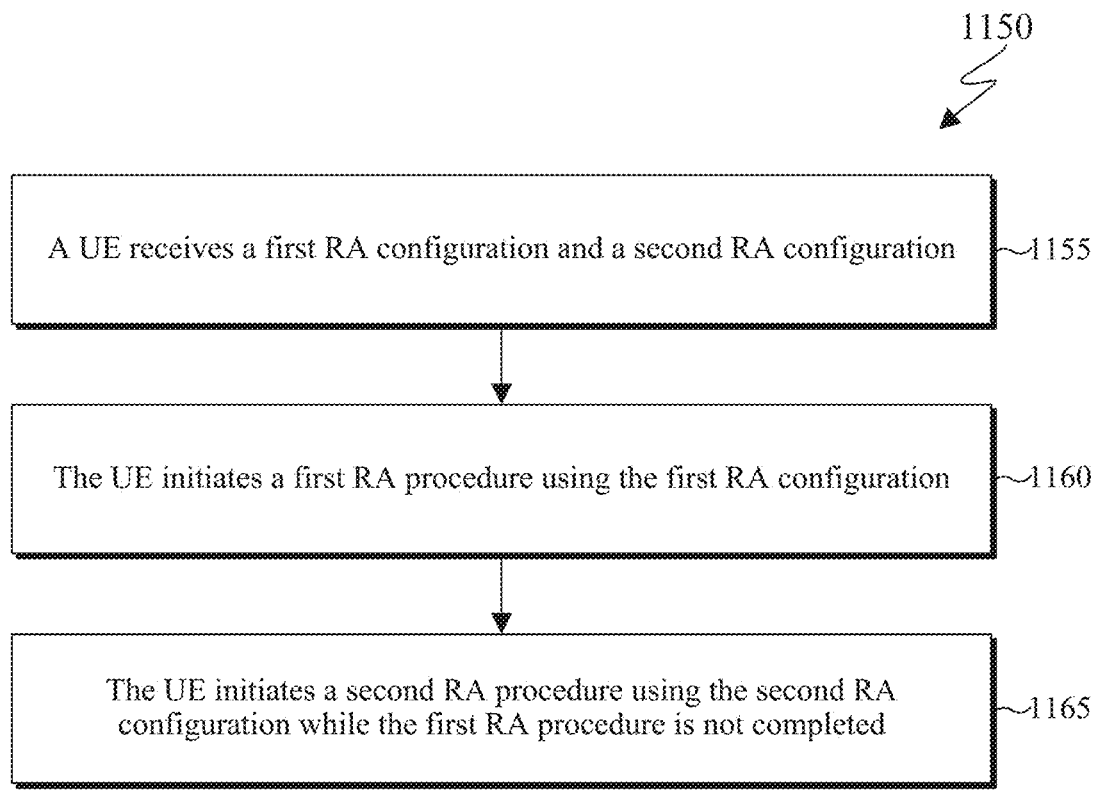
FIG. 11B illustrates an example method for separate RA configurations for a UE with two concurrent RA procedures according to embodiments of present disclosure.

FIG. 11B illustrates an example method 1150 for separate RA configurations for two concurrent RA procedures according to embodiments of present disclosure. The steps of the method 1150 can be performed by any of the UEs 111-116 of FIG. 1, such as the UE 116 of FIG. 3. The method 1150 is for illustration only and other embodiments can be used without departing from the scope of the present disclosure.

In step 1155, a UE receives a first RA configuration and a second RA configuration. In step 1160, the UE initiates a first RA procedure using the first RA configuration. In step 1165, the UE initiates a second RA procedure using the second RA configuration while the first RA procedure is not completed.

Figure 11C:
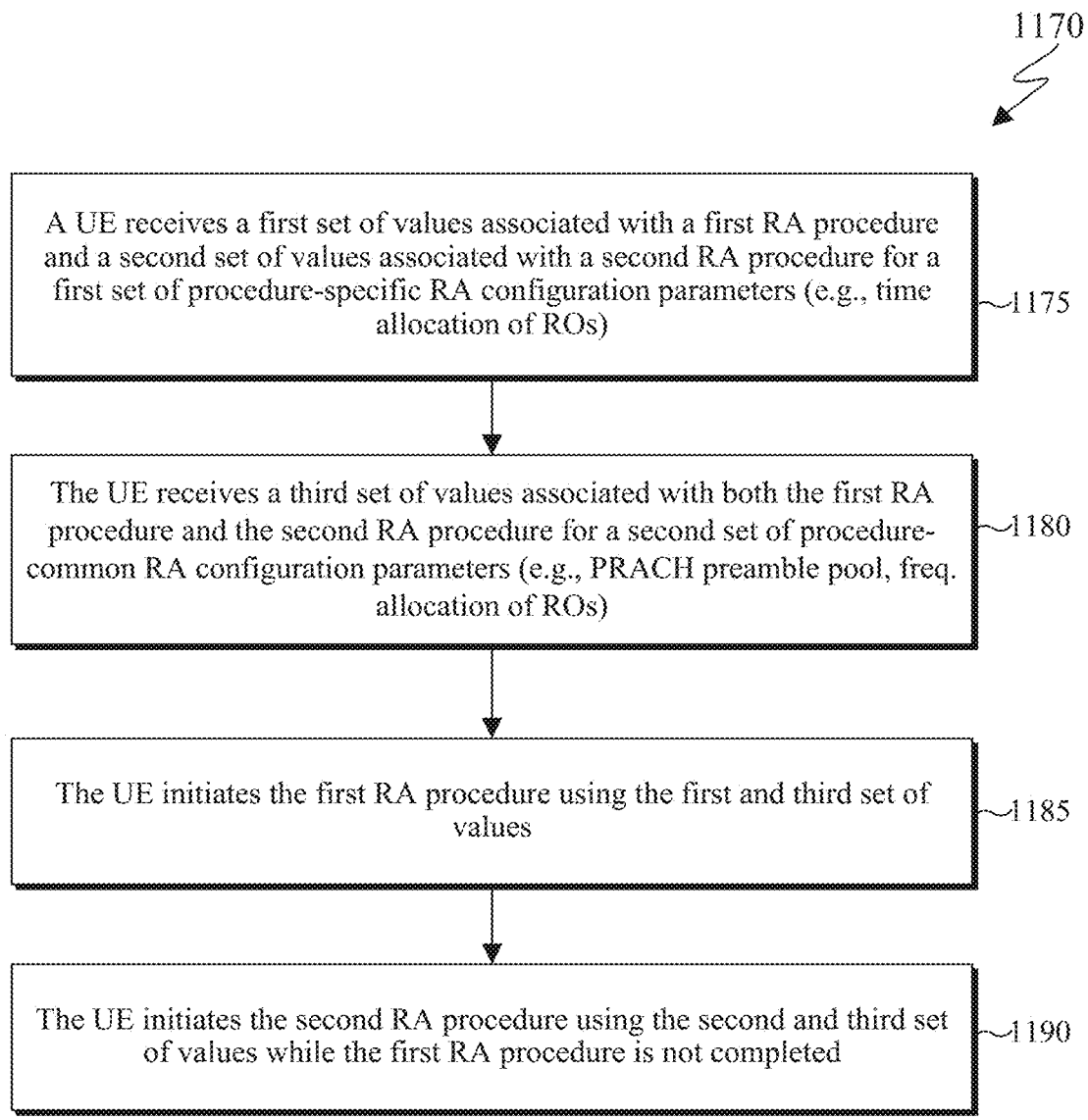
FIG. 11C illustrates an example method for a procedure-specific RA configuration for a UE with two concurrent RA procedures according to embodiments of present disclosure.

FIG. 11C illustrates an example method 1170 for procedure-specific RA configuration of a UE with two concurrent RA procedures according to embodiments of present disclosure. The steps of the method 1170 can be performed by any of the UEs 111-116 of FIG. 1, such as the UE 116 of FIG. 3. The method 1170 is for illustration only and other embodiments can be used without departing from the scope of the present disclosure.

In step 1175, a UE receives a first set of values associated with a first RA procedure and a second set of values associated with a second RA procedure for a first set of procedure-specific RA configuration parameters (e.g., time allocation of ROs). In step 1180, the UE receives a third set of values associated with both the first RA procedure and the second RA procedure for a second set of procedure-common RA configuration parameters (e.g., PRACH preamble pool, freq. allocation of ROs). In step 1185, the UE initiates the first RA procedure using the first and third set of values. In step 1190, the UE initiates the second RA procedure using the second and third set of values while the first RA procedure is not completed.

Although FIGS. 11A-11C illustrate methods 1100, 1150, and 1170 various changes may be made to FIG. 11. For example, while the methods 1100, 1150, and 1170 of FIG. 11A-11C and are shown as a series of steps, various steps could overlap, occur in parallel, occur in a different order, or occur multiple times. In another example, steps may be omitted or replaced by other steps. For example, steps of the methods 1100, 1150, and 1170 can be executed in a different order.

The following embodiments of the present disclosure, denoted as E-5, describe PRACH power control when using two UE panels with different MPE and/or EIRP values. The following examples and embodiments, such as those of FIG. 12 describe panel specific power control for a multi-panel UE with multiple concurrent RA procedures.

Figure 12:
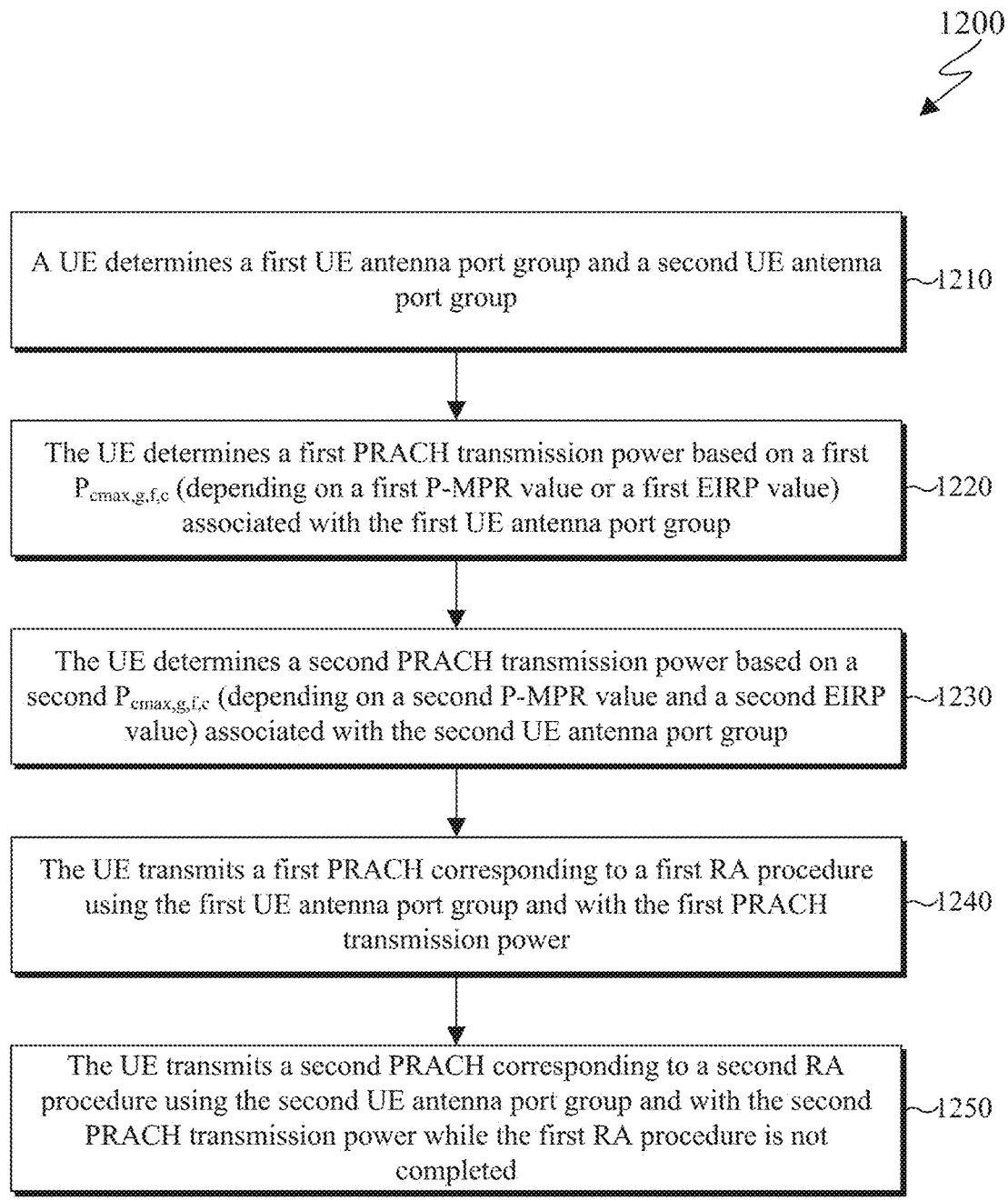
FIG. 12 illustrates an example method for a panel-specific power control for multi-panel UE with multiple concurrent RA procedures according to embodiments of present disclosure.

FIG. 12 illustrates an example method 1200 for a panel-specific power control for multi-panel UE with multiple concurrent RA procedures according to embodiments of present disclosure. The steps of the method 1200 can be performed by any of the UEs 111-116 of FIG. 1, such as the UE 116 of FIG. 3. The method 1200 is for illustration only and other embodiments can be used without departing from the scope of the present disclosure.

In certain embodiments, when a UE (such as the UE 116) performs two concurrent RA procedures using two transmitter panels, the UE can determine different PRACH transmission power levels for the two transmitter panels, for example due to different corresponding MPE values or due to different corresponding EIRP values.

A multi-panel UE can have multiple configured UE maximum output powers $P_{CMAX,g,f,c}$ for carrier f of a serving cell c associated with the multiple UE transmitter panels or antenna port groups g=0, 1, 2, . . . , N−1, where N is the number of UE transmitter panels or the maximum number of UE antenna panels that can have simultaneous or overlapping transmissions.

For example, a first UE transmitter panel may experience a large MPE and may need to back-off more in the transmission power, for example by setting a higher P-MPR$_{g,f,c}$ value, while a second UE panel may experience no/low MPE and may not need a large transmission power back-off, can set for example a zero or small P-MPR$_{g,f,c}$ value.

For another example, a first UE panel may have a higher peak/average/max/min EIRP (or TRP), for example due to connection to more physical antenna elements/arrays/sub-arrays or PAs or RF chains based on the virtualization scheme for mapping physical antennas to virtual/logical panel entities, or for example due to connection to a PA with higher output power, while a second UE panel may have a lower peak/average/max/min EIRP (or TRP), for example due to connection to fewer physical antenna elements/arrays/sub-arrays or PAs or RF chains, or due to connection to a PA with lower output power. In one example, the UE can have two or multiple different values for EIRP$_{max,g}$ or TRP$_{max,g}$ or the measured peak EIRP $P_{UMAX,g,f,c}$ or the measured total radiated power $P_{TMAX,g,f,c}$.

For another example, other parameters such as MPR$_{f,c}$, A-MPR$_{f,c}$, can be also panel-specific and have different values for different UE panels. In yet another example, a power ramping parameter for PRACH transmissions can be panel-specific and have different values for different UE panels. In yet another example, power control parameters used in Msg3/MsgA PUSCH transmission, such as target power levels, pathloss compensation factors, or power offset parameters can be also panel-specific, with different values for different UE panels.

For yet another example, PRACH transmission powers from different UE panels can be different due to different estimated pathloss at each panel or due to panel-specific parameters such as antenna gain when UE panels have different structures such as different antenna/PA/RF structures.

In one example, the above determinations for PRACH power control parameters can apply to two concurrent RA procedures, without (explicit) linkage or association with UE panels. For example, the UE can transmit a PRACH corresponding to a first RA procedure with a first power level (such as based on a first power ramping) that is different from a second power level (such as based on a second power ramping) that the UE uses for transmission of a second PRACH corresponding to a second RA procedure.

The method 1200 of FIG. 12 describes a flowchart for panel-specific power control for a multi-panel UE with multiple concurrent RA procedures.

In step 1210, a UE (such as the UE 116) determines a first UE antenna port group and a second UE antenna port group. In step 1220, the UE determines a first PRACH transmission power based on a first $P_{cmax,g,f,c}$ (that depends on a first P-MPR value and a first EIRP value) associated with the first UE antenna port group. In step 1230, the UE determines a second PRACH transmission power based on a second $P_{cmax,g,f,c}$ (that depends on a second P-MPR value and a second EIRP value) associated with the second UE antenna port group. In step 1240, the UE transmits a first PRACH corresponding to a first RA procedure using the first UE antenna port group and with the first PRACH transmission power. In step 1250, the UE transmits a second PRACH corresponding to a second RA procedure using the second UE antenna port group and with the second PRACH transmission power while the first RA procedure is not completed Although FIG. 12 illustrates the method 1200 various changes may be made to FIG. 12. For example, while the method 1200 of FIG. 12 and is shown as a series of steps, various steps could overlap, occur in parallel, occur in a different order, or occur multiple times. In another example, steps may be omitted or replaced by other steps. For example, steps of the method 1200 can be executed in a different order.

The following embodiments of the present disclosure, denoted as E-5-1, describe PRACH power control for overlapping Ros of two concurrent RA procedures when there is a total power limit across UE panels. The following examples and embodiments, such as those of FIG. 13 describe power scaling or dropping of two overlapping PRACH transmissions corresponding to two UE panels.

Figure 13:
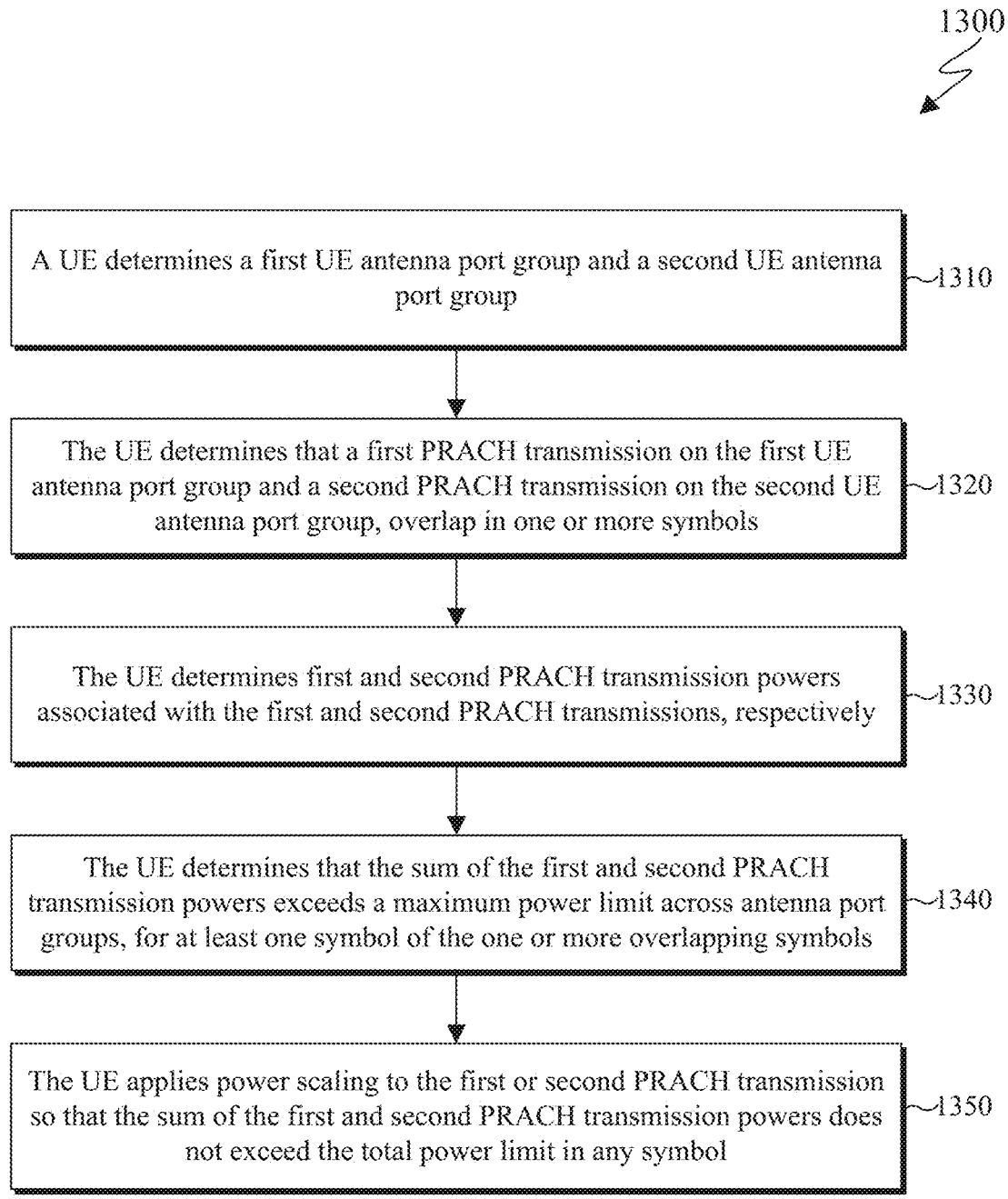
FIG. 13 illustrates an example method for power scaling or dropping of two overlapping physical random access channel (PRACH) transmissions corresponding to two UE panels according to embodiments of present disclosure.

FIG. 13 illustrates an example method 1300 for power scaling or dropping of two overlapping PRACH transmissions corresponding to two UE panels according to embodiments of present disclosure. The steps of the method 1300 can be performed by any of the UEs 111-116 of FIG. 1, such as the UE 116 of FIG. 3. The method 1300 is for illustration only and other embodiments can be used without departing from the scope of the present disclosure.

In certain embodiments, when a UE (such as the UE 116) performs multiple concurrent RA procedures, the UE may need to transmit overlapping PRACH. In such case, when a total PRACH transmission power is larger than a maximum transmission power, the UE can drop or power scale the PRACH transmission(s).

In one realization, two concurrent random RA procedures may involve only time multiplexed ROs (TDMed ROs). In such case, the UE transmits the PRACHs with corresponding transmission power levels independently, without any power scaling or dropping. For example, the realization can apply for a UE with a single transmitter panel, or for UE with multiple transmitter panels when the SSB(s) or CSI-RS(s) associated with the PRACHs map to TDMed ROs, or when the two sets of RO configurations for the two panels are provided such that there can be no overlap between PRACH transmissions for the two concurrent RA procedures. In this case, the UE alternates between PRACH transmissions corresponding to the two/multiple concurrent RA procedures.

In another realization, two concurrent random RA procedures can include overlapping PRACH transmissions for some or all ROs. This realization can apply when there is a single RO configuration and the SSB(s) or CSI-RS(s) associated with the PRACHs map to overlapping PRACH transmissions for some or all ROs. The realization can also apply when the UE is configured with two RO configurations and the two RO configurations have a partial overlap or a full subset relationship, such as when a sparse RO configuration for a first RA procedure has a partial overlap or is a full subset of a dense RO configuration for a second concurrent RA procedure. Such an event can happen when a number of SSBs mapped to each RO is configured with N>1, or even when N≥1 but a configured number of FDMed ROs is large. In one example, if there is no total UE power limit across all UE transmissions panels, that is when only an individual power limit per transmitter panel applies, no dropping or power scaling is needed for any of the two/multiple overlapping PRACH transmissions, and the UE can transmit each PRACH with an independently determined transmission power.

A UE performing two concurrent RA procedures, may have a maximum transmission power limit across all UE panels (due to implementation issues, regulatory requirements, and the like). In this case, the UE can then transmit two PRACHs corresponding to two RA procedures that are time overlapping. If a total transmission power would exceed the maximum transmission power limit for at least one transmission symbol, the UE can apply one or more of the following mechanisms.

In a first mechanism, the UE can drop one of the two PRACH transmissions, for example based on a condition or a priority order, and only transmits the other PRACH. The dropping can apply for the at least one transmission symbol, for the PRACH transmission starting from the overlapping symbol, or for the entire PRACH transmission occasion/slot. For example, the UE drops a PRACH transmission that corresponds to any one of the following: (i) a panel with lower EIRP, or lower TRP, or lower $P_{CMAX,g,f,c}$; (ii) a panel with higher MPE such as a higher P-MPR value; (iii) a panel with smaller/larger number of antenna ports; (iv) a RA procedure that was initiated earlier/later; (v) a RA procedure that has a larger/smaller number of remaining PRACH transmission attempts, as compared to the corresponding configured maximum number of PRACH transmission attempts; (vi) a RA procedure with lower priority, wherein a priority of a RA procedure can be based on a priority order of the trigger for that RA procedure using a specified ordering of the PRACH triggers, for example, a PRACH for acquisition of TA or for BFR can have a higher priority compared to a PRACH due to scheduling request (SR); (vii) a lower signal quality corresponding to the PRACH transmission, such as PRACH transmission associated with a lower RSRP, such as a SSB RSRP or CSI-RS RSRP, or a higher pathloss value; (viii) a selection uniformly at random; (ix) UE implementation; (x) gNB indication (at least for connected mode UE); (xi) UE capability, e.g., a single-panel UE or a multi-panel UE that does not support a capability for overlapping/simultaneous PRACH transmission can transmit a single PRACH transmission, and needs to drop the other overlapping PRACH transmissions; and (xii) the like.

Further, there can be a threshold for any of the above determinations, for example for comparison of $P_{CMAX,g,f,c}$ or EIRP, TRP, MPE, P-MPR, SSB RSRP, CSI-RS RSRP, and so on, wherein the threshold can apply to absolute values corresponding to the each of the two PRACH transmissions or a relative/difference values between the two RACH transmissions. In one example, if both PRACH transmissions satisfy the threshold or if none of the PRACH transmissions satisfies the threshold, the UE drops one of the two/multiple overlapping PRACH transmissions uniformly at random.

In one example, if the UE needs to drop one of the overlapping PRACH transmissions frequently, such as for a percentage of ROs larger than a threshold, the UE can stop the corresponding RA procedure, or stop using a corresponding SSB or CSI-RS for PRACH transmission.

In a second mechanism, the UE transmits both PRACHs and applies power scaling or power back-off to the two PRACH transmissions such that a total power after power scaling/back-off does not exceed the maximum UE transmission power limit across all UE transmitter panels, in any symbol of the two PRACH transmissions. For application of power back-off, in one example, the UE selects one of the two PRACH transmissions and applies the entire power back-off to that PRACH transmission, without any power back-off for the other PRACH transmission. The selection can be based on a condition or a priority order, such as one of the several examples described earlier for PRACH dropping. In another example, the UE applies an equal power back-off to all overlapping PRACH transmissions. In yet another example, the UE applies separately determined power back-off values to the two/multiple overlapping PRACH transmissions, such as a power back-off for each PRACH transmission being proportional to a PRACH parameter, including SSB RSRPs or CSI-RS RSRPs, MPE/P-MPR values, EIRP/TRP values, and so on.

In one example, the UE can alternate between PRACH transmission on the two panels when ramping the power, for example, first transmission on a first panel, then a second PRACH transmission on a second panel, then a third transmission again on the first panel (possibly with power ramping) and so on.

The method 1300 of FIG. 13 describes a flowchart for power scaling or dropping of two overlapping PRACH transmissions corresponding to two UE panels.

In step 1310, a UE (such as the UE 116) determines a first UE antenna port group and a second UE antenna port group. In step 1320, the UE determines that a first PRACH transmission on the first UE antenna port group and a second PRACH transmission on the second UE antenna port group, overlap in one or more symbols. In step 1330, the UE determines a first and a second PRACH transmission power associated with the first and the second PRACH transmissions, respectively. In step 1340, the UE determines that the sum of the first and second PRACH transmission powers exceeds a maximum power across antenna port groups, for at least one symbol of the one or more overlapping symbols. In step 1350, the UE applies scaling (including with a zero value resulting to dropping) to the power of the first or second PRACH transmission, so that the sum of the first and second PRACH transmission powers does not exceed the maximum power in any symbol In one realization, for a UE that performs two/multiple concurrent RA procedures, the UE may need to transmit time-overlapping PRACH for a first RA procedure and a Msg3/MsgA PUSCH for a second RA procedure. According to this realization, all conditions and solutions described earlier for the case of overlapping PRACHs can also apply to this case, such as power scaling for the PRACH, or for the Msg3/MsgA PUSCH, so that a maximum UE power is not exceeded. In one example, additional mechanisms can be also considered. For example, the Msg3/MsgA PUSCH transmission is prioritized over the overlapping PRACH transmission. For example, the PRACH transmission is prioritized over the overlapping Msg3/MsgA PUSCH transmission. In one example, the solutions described herein above can apply for a UE in RRC connected mode that transmits a PRACH on a first panel and an overlapping PUSCH/PUCCH/SRS on a second panel.

In one realization, for a UE that performs two/multiple concurrent RA procedures, the UE may need to transmit overlapping transmissions of a Msg3/MsgA PUSCH for a first RA procedure and of a Msg3/MsgA PUSCH for a second RA procedure. According to this realization, all conditions and solutions described earlier for the case of overlapping PRACHs, such as dropping or power scaling of either or both overlapping transmissions, can apply so that a maximum UE power is not exceeded. In one example, additional mechanisms can be also considered. For example, if the first RA procedure is a 2-step RACH and the second concurrent RA procedure is a 4-step RACH, and a MsgA PUSCH transmission of the first procedure overlaps with a Msg3 PUSCH transmission of the second procedure, MsgA PUSCH is prioritized over Msg3 PUSCH for power scaling, or Msg3 PUSCH is prioritized over MsgA PUSCH. In one example, the solutions described above can apply for a UE in RRC connected mode that transmits two/multiple overlapping PUSCHs/PUCCHs/SRSs on two/multiple UE panels.

In one example, the UE decides on whether or not to perform a power scaling based on a time gap, if any, between the two transmissions or corresponding scheduling information signaling such as trigger time or PDCCH reception time. According to this example, if the time gap between the overlapping transmissions or corresponding scheduling information signaling is less than a threshold, such as one based on UE processing time or a factor thereof, the UE can decide not to do any power scaling or to decide to drop a transmission, and so on.

Although FIG. 13 illustrates the method 1300 various changes may be made to FIG. 13. For example, while the method 1300 of FIG. 13 and is shown as a series of steps, various steps could overlap, occur in parallel, occur in a different order, or occur multiple times. In another example, steps may be omitted or replaced by other steps. For example, steps of the method 1300 can be executed in a different order.

The following embodiments of the present disclosure, denoted as E-6, describe monitoring and receiving two RAR/MsgBs and handling two Msg3s/Msg4s (or MsgA PUSCH(s)) corresponding to two concurrent RA procedures.

In certain embodiments, for a UE (such as the UE 116) performing two or multiple concurrent RA procedures, the UE can monitor two or multiple RARs/MsgBs corresponding to RA procedures, can transmit two or multiple Msg3/MsgA PUSCHs, and can monitor PDCCH for scheduling two or multiple Msg4s for contention resolution. The UE provides information in Msg3/MsgA PUSCHs to enable the network to link the two or multiple concurrent RA procedures initiated by the UE and resolve an "intra-UE" contention resolution caused by the UE. This is because the gNB has no knowledge before Msg3/MsgA PUSCH reception that the multiple concurrent RA procedures are from a same UE, rather than from multiple corresponding UEs.

The following embodiments of the present disclosure, denoted as E-6-1, describe linking multiple RARs/MsgBs with multiple concurrent PRACHs/RA procedures.

In certain embodiments, for a UE (such as the UE 116) with multiple concurrent RA procedures, the UE monitors PDCCH for scheduling a first random access response (RAR) in a first configured time window after a first PRACH transmission for a first RA procedure, and monitors PDCCH for scheduling a second RAR in a second configured time window after a second PRACH transmission for a second RA procedure.

The UE can determine a received RAR correspond to a first PRACH/RA procedure or to a second PRACH/RA procedure using an RA-RNTI that is used for scrambling a CRC of a DCI format scheduling the RAR. At least when the UE does not transmit the two PRACHs in a same RO or in overlapping ROs, the UE can determine two different RA-RNTIs for a one-to-one association with the two PRACHs. In one example, a formula for computing RA-RNTI can be modified for multi-panel UEs that perform concurrent PRACHs so that even overlapping ROs are mapped to different RA-RNTI values.

The UE can determine a received RAR correspond to a first PRACH/RA procedure or to a second PRACH/RA procedure using a RA preamble ID (RAPID) provided by the RAR PDSCH. At least for the case that the two PRACHs are transmitted with two different preambles, the two RAPIDs in the two received RARs can be used to determine the one-to-one linkage of RARs with the PRACHs/RA procedures.

The UE can determine a received RAR correspond to a first PRACH/RA procedure or to a second PRACH/RA procedure using a beam/spatial domain filter used for RAR reception. For example, the gNB transmits each RAR with a spatial filter that is same as the spatial filter of the SSB associated with the corresponding PRACH, in case two different SSBs or SSB indices are respectively associated with the two PRACH transmissions. Accordingly, the UE receives the RAR with a same spatial filter as for the SSB. Therefore, the UE can determine the linkage of the two received RARs to the two PRACHs/RA procedures based on the spatial filter used to receive the SSB associated with each RAR reception. This method also applies when one or two CSI-RS(s) are used for PRACH association or transmission.

The UE can determine a received RAR correspond to a first PRACH/RA procedure or to a second PRACH/RA procedure using a time/frequency resource, such as a CORESET or search space (SS) set, used for RAR PDCCH reception. For example, higher layer signaling, such as SIB extension or RRC configuration extension, can inform the UE of a second (or two) CORESETs or a second (or two) SS sets for reception of two PDCCHs for scheduling RARs, for example, corresponding to the two RA procedures or two PDCCHs for scheduling RARs, for example, corresponding to the two UE panels. The UE can then determine a linkage of RAR with the first or second PRACH/RA procedure based on a CORESET or SS set of a PDCCH reception scheduling a corresponding RAR.

In one example, similar considerations can apply for linkage of Msg3 and Msg4. For example, the UE can transmit the two Msg3s or receive the two Msg4s with a same spatial filter, such as one for a corresponding SSB or CSI-RS reception, that was also used for corresponding PRACH transmission and RAR reception for the RA procedure. In another example, a RAR UL grant can indicate a corresponding new spatial filter for a corresponding Msg3 transmission or Msg4 reception. According to this example, the new spatial filter can also be associated, for example according to a QCL (Type-D), with the SSB or CSI-RS associated with the PRACH.

The following embodiments of the present disclosure, denoted as E-6-2, describe a determination of multiple panel specific TA value for a UE with multiple concurrent RA procedures.

A UE (such as the UE 116) with multiple concurrent RA procedures, can determine a first TA value from a first RAR associated with a first PRACH/RA procedure that the UE can apply to a first UE panel, and can determine a second TA value from a second RAR associated with a second PRACH/RA procedure that the UE can apply to a second UE panel. The UE applies the corresponding TA values for subsequent PUSCH/PUCCH/SRS transmissions when using the corresponding panel.

In one example, for a single-panel UE or for a UE not operating (or not expected to operate) with panel-specific TA values, when the UE receives two different TA values in two RARs corresponding to two concurrent RA procedures, the UE uses a largest/smallest TA value in subsequent operation, such as subsequent PUSCH transmissions, and discards the other TA value. In another example, the UE can assume that the two TA values correspond to two different cells.

Syntax (3) below describes a UE applies the corresponding TA values for subsequent PUSCH/PUCCH/SRS transmissions when using the corresponding panel Syntax (3)
2> if the Random Access Response reception is considered successful:
 3> if the Random Access Response includes a MAC subPDU with RAPID only:
  4> consider this Random Access procedure successfully completed;
  4> indicate the reception of an acknowledgement for SI request to upper layers.
 3> else:
  4> apply the following actions for the Serving Cell where the Random Access Preamble was transmitted:
   5> process the received Timing Advance Command (see clause 5.2) for a UE without capability [2-panels/2-PRACHs];
   5> if the UE has a capability [2-panels/2-PRACHs] and is performing two concurrent RA procedures, process the first received Timing Advance Command for the first antenna port group, and process the second received Timing Advance Command for the second antenna port group;
   5> indicate the preambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP);
   5> if the Random Access procedure for an SCell is performed on uplink carrier where puschConfig is not configured:
    6> ignore the received UL grant.
   5> else:
    6> process the received UL grant value and indicate it to the lower layers.

The following embodiments of the present disclosure, denoted as E-6-3, describe a transmission of a single Msg3 after reception of two RARs corresponding to RA procedures.

A UE (such as the UE 116) performing two RA procedures, can monitor PDCCH for scheduling two RARs corresponding to two concurrent PRACHs/RA procedures and subsequently select and transmit only a single Msg3 PUSCH.

For example, the UE transmits a first Msg3 PUSCH that corresponds to a first RAR that the UE receives earlier and drops (does not transmit) a second Msg3 PUSCH that corresponds to a second RAR that the UE receives later. According to this example, the UE can terminate the second RA procedure, or can suspend the second RA procedure for a period of time, such as until expiration of a monitoring window for the first Msg4 reception in response to the first Msg3 transmission.

For another example, the UE transmits a first Msg3 PUSCH that corresponds to a PRACH/RA procedure associated with a SSB or CSI-RS with higher signal quality such as larger RSRP or smaller MPE. According to this example, the UE drops (does not transmit) a second Msg3 PUSCH that corresponds to a second RA procedure associated with a SSB or CSI-RS with lower signal quality such as smaller RSRP (for a SSB or CSI-RS or a TCI state indicated by each RAR UL grant). Such operation can be considered at least when the UE receives the two RARs with a time gap smaller than a threshold, for example based on UE capability such as a PDSCH and/or PUSCH processing time. In such case, the time gap is specified or configured such that the Msg3 PUSCH transmission timelines are met. In another example, the Msg3 PUSCH transmission timelines are extended such that a specified or configured time gap can be met by the UE.

For another example, the UE determines a panel to use for transmission of a selected Msg3 PUSCH, such as a same panel as the one for a corresponding RAR reception, or a panel indicated by a RAR UL grant such a panel corresponding to a spatial transmission filter that is indicated by a RAR UL grant. In one example, a panel for transmission of Msg3 PUSCH is a panel that can generate a spatial transmission filter that corresponds to the spatial filter used to receive a corresponding SSB or CSI-RS or a panel used to transmit the PRACH corresponding to the RAR/Msg3 PUSCH.

For another example, the UE may receive an indication from a serving gNB of a panel for reception of Msg2/RAR or Msg4. For example, a DCI format scheduling a Msg4 reception can provide a field that indicates a reception panel for Msg4 PDSCH.

For another example, the UE determines a panel for transmission of a PUCCH with HARQ-ACK information corresponding to Msg4 reception, such as a first UE panel for transmission of a first PUCCH with first HARQ-ACK information for detection of a first TB in a first Msg4 PDSCH, and a second UE panel for transmission of a second PUCCH with second HARQ-ACK information for detection of a second TB in a second Msg4 PDSCH. In one example, the UE can multiplex the first and second HARQ-ACK information on a same PUCCH and transmit the PUCCH from a single panel, such as the first panel or the second panel. In another example, the UE can multiplex the first and second HARQ-ACK information on a same PUCCH and transmit the PUCCH from both the first and the second UE panels to provide spatial diversity. In yet another example, the UE can multiplex the first and second HARQ-ACK information on two different PUCCHs and transmit each of the two PUCCHs using a different panel, thereby creating time/frequency diversity in addition to spatial diversity.

For another example, the UE receives two RARs, each with a corresponding a RAR UL grant. The UE can then select one of the two RARs/RAR UL grants and transmit the corresponding Msg3 PUSCH, and drop the other Msg3 PUSCH corresponding to the not-selected RAR/RAR UL grant. In one example, the UE can indicate such selection to the network, so that the network can avoid granting retransmissions for the dropped Msg3 PUSCH. In one example, the UE indicates such selection when the UE is provided two separate RA configurations, such as two separate RO configurations for UEs supporting 'two concurrent RA procedures', wherein the gNB may be able to link the two RA procedures based on corresponding PRACH transmissions in linked ROs.

For yet another example, for PUCCH corresponding to HARQ-ACK information of Mgs4(s), there can be two options for the two HARQ-ACK bits: Spatial bundling (and corresponding operation for the two bits) or multiplexing the two bits. In another example, the UE sends separate PUCCHs, each with one HARQ-ACK bit corresponding to one of the two Msg4s.

The following embodiments of the present disclosure, denoted as E-6-4, describe a transmission of two (modified) Msg3s after reception of two RARs corresponding to two RA procedures and "intra-UA" contention resolution, for a UE before RRC connection. The following examples and embodiments, such as those of FIGS. 14 and 15 are described below.

Figure 14:
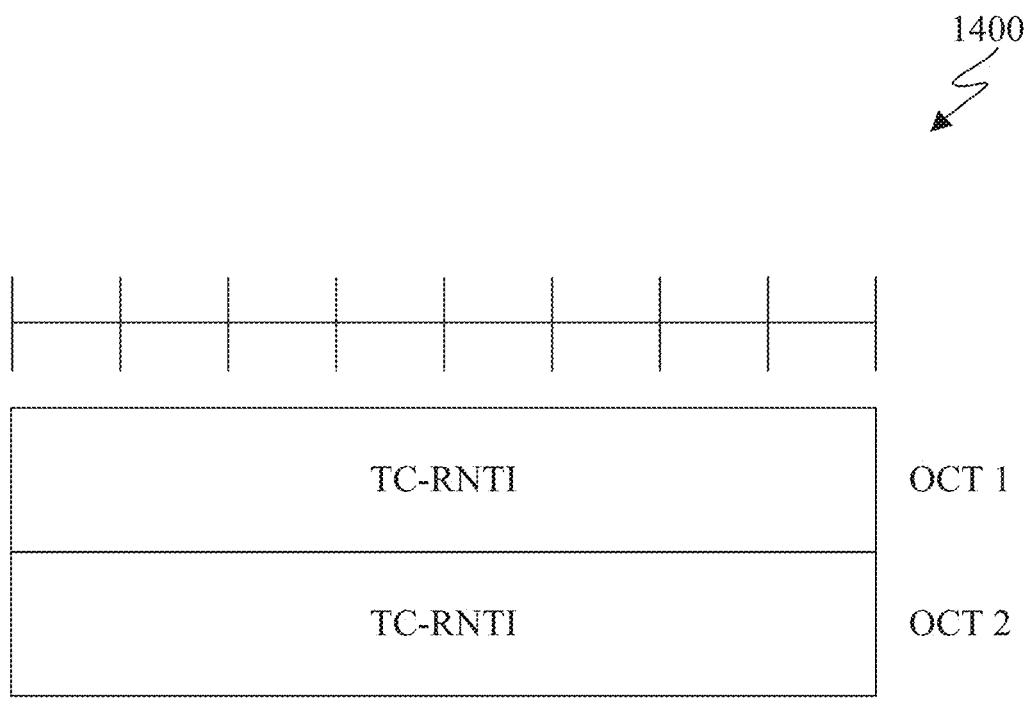
FIG. 14 illustrates an example diagram according to embodiments of present disclosure.
Figure 15:
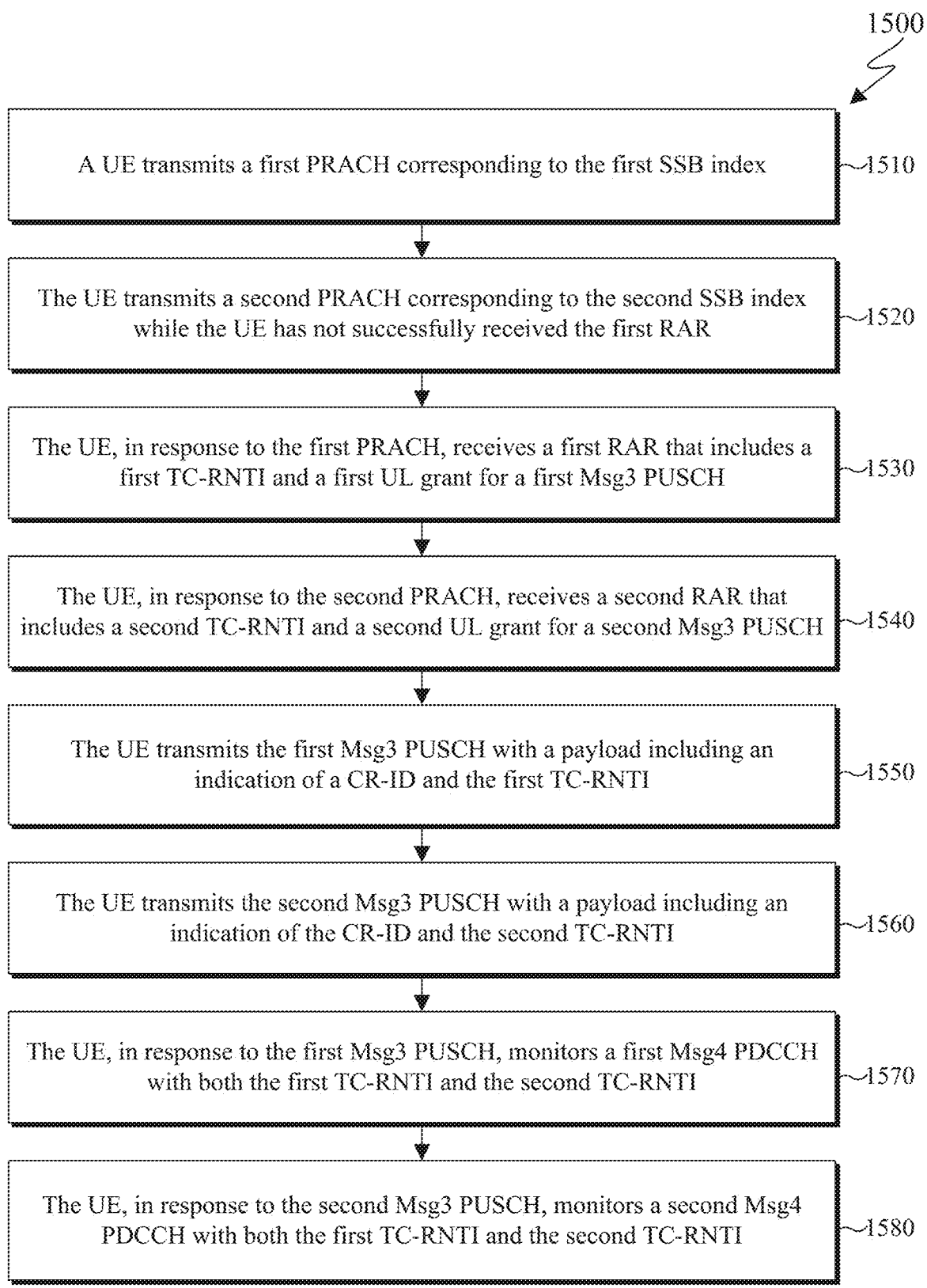
FIG. 15 illustrates an example method for two Msg3 transmissions and two Msg4 monitoring corresponding to a UE with two concurrent RA procedures before radio resource control (RRC) connection according to embodiments of present disclosure.

FIG. 14 illustrates an example diagram 1400 according to embodiments of present disclosure. FIG. 15 illustrates an example method 1500 for two Msg3 transmissions and two Msg4 monitoring corresponding to a UE with two concurrent RA procedures before radio resource control (RRC) connection according to embodiments of present disclosure. The steps of the method 1500 can be performed by any of the UEs 111-116 of FIG. 1, such as the UE 116 of FIG. 3. The method 1500 is for illustration only and other embodiments can be used without departing from the scope of the present disclosure.

A UE (such as the UE 116) performing two concurrent RA procedures, can monitor PDCCH for scheduling two RAR PDSCHs corresponding to the two concurrent RA procedures, and then transmit two Msg3 PUSCHs and monitor PDCCH for scheduling two Msg4 PDSCHs, each with a corresponding contention resolution time window. The UE can extend/modify the contents of the two Msg3 PUSCHs, compared to the contents of Msg3 PUSCH for a legacy UE with single RA procedure, so that the gNB can identify the two concurrent RA procedures and link them to the same UE. For example, the two RARs include two TC-RNTIs for the same UE and the gNB needs to resolve such "double TC-RNTI" issued for the UE.

Such operation can be beneficial, for example, as a form of repetition or diversity and can improve a reliability and latency of the RA procedure including an increased likelihood of a successful reception of at least one Msg4. It is noted that in a baseline operation with only one RA procedure, the UE reverts to PRACH transmission if the UE does not successfully receive a Msg4. Therefore, use of two concurrent RA procedures reduces the RA latency, since the UE can continue with both RA procedures without waiting for the outcome of Msg4 reception for each RA procedure.

In one example, the UE determines a first panel to transmit a first Msg3 and a second panel to transmit a second Msg3. For example, the first and second panels can be same as those used for PRACH transmission corresponding to the first and second RAR/RA procedure. In another example, the two panels for the two Msg3 transmissions can be indicated by a RAR UL grant, as explained above.

In certain embodiments, for a UE with a capability [2-panels/2-PRACHs] and performing two concurrent physical random access procedures, if the UE detects, associated with a/the first procedure, a first DCI format 1_0 with CRC scrambled by a first RA-RNTI during a first time window, and a corresponding first transport block in a corresponding first PDSCH providing a first RAR UL grant, and if the UE also detects, associated with a/the second procedure, a second DCI format 1_0 with CRC scrambled by a second RA-RNTI during a second time window, with a corresponding second transport block in a corresponding second PDSCH providing a second RAR UL grant, Layer 1 determines [a first antenna port from] a first antenna port group to transmit a first PUSCH scheduled by the first RAR UL grant, and [a second antenna port from] a second antenna port group to transmit a second PUSCH scheduled by the second RAR UL grant. The contents of the first PUSCH and the second PUSCH can be different.

A UE (such as the UE 116) can trigger a PRACH transmission, for example, for initial access to establish RRC connection, a PRACH for RLF to re-establish RRC connection, or a PRACH for transition from RRC_INACTIVE state to resume RRC connection and move to the RRC connected state.

When the UE does not have a C-RNTI, the UE can include, at least on the second/latest transmitted Msg3 PUSCH, a MAC-CE that includes information fields F1, F2, and F3. Here F1 corresponds to a contention resolution ID (CR-ID) for the UE. F2, corresponds to an indication of the original TC-RNTI that the UE received in the corresponding MAC RAR. F3 corresponds to an indication of the other TC-RNTI that the UE received in the other MAC RAR.

For example, the UE can include such MAC-CE in both Msg3 PUSCHs for two concurrent RA procedures, such as for the case that the UE receives the two corresponding RARs with a time gap less than a threshold (e.g., a threshold based on UE processing time).

The diagram 1400 as illustrated in FIG. 14 describes an exmaple format of a MAC that the UE includes in one or both Msg3 PUSCHs. The C-RNTI MAC CE is identified by MAC subheader with LCID as specified in Table 6.2.1-2 of 6.1.3.2 C-RNTI MAC CE of TS 38.321. It can have a fixed size and consists of a single field. The field contains the C-RNTI of the MAC entity. The length of the field is 16 bits.

The TC-RNTI MAC CE is identified by MAC subheader with LCID as specified in Table 6.2.1-2 of 6.1.3.2a TC-RNTI MAC CE of TS 38.321. It can have a fixed size and consists of a single field defined as shown in the diagram 1400. For example, for a UE with a capability [2-panels/2-PRACHs] and performing two concurrent RA procedures, this field contains the TC-RNTI associated with the first RA procedure. The length of the field is 16 bit.

In one example, some of the above information elements can be implicitly indicated. For example, the UE can use the original TC-RNTI as the scrambling initialization of the Msg3 PUSCH, thereby implicitly indicating the information element F2.

In one example, the UE can include only one TC-RNTI, such as a first TC-RNTI received in a first/earlier RAR, in both Msg3 PUSCH transmissions, and discard the other TC-RNTI, such as a second TC-RNTI received in a second/later RAR. Since both Msg3 PUSCH transmissions include the CR-ID and both are scheduled transmissions, the gNB is able to link the two messages to the same UE.

When the gNB (such as the BS 102) receives two Msg3 PUSCHs indicating a same CR-ID, and at least one of the two Msg3 PUSCHs includes an indication of two TC-RNTIs, the gNB can link the two RA procedures and resolve the two TC-RNTIs that the gNB indicated in the two RARs and respond with one of the TC-RNTIs to ensure that one C-RNTI is assigned to the UE and one RRC configuration is provided using Msg4 or later PDSCH transmissions. In one example, although UE monitors PDCCH for two Msg4 PDSCHs, the gNB can transmit only one Msg4 PDSCH or transmit two Msg4 PDSCHs.

In a first option, the gNB decides on a single TC-RNTI. The gNB can transmit one or two Msg4(s) to the UE that are addressed to the single selected TC-RNTI, regardless of whether the Msg4 corresponds to the first RA procedure/RAR or the second RA procedure/RAR. The UE monitors PDCCH for scheduling of the two Msg4 PDCCHs using both TC-RNTIs, and the UE determines the final C-RNTI based on the TC-RNTI used for addressing the one or two Msg4 PDCCHs.

In a second option, the gNB indicates a single TC-RNTI to the UE, for example via a one-bit flag to indicate the first TC-RNTI or the second TC-RNTI, or by indicating the full bit string of the selected TC-RNTI. The gNB can transmit one or two Msg4(s) to the UE and, unlike the first option, each Msg4 PDSCH is addressed to a same TC-RNTI as the TC-RNTI received in the corresponding RAR for the corresponding RA procedure. The UE monitors PDCCH for scheduling of two Msg4 PDCCHs using both TC-RNTIs and determines a C-RNTI based on a TC-RNTI indicated in the one or two Msg4 PDSCHs (with a matching CR-ID).

In a third option, the gNB uses a single default TC-RNTI based on a rule, such as the TC-RNTI provided in the earliest RAR, or the min/max of the two TC-RNTIs, so that the C-RNTI is known to the UE and does not need to be indicated. The UE monitors PDCCH for scheduling two Msg4 PDCCHs using the default TC-RNTI that is also the C-RNTI for the UE.

In one example, the UE uses the same modifications for Msg3 PUSCH transmission and Msg4 monitoring also for repetitions and retransmissions of Msg3 PUSCH as well as for repetitions and retransmissions of Msg4.

In one realization, the UE transmits the two Msg3 PUSCHs and monitors PDCCH for scheduling of the two Msg4s independently, without any modification of the Msg3 PUSCH content or modification of Msg4 PDCCH monitoring. The UE and gNB coordinate on the UE identity issues, such as resolving the double C-RNTI issue and assigning a single C-RNTI to the UE using later messages, such as in later PUSCH transmissions or PDSCH receptions, and possibly based on UE-specific RRC signaling and configuration.

In another realization, a UE with two transmitter panels may continue to operate with two TC-RNTIs, both elevated as C-RNTIs, so that the UE will have two C-RNTI values, as a means to indicate the two UE panels. In one example, the UE is assigned one C-RNTI, selected from one of the two assigned TC-RNTIs (using any of the options and methods above), and the UE also keeps the other TC-RNTI, so that the UE and a first UE panel can be addressed by the C-RNTI, and a second UE panel can be addressed by the other TC-RNTI that is not selected as the C-RNTI.

The method 1500 of FIG. 15 describes a flowchart for two Msg3 transmissions and two Msg4 monitoring corresponding to a UE with two concurrent RA procedures before RRC connection.

In step 1510, a UE (such as the UE 116) transmits a first PRACH corresponding to the first SSB index. in step 1520, the UE transmits a second PRACH corresponding to the second SSB index while the UE has not successfully received the first RAR.

In one example, the while condition of step 1520 can be relaxed so the UE can transmit a second PRACH corresponding to the second SSB index while the first RA procedure corresponding to the first PRACH has not successfully completed. In step 1530, the UE, in response to the first PRACH, receives a first RAR that includes a first TC-RNTI and a first UL grant for a first Msg3 PUSCH. In step 1540, the UE, in response to the second PRACH, receives a second RAR that includes a second TC-RNTI and a second UL grant for a second Msg3 PUSCH. In step 1550, the UE transmits the first Msg3 PUSCH with a payload including an indication of a CR-ID and the first TC-RNTI. In step 1560 the UE transmits the second Msg3 PUSCH with a payload including an indication of the CR-ID and the second TC-RNTI. In step 1570, the UE, in response to the first Msg3 PUSCH, monitors a first Msg4 PDCCH with both the first TC-RNTI and the second TC-RNTI. In step 1580, the UE, in response to the second Msg3 PUSCH, monitors a second Msg4 PDCCH with both the first TC-RNTI and the second TC-RNTI.

In certain embodiments, in response to a PUSCH transmission scheduled by a RAR UL grant when a UE has not been provided a C-RNTI, the UE attempts to detect a DCI format 1_0 with CRC scrambled by a corresponding TC-RNTI scheduling a PDSCH that includes a UE contention resolution identity. For a UE with a capability [2-PRACHs] and performing two concurrent physical random access procedures when a UE has not been provided a C-RNTI, in response to two PUSCH transmissions scheduled by two corresponding RAR UL grants, the UE attempts to detect two DCI format 1_0 with CRC scrambled by either of the two corresponding TC-RNTIs received in the two corresponding RARs [or by a first TC-RNTI received in the earliest RAR]. Each of the two DCI format 1_0 can schedule a corresponding PDSCH that includes a UE contention resolution identity. In response to the PDSCH reception with the UE contention resolution identity, the UE transmits HARQ-ACK information in a PUCCH. For a UE with a capability [2-PRACHs] and performing two concurrent physical random access procedures, in response to one or two PDSCH receptions with the UE contention resolution identity, the UE transmits corresponding HARQ-ACK information in one or two PUCCHs, wherein Layer 1 determines [a first antenna port from] a first antenna port group to transmit a first PUCCH, and [a second antenna port from] a second antenna port group to transmit a second PUCCH. Syntax (4), is provided below:

Syntax (4)
    4> if the Random Access Preamble was not selected by the MAC entity among the contention-based Random Access Preamble(s):
        5> consider the Random Access procedure successfully completed.
    4> else:
        5> set the TEMPORARY_C-RNTI to the value received in the Random Access Response;
        5> if this is the first successfully received Random Access Response within this Random Access procedure:
            6> if the Random Access procedure was initiated for SpCell beam failure recovery:
                7> indicate to the Multiplexing and assembly entity to include a BFR MAC CE or a Truncated BFR MAC CE in the subsequent uplink transmission.
            6> if the UE has a capability [2-PRACHs] and is performing two concurrent RA procedures, and if the transmission is being made for the CCCH logical channel:
                7> indicate to the Multiplexing and assembly entity to include: a TC-RNTI MAC-CE associated with the first RA procedure in the subsequent uplink transmission corresponding to the second RA procedure;
            6> obtain the MAC PDU to transmit from the Multiplexing and assembly entity and store it in the Msg3 buffer.

Here, it is noted that if within a Random Access procedure, an uplink grant provided in the Random Access Response for the same group of contention-based Random Access Preambles has a different size than the first uplink grant allocated during that Random Access procedure, the UE behavior is not defined.

Once Msg3 is transmitted the MAC entity perform Syntax (5), below:

Syntax (5)
    1> start the ra-ContentionResolutionTimer and restart the ra-ContentionResolutionTimer at each HARQ retransmission in the first symbol after the end of the Msg3 transmission;
    1> monitor the PDCCH while the ra-ContentionResolutionTimer is running regardless of the possible occurrence of a measurement gap;
    1> if notification of a reception of a PDCCH transmission of the SpCell is received from lower layers:
        2> if the C-RNTI MAC CE was included in Msg3:
            3> if the Random Access procedure was initiated for SpCell beam failure recovery (as specified in clause 5.17) and the PDCCH transmission is addressed to the C-RNTI; or
            3> if the Random Access procedure was initiated by a PDCCH order and the PDCCH transmission is addressed to the C-RNTI; or
            3> if the Random Access procedure was initiated by the MAC sublayer itself or by the RRC sublayer and the PDCCH transmission is addressed to the C-RNTI and contains a UL grant for a new transmission:
                4> consider this Contention Resolution successful;
                4> stop ra-ContentionResolutionTimer;
                4> discard the TEMPORARY_C-RNTI;
                4> consider this Random Access procedure successfully completed.
        2> else if the CCCH SDU was included in Msg3 and the PDCCH transmission is addressed to its TEMPORARY_C-RNTI, or TEMPORARY_C-RNTI_2 (for a UE with capability [2-PRACHs] and performing a second concurrent RA procedures):
            3> if the MAC PDU is successfully decoded:
                4> stop ra-ContentionResolutionTimer;
                4> if the MAC PDU contains a UE Contention Resolution Identity MAC CE; and
                4> if the UE Contention Resolution Identity in the MAC CE matches the CCCH SDU transmitted in Msg3:
                    5> consider this Contention Resolution successful and finish the disassembly and demultiplexing of the MAC PDU;
                    5> if this Random Access procedure was initiated for SI request:
                        6> indicate the reception of an acknowledgement for SI request to upper layers.
                    5> else:
                        6> set the C-RNTI to the value of the TEMPORARY_C-RNTI or TEMPORARY_C-RNTI_2;
                    5> discard the TEMPORARY_C-RNTI and TEMPORARY_C-RNTI_2;
                    5> consider this Random Access procedure successfully completed.
                    5> for a UE with capability [2-PRACHs] and performing a second concurrent RA procedures, stop the second Random Access procedure.
                4> else:
                    5> discard the TEMPORARY_C-RNTI for a UE without capability [2-PRACHs];
                    5> consider this Contention Resolution not successful and discard the successfully decoded MAC PDU.

Although FIG. 15 illustrates the method 1500 various changes may be made to FIG. 15. For example, while the method 1500 of FIG. 15 and is shown as a series of steps, various steps could overlap, occur in parallel, occur in a different order, or occur multiple times. In another example, steps may be omitted or replaced by other steps. For example, steps of the method 1500 can be executed in a different order.

The following embodiments of the present disclosure, denoted as E-6-5, describe a transmission of two (modified) Msg3s after reception of two RARs corresponding to two RA procedures, for a UE after RRC connection. The following examples and embodiments, such as those of FIG. 16 describe this below.

Figure 16:
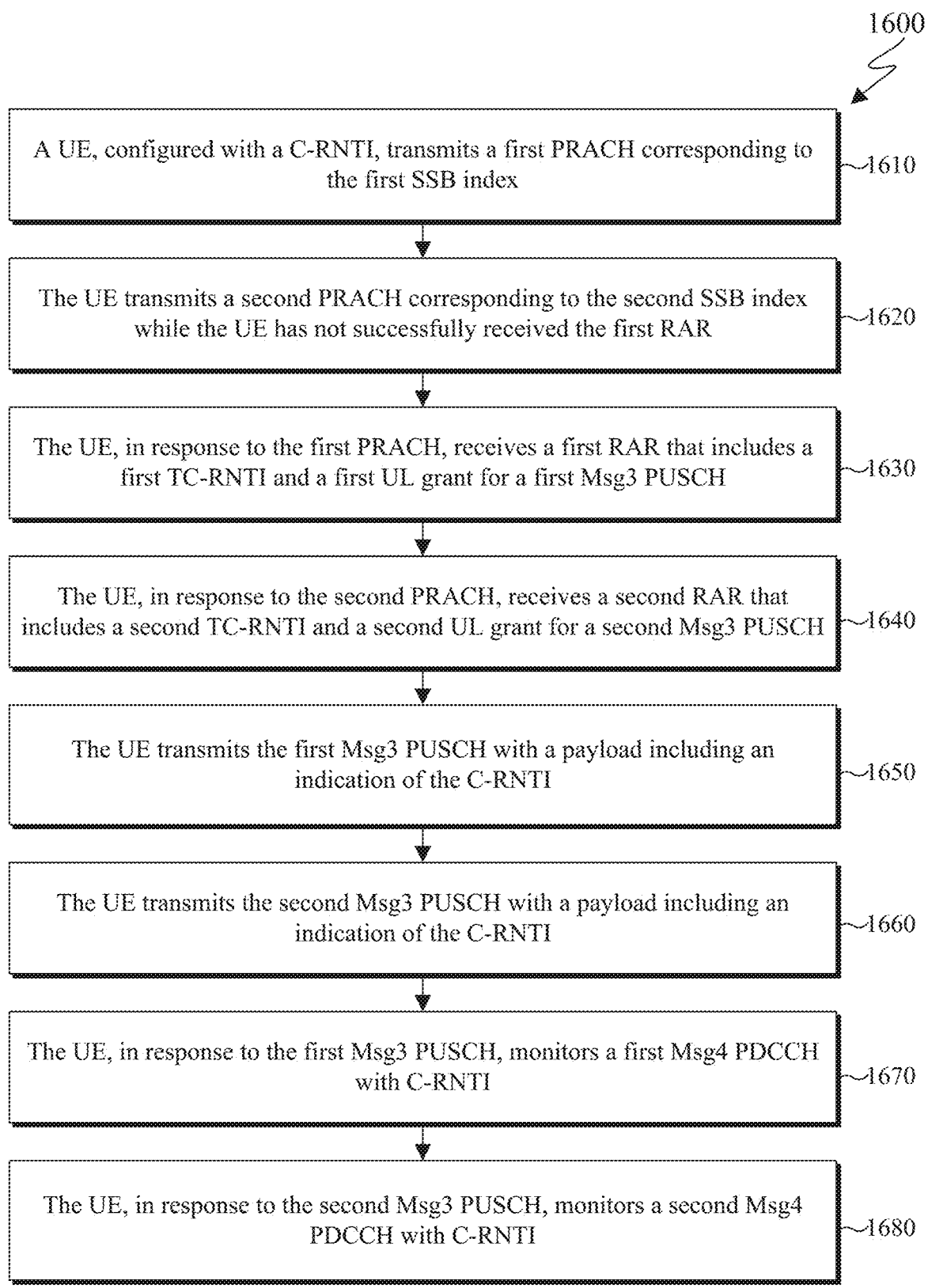
FIG. 16 illustrates an example method for two Msg3 transmissions and the physical downlink control channel (PDCCH) monitoring for two Msg4 physical downlink shared channel (PDSCH) receptions corresponding to a UE with two concurrent RA procedures after RRC connection according to embodiments of present disclosure.

FIG. 16 illustrates an example method 1600 for two Msg3 transmissions and the PDCCH monitoring for two Msg4 PDSCH receptions corresponding to a UE with two concurrent RA procedures after RRC connection according to embodiments of present disclosure. The steps of the method 1600 can be performed by any of the UEs 111-116 of FIG. 1, such as the UE 116 of FIG. 3. The method 1600 is for illustration only and other embodiments can be used without departing from the scope of the present disclosure.

When a UE is in the RRC_CONNECTED state and has been provided a C-RNTI and performs two concurrent RA procedures, the UE can monitor PDCCH for scheduling of two RARs corresponding to two concurrent RA procedures, and then transmit two Msg3 PUSCHs, and monitor PDCCH for scheduling two Msg4s, each with a corresponding contention resolution time window. The UE can transmit the two Msg3 PUSCHs independently for the two RA procedures, or the two Msg3 PUSCHs can have some dependency and linkage.

In one example, the UE can include a C-RNTI MAC-CE in both Msg3 transmissions, and that information can be sufficient at the gNB to link the two RA procedures to a same UE.

In another example, the UE can include a C-RNTI MAC-CE in both Msg3 transmissions, and additionally include a TC-RNTI MAC-CE as described in Embodiment E-6-4, so that the gNB is provided further information for faster linkage of the two RA procedures to a same UE.

In both/all cases, the gNB transmits the one or two Msg4 PDCCH(s) addressed to the C-RNTI configured to the UE, and the UE monitors PDCCH for scheduling one or two Msg4 PDCCH(s) addressed to the C-RNTI.

The method 1600 of FIG. 16 describes a flowchart for two Msg3 PUSCH transmissions and the PDCCH monitoring for two Msg4 PDSCH receptions corresponding to a UE with two concurrent RA procedures after RRC connection.

In step 1610, a UE (such as the UE 116) configured with a C-RNTI, transmits a first PRACH corresponding to the first SSB index. in step 1620, the UE transmits a second PRACH corresponding to the second SSB index while the UE has not successfully received the first RAR. In step 1630, the UE, in response to the first PRACH, receives a first RAR that includes a first TC-RNTI and a first UL grant for a first Msg3 PUSCH. In step 1640, the UE, in response to the second PRACH, receives a second RAR that includes a second TC-RNTI and a second UL grant for a second Msg3 PUSCH. In step 1650, the UE transmits the first Msg3 PUSCH with a payload including an indication of the C-RNTI. In step 1660, the UE transmits the second Msg3 PUSCH with a payload including an indication of the C-RNTI. In step 1670, the UE, in response to the first Msg3 PUSCH, monitors a first Msg4 PDCCH with C-RNTI. In step 1680, the UE, in response to the second Msg3 PUSCH, monitors a second Msg4 PDCCH with C-RNTI. Syntax (5), is provided below:

Syntax (5)

4> if the Random Access Preamble was not selected by the MAC entity among the contention-based Random Access Preamble(s):
  5> consider the Random Access procedure successfully completed.
4> else:
  5> set the TEMPORARY_C-RNTI to the value received in the Random Access Response;
  5> if this is the first successfully received Random Access Response within this Random Access procedure:
    6> if the transmission is not being made for the CCCH logical channel:
      7> indicate to the Multiplexing and assembly entity to include a C-RNTI MAC CE in the subsequent uplink transmission for a UE without capability [2-PRACHs].
      7> if the UE has a capability [2-PRACHs] and is performing two concurrent RA procedures:
        8> indicate to the Multiplexing and assembly entity to include: a C-RNTI MAC CE in the subsequent uplink transmission corresponding to the first RA procedure;
        8> indicate to the Multiplexing and assembly entity to include: a C-RNTI MAC CE and a TC-RNTI MAC-CE associated with the first RA procedure in the subsequent uplink transmission corresponding to the second RA procedure;
    6> if the Random Access procedure was initiated for SpCell beam failure recovery:
      7> indicate to the Multiplexing and assembly entity to include a BFR MAC CE or a Truncated BFR MAC CE in the subsequent uplink transmission.
    6> obtain the MAC PDU to transmit from the Multiplexing and assembly entity and store it in the Msg3 buffer.

Here, if within a Random Access procedure, an uplink grant provided in the Random Access Response for the same group of contention-based Random Access Preambles has a different size than the first uplink grant allocated during that Random Access procedure, the UE behavior is not defined.

Although FIG. 16 illustrates the method 1600 various changes may be made to FIG. 16. For example, while the method 1600 of FIG. 16 and is shown as a series of steps, various steps could overlap, occur in parallel, occur in a different order, or occur multiple times. In another example, steps may be omitted or replaced by other steps. For example, steps of the method 1600 can be executed in a different order.

The following embodiments of the present disclosure, denoted as E-6-6, describe a modification of MsgA PUSCH(s) for two concurrent RA procedures with 2-step RACH.

In certain embodiments, for a UE (such as the UE 116) performing two concurrent RA procedures, if one or both RA procedures are Type-2/2-step RA procedures, the UE can modify the contents of the one or two MsgA PUSCH(s) so that the gNB can identify and link the two RA procedures to a same UE. The UE can include some information about the other concurrent RA procedure.

In one realization, the UE includes in the MsgA PUSCH(s) an information field, such as a 1-bit flag, to indicate whether or not the UE has another PRACH transmission corresponding to another concurrent RA procedure. In another realization, if the UE has already received a TC-RNTI for the other RA procedure, the UE can include the TC-RNTI corresponding to the other RA procedure in the MsgA PUSCH(s). It is noted that the other TC-RNTI can be received in a RAR/Msg2 if the other RA procedure is a 4-step RACH, or a successRAR or fallbackRAR in a MsgB if the other RA procedure is another 2-step RACH. In another example, the UE can include in the MsgA PUSCH information about the SSB/CSI-RS associated with the other PRACH the UE has attempted for the other RA procedure.

For example, for two 2-step RACH procedures, the UE can provide a same CR-ID in the two corresponding MsgAs, to assist the gNB to link the two RA procedures to the UE.

For another example, the UE can use 2-step RACH on a first panel (e.g. the panel with a stronger SSB or that does not suffer from MPE) and use 4-step RACH in a second panel and indicate the corresponding information in a MsgA of the first RA procedure. The network can respond with a single successRAR for the 2-step RACH, or each procedure can complete independently.

The following embodiments of the present disclosure, denoted as E-6-7, describe handling Msg3/A buffer for concurrent RA procedures.

In certain embodiments, for a UE (such as the UE 116) performing two concurrent RA procedure, the UE can use individual buffers or a common buffer for the two Msg3/MsgA PUSCHs corresponding to the two RA procedures.

In one realization, the UE can use individual buffers for the two Msg3/MsgA PUSCHs, for example, a first buffer for a first Msg3/MsgA PUSCH corresponding to a first RA procedure, and a second buffer for a second Msg3/MsgA PUSCH corresponding to a second RA procedure. A benefit of such approach can be flexible operation of the two concurrent RA procedures, so there is no inherent inter-dependency concerning Msg3/MsgA transmission in the design of the two RA procedures, for example a flushing of a first Msg3/A buffer does not impact a second Msg3/A buffer. It can be up to UE implementation, such as higher layer operation, whether and how the two Msg3/MsgA buffers can interact, such as any information/payload sharing.

In another realization, the UE can use common or shared buffers for the two Msg3/A PUSCHs, for example a single buffer for both a first and a second Msg3/A PUSCH corresponding to a first and a second RA procedure, respectively. A benefit of this approach can be inherent information/payload sharing for two concurrent RA procedures, especially when the two procedures correspond to a single PRACH trigger. However, additional handling and restrictions are needed for such shared Msg3/A buffer, for example, avoiding unnecessary flushing of Msg3/A that is being used for a first Msg3/A PUSCH transmission (or repetitions or retransmissions thereof) corresponding to a first RA procedure when a second RA procedure is initiated.

The following embodiments of the present disclosure, denoted as E-7, describe a modified back-off indication (BI) for PRACH fairness amount legacy UEs and enhanced UEs.

In certain embodiments, UEs (such as UE 116) that are capable of performing two/multiple RA procedures, can be expected to interpret a back-off indication (BI) provided in a RAR/Msg2/MsgB differently from legacy UEs. Therefore, the network can provide some level of resource availability fairness among legacy UEs that can and cannot perform multiple concurrent RA procedures by using the BI to temporarily suspend or disable multiple concurrent RA procedures, for example to avoid a congestion of PRACH attempts in the cell.

In one realization, a UE expects values in reserved bits (such as 2 reserved bits) of a BI provided by RAR/Msg2/MsgB, so that a BI can include a longer bit string and indicate a larger back-off indication value. Therefore, the network can use this method to have the UEs performing two/multiple RA procedures wait longer before a PRACH re-attempt/retransmission.

In another realization, a UE receives a higher layer configuration for the BI value, such as a mapping or a factor/multiplier, so that the UE reads the BI value same as a legacy UE, for example, without reading any reserved bits, and interprets the BI value based on the mapping or factor/multiplier provided by higher layers. A higher layer configuration can include, for example, a SIB extension or an extension of RRC (common) configuration. The network can use this method to have the UEs performing two/multiple RA procedures wait longer before a PRACH re-attempt.

For example, higher layer configuration can indicate that UEs performing two/multiple RA procedures are or are not allowed to use repetition for the RA procedure, such as PRACH repetition, RAR repetition, Msg3/A PUSCH repetition, and Msg4 repetition, and so on.

For another example, higher layers provide a separate set of PRACH preambles or ROs for UEs performing two/multiple RA procedures, so that the network can distinguish such UEs from legacy UEs. In one example, the former UEs are restricted to use the separate set of PRACH preambles or ROs, so the network can ensure PRACH/RA fairness by an appropriate configuration of those parameters.

For example, the UE uses a first set of PRACH preambles for operation with one single RA procedure and a second set of PRAHC preambles for operation with multiple (e.g., 2) RA procedures. In one example, for the second set of PRACH preambles that are used for operation with multiple (e.g. 2) RA procedures, the UE can be higher layer configured with a linkage for preambles on a first RO and preamble on a second RO, such that if the network receives a first preamble on a first RO and a second preamble on a second RO, wherein the first and second PRACH preambles are linked based on the higher layer configuration, the network can determine that the corresponding PRACH transmission and RA procedures are from a same UE. In another example, the UE can be provided with a linkage only among the ROs or only among the preambles, possibly including ROs or preambles separate from those provided by legacy/cell-specific configuration. In this case, the gNB can respond with a single Msg2 including a RAR for both PRACH preambles. For example, the network can select the PRACH preamble that is closest or with least latency (e.g., corresponding to a smallest round trip time (RTT) or a smallest timing advance (TA) value) or the one with the largest RSRP or largest PRACH reception power, and so on.

The following embodiments of the present disclosure, denoted as E-8, describe single-panel UEs with two concurrent PRACHs.

In certain embodiments, a single-panel UE performs two concurrent RA procedures, provided that the two procedures are associated with time multiplexed PRACH transmission, PDCCH monitoring for RAR/MsgB reception, Msg3/A PUSCH transmission, and PDCCH monitoring and Msg4 reception. In one example, time multiplexing applies only to transmissions by a single-panel UE, but simultaneous or overlapping reception can be supported by such UE.

In one realization, a single-panel UE can perform two concurrent RA procedures that are associated with two SSBs or two CSI-RSs that correspond to time multiplexed (TDMed) ROs. Therefore, when the single-panel UE selects SSB(s) or CSI-RS(s) corresponding to two concurrent RA procedures, the UE avoids selection of SSB(s) or CSI-RS(s) that result in simultaneous or overlapping transmission of two PRACHs with two different spatial transmission filters. Similar methods and considerations can apply to Msg3/A PUSCH transmission. In another example, transmission timing constraints for Msg3/A PUSCH transmission can be configured by higher layers or indicated by the RAR UL grant.

In another realization, a single-panel UE is expected to receive higher layer configuration for a time-multiplexed (TDMed) mapping between slots or symbols included in a RAR PDCCH monitoring time window or RAR PDSCH reception. For example, a SIB extension or an extension of the RRC (common) configuration can indicate that a first set of symbols or slots in the RAR monitoring window include RAR monitoring occasions for a first RA procedure, and a second set of symbols or slots include RAR monitoring occasions for a second RA procedure. In one example, a single-panel UE can be configured to monitor RAR for a first RA procedure in odd slots within the RAR time window, and to monitor RAR for a second RA procedure in even slots within the RAR time window. Similar methods and considerations can apply to Msg4 PDCCH monitoring and PDSCH reception.

In one realization, the UE determines different slots for RAR of a first RA procedure and a concurrent second RA procedure, based on one or more of a preamble index, an RO, and so one. For example, the UE selects PRACH parameters for the second RA procedure such that the corresponding RAR is on different slots. For example, there can be a linkage or association between groups/set/subsets of preamble indexes or ROs and a set/subset of slots on which the UE monitors RAR for a given RA procedure.

The following embodiments of the present disclosure, denoted as E-9, describe an antenna port for PRACH transmission of two concurrent RA procedures.

In certain embodiments, two or multiple antenna ports (APs) are used for PRACH transmission corresponding to two concurrent RA procedures. According to this embodiment, the UE can transmit two concurrent single-port PRACH transmissions, or two concurrent multi-port PRACH transmission, wherein each of the two single-port or multi-port PRACH transmissions can be associated with one UE panel.

In one realization of this embodiment, for a multi-panel UE that performs two concurrent RA procedures, the UE can use antenna ports 4000 and 4001 to transmit two concurrent PRACH transmissions, wherein each of the AP 4000 can correspond to a first UE panel and the AP 4001 can correspond to a second UE panel.

In another realization of this embodiment, for a single-panel UE, a same AP 4000 is used even for two concurrent PRACHs.

In yet another realization of this embodiment, each of the two concurrent RPACHs can be transmitted with two or more APs, for example to enable a spatial diversity scheme for PRACH transmission, or to transmit a longer PRACH sequence using spatial multiplexing. According to this approach, the UE can determine (digital) precoders or (analog) beam/spatial transmission filter for multi-port PRACH, in order to create beam-formed PRACH transmission.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE), the method comprising:
    receiving a first configuration for a first random access (RA) procedure on a first cell;
    receiving a second configuration for a second RA procedure on a second cell;
    initiating the first RA procedure on the first cell based on the first configuration;
    initiating the second RA procedure on the second cell prior to completion of the first RA procedure; and
    scaling a power for a first transmission, when the first transmission has a gap with a second transmission that is smaller than a threshold, wherein:
        the first transmission is for a first physical random access channel (PRACH), on the first cell, associated with the first RA procedure,
        the second transmission is for a second PRACH, on the second cell, associated with the second RA procedure,
        a total power of the first transmission and the second transmission prior to the scaling would exceed a configured maximum output power, and
        a total power of the first transmission and of the second transmission after the scaling does not exceed the configured maximum output power.

2. The method of claim 1, further comprising:
    identifying a first downlink reference signal (DL RS) associated with the first RA procedure;
    identifying a second DL RS associated with the second RA procedure;
    determining, based on the first DL RS, (i) a first reference signal received power (RSRP) or (ii) a first difference between a first computed power for a first physical random access channel (PRACH) transmission and a first configured maximum output power $P_{CMAX}$; and
    determining, based on the second DL RS, (i) a second RSRP or (ii) a second difference between a second computed power for a second PRACH transmission and a second configured maximum output power $P_{CMAX}$;
    wherein initiating the second RA procedure comprises initiating the second RA procedure based on determining that:
        the first RSRP is less than or equal to a first RSRP threshold and the second RSRP is greater than or equal to a second RSRP threshold, or
        the first difference is less than or equal to the second difference.

3. The method of claim 2, wherein:
the first RSRP or the first configured maximum output power $P_{CMAX}$ corresponds to a first antenna port group, and
the second RSRP or the second configured maximum output power $P_{CMAX}$ corresponds to a second antenna port group.

4. The method of claim 1, further comprising:
receiving first information for at least one of a first configured maximum output power PCMAX, a first power ramping step size, and a first reference signal (RS) for a first pathloss measurement of the first cell; and
receiving second information for at least one of a second configured maximum output power PCMAX, a second power ramping step size, and a second RS for a second pathloss measurement of the second cell,
wherein:
 the first RA procedure includes transmission of a first physical random access channel (PRACH) on the first cell with a first power,
 the second RA procedure includes transmission of a second PRACH on the second cell with a second power,
 the first power is based on the first information, and
 the second power is based on the second information.

5. The method of claim 1, wherein:
the first configuration is for the first cell,
the second configuration is for the second cell, and
the second configuration is separate from the first configuration.

6. The method of claim 1, further comprising:
receiving:
 a first random access response (RAR) for the first RA procedure, and
 a second RAR for the second RA procedure, wherein:
  the first RAR includes a first timing advance (TA) value for adjusting a time of first transmissions on the first cell,
  the second RAR includes a second TA value for adjusting a time of second transmissions on the second cell, and
  the first TA value is different from the second TA value.

7. The method of claim 1, further comprising:
receiving:
 a first random access response (RAR) for the first RA procedure using a first spatial filter corresponding to a first reference signal (RS) for the first cell, and
 a second RAR for the second RA procedure using a second spatial filter corresponding to a second RS for the second cell.

8. The method of claim 1, further comprising:
receiving:
 a first random access response (RAR) corresponding to the first RA procedure, wherein the first RAR includes a first temporary cell radio network temporary identifier (TC-RNTI) and a first uplink grant, and
 a second RAR corresponding to the second RA procedure, wherein the second RAR includes a second TC-RNTI and a second uplink grant; and
transmitting:
 a first physical uplink shared channel (PUSCH) scheduled by the first uplink grant, and
 a second PUSCH scheduled by the second uplink grant.

9. The method of claim 8, wherein one of:
both the first and the second PUSCHs include the first TC-RNTI,
both the first and the second PUSCHs include the second TC-RNTI,
the first PUSCH includes the first TC-RNTI and the second PUSCH includes both the first and the second TC-RNTIs, or
the second PUSCH includes the second TC-RNTI and the first PUSCH includes both the first and the second TC-RNTIs.

10. A user equipment (UE) comprising:
a transceiver configured to:
 receive a first configuration for a first random access (RA) procedure on a first cell, and
 receive a second configuration for a second RA procedure on a second cell, and
a processor operably coupled to the transceiver, the processor configured to:
 initiate the first RA procedure on the first cell based on the first configuration,
 initiate the second RA procedure on the second cell prior to completion of the first RA procedure, and
 scale a power for a first transmission, when the first transmission has a gap with a second transmission that is smaller than a threshold, wherein:
  the first transmission is for a first physical random access channel (PRACH), on the first cell, associated with the first RA procedure,
  the second transmission is for a second PRACH, on the second cell, associated with the second RA procedure,
  a total power of the first transmission and the second transmission prior to the scaling would exceed a configured maximum output power, and
  a total power of the first transmission and of the second transmission after the scaling does not exceed the configured maximum output power.

11. The UE of claim 10, wherein:
the processor is further configured to:
 identify a first downlink reference signal (DL RS) associated with the first RA procedure,
 identify a second DL RS associated with the second RA procedure,
 determine, based on the first DL RS, (i) a first reference signal received power (RSRP) or (ii) a first difference between a first computed power for a first physical random access channel (PRACH) transmission and a first configured maximum output power PCMAX, and
 determine, based on the second DL RS, (i) a second RSRP or (ii) a second difference between a second computed power for a second PRACH transmission and a second configured maximum output power $P_{CMAX}$, and
the processor is further configured to initiate the second RA procedure based on a determination that:
 the first RSRP is less than or equal to a first RSRP threshold and the second RSRP is greater than or equal to a second RSRP threshold, or
 the first difference is less than or equal to the second difference.

12. The UE of claim 11, wherein:
the first RSRP or the first configured maximum output power $P_{CMAX}$ corresponds to a first antenna port group, and
the second RSRP or the second configured maximum output power $P_{CMAX}$ corresponds to a second antenna port group.

13. The UE of claim 10, wherein the transceiver is further configured to:
receive first information for at least one of a first configured maximum output power PCMAX, a first power ramping step size, and a first reference signal (RS) for a first pathloss measurement of the first cell; and
receive second information for at least one of a second configured maximum output power PCMAX, a second power ramping step size, and a second RS for a second pathloss measurement of the second cell,
wherein:
the first RA procedure includes transmission of a first physical random access channel (PRACH) on the first cell with a first power,
the second RA procedure includes transmission of a second PRACH on the second cell with a second power,
the first power is based on the first information, and the second power is based on the second information.

14. The UE of claim 10, wherein:
the first configuration is for the first cell,
the second configuration is for the second cell, and
the second configuration is separate from the first configuration.

15. The UE of claim 10, wherein:
the transceiver is further configured to receive:
a first random access response (RAR) for the first RA procedure, and
a second RAR for the second RA procedure,
the first RAR includes a first timing advance (TA) value for adjusting a time of first transmissions on the first cell,
the second RAR includes a second TA value for adjusting a time of second transmissions on the second cell, and
the first TA value is different from the second TA value.

16. The UE of claim 10, wherein: the transceiver is further configured to receive:
a first random access response (RAR) for the first RA procedure using a first spatial filter corresponding to a first reference signal (RS) for the first cell, and
a second RAR for the second RA procedure using a second spatial filter corresponding to a second RS for the second cell.

17. The UE of claim 10, wherein:
the transceiver is further configured to receive:
a first random access response (RAR) corresponding to the first RA procedure, wherein the first RAR includes a first temporary cell radio network temporary identifier (TC-RNTI) and a first uplink grant, and
a second RAR corresponding to the second RA procedure, wherein the second RAR includes a second TC-RNTI and a second uplink grant; and
the transceiver is further configured to transmit:
a first physical uplink shared channel (PUSCH) scheduled by the first uplink grant, and
a second PUSCH scheduled by the second uplink grant,
wherein one of:
both the first and the second PUSCHs include the first TC-RNTI,
both the first and the second PUSCHs include the second TC-RNTI,
the first PUSCH includes the first TC-RNTI and the second PUSCH includes both the first and the second TC-RNTIs, or
the second PUSCH includes the second TC-RNTI and the first PUSCH includes both the first and the second TC-RNTIs.

18. A base station comprising:
a transceiver configured to:
receive a first physical random access channel (PRACH) in a first random access occasion (RO) based on a first configuration for a first random access (RA) procedure on a first cell, wherein:
the first PRACH is received from a first transmission that is scaled based on having a gap with a second transmission that is smaller than a threshold,
the second transmission is for a second PRACH, on a second cell, associated with a second RA procedure;
a total power of the scaled first transmission and the second transmission prior to the scaling would exceed a configured maximum output power, and
a total power of the scaled first transmission and of the second transmission after the scaling does not exceed the configured maximum output power;
transmit a first random access response (RAR) corresponding to the first PRACH, wherein the first RAR includes a first temporary cell radio network temporary identifier (TC-RNTI) and a first uplink grant; and
receive a first PUSCH scheduled by the first uplink grant, wherein the first PUSCH includes the first TC-RNTI.

19. The base station of claim 18, wherein the transceiver is further configured to transmit a first physical downlink control channel (PDCCH) providing a first downlink control information (DCI) format in response to the first PUSCH, wherein the first DCI format includes first cyclic redundancy check (CRC) bits that are scrambled by the first TC-RNTI.

20. The base station of claim 19, wherein the transceiver is further configured to transmit a first physical downlink shared channel (PDSCH) after the first PUSCH, wherein the first PDSCH indicates a cell radio network temporary identifier (C-RNTI), wherein the C-RNTI is the first TC-RNTI.

* * * * *